US007241979B2

(12) United States Patent
Kil

(10) Patent No.: US 7,241,979 B2
(45) Date of Patent: Jul. 10, 2007

(54) TEMPERATURE CONTROLLER AND TEMPERATURE CONTROL METHOD, AND HEATING WIRE THEREFOR

(76) Inventor: Jong-Jin Kil, Kumkang Apt 1-101, Sosa-dong 16-19, Busheon-shi, Kyungki-do (KR)

( * ) Notice: Subject to any disclaimer, the term of this patent is extended or adjusted under 35 U.S.C. 154(b) by 0 days.

(21) Appl. No.: 11/163,345

(22) Filed: Oct. 14, 2005

(65) Prior Publication Data

US 2006/0289463 A1   Dec. 28, 2006

(30) Foreign Application Priority Data

Jun. 21, 2005   (KR)   ............... 10-2005-0053382

(51) Int. Cl.
*H05B 1/02*   (2006.01)
(52) U.S. Cl. .............. 219/505; 219/501; 219/212; 219/481
(58) Field of Classification Search ........... 219/501, 219/497, 505, 504, 548, 552, 212, 549, 547; 307/117
See application file for complete search history.

(56) References Cited

U.S. PATENT DOCUMENTS 5,302,807 A * 4/1994 Zhao ................ 219/211
5,422,462 A * 6/1995 Kishimoto ............ 219/545
6,002,117 A * 12/1999 Pak .................... 219/549
6,097,009 A * 8/2000 Cole ................... 219/528
2002/0195442 A1 * 12/2002 Lee ...................... 219/505
2003/0173345 A1 * 9/2003 Irwin et al. ............ 219/212

FOREIGN PATENT DOCUMENTS

| JP | 1998-162933 | 6/1998 |
| JP | 1998-262804 | 10/1998 |
| JP | 2000-030845 | 1/2000 |
| JP | 2000-030846 | 1/2000 |

* cited by examiner

*Primary Examiner*—Mark Paschall
(74) *Attorney, Agent, or Firm*—IPLA P.A.; James E. Bame

(57) ABSTRACT

The present invention relates to a non-electromagnetic wave temperature controller for a heating cable and a method therefor, which can perform heating and temperature detection in a non-electromagnetic fashion without short-circuiting one end of the heating cable that is used in warmers, such as electric floors, electric mats and electric fomentation devices. Furthermore, the present invention relates to a temperature detection non-electromagnetic heating cable and a temperature controller, which can reduce the amount of heat and control temperature without using a separate temperature sensor when the temperature of the heating cable is controlled or an arbitrary portion of the heating cable is overheated, and can prevent a magnetic field from being generated in the heating cable without short-circuiting one end of electrical heating wires and intercept the generation of a leakage electric field.

14 Claims, 45 Drawing Sheets

TEMPERATURE CONTROLLER AND TEMPERATURE CONTROL METHOD, AND HEATING WIRE THEREFOR

BACKGROUND OF THE INVENTION

1. Field of the Invention

The present invention relates to a non-electromagnetic wave temperature controller for a heating cable and a method therefor, which can perform heating and temperature detection in a non-electromagnetic fashion without short-circuiting one end of the heating cable that is used in warmers, such as electric floors, electric mats and electric fomentation devices. Furthermore, the present invention relates to a temperature detection non-electromagnetic heating cable and a temperature controller, which can reduce the amount of heat and control temperature without using a separate temperature sensor when the temperature of the heating cable is controlled or an arbitrary portion of the heating cable is overheated, and can prevent a magnetic field from being generated in the heating cable without short-circuiting one end of electrical heating wires and intercept the generation of a leakage electric field.

2. Description of the Related Art

Conditions surrounding a bed, such as temperature and humidity, are important factors governing humans' sleep. In order to keep the temperature of a bed appropriate, many homes widely use electrically heated bedding and warmers, such as electric floors, electric mats or electric fomentation devices. Such electrically heated bedding and warmers contain heating cables, so that heat is generated when power is supplied to the heating cables. Accordingly, a temperature controller that detects temperature around a heating cable and controls power supply based on the detected temperature is essential.

In a conventional bedding heating cable, temperature is detected in such a way as to short-circuit one of two parallelly arranged metallic electrical heating wires and provide a temperature sensor separate from a heating cable. However, the method in which the temperature sensor and the heating wire are separated from each other is problematic in that it cannot detect the temperature of the overall heating cable caused by an internal short circuit of the heating cable or local overheating at an arbitrary location. Accordingly, there are problems in that a fire and an electric shock may occur when the heating cable is locally overheated, short-circuited or cut.

Another conventional method includes a method of short-circuiting one end of two parallelly arranged metallic electrical heating wires, installing a separate sensor on the circumferential surface or internal central surface of the end and detecting temperature using a third electric wire. However, the method of detecting temperature using a third electric wire without separating a heating cable wire therefrom is problematic in that a temperature sensor layer and a third metallic layer are added to the heating cable and, therefore, the thickness of a non-magnetic field electrical heating wire increases so that it cannot be used for thin bedding, a manufacturing process of a heating cable is complicated, and manufacturing costs increase. Furthermore, all of the above-described methods have problems in that they have the problem of temperature control of the heating cable, they cannot be used in practice due to the excessive thickness of the heating cable and they cannot intercept harmful electromagnetic waves caused by voltage or current.

Meanwhile, in connection with heating cables, conventional non-magnetic field heating wires used as heating elements for electrically heated bedding and warmers, such as electric floors, electric mats or fomentation mats, each include a core thread formed of a polyester thread or glass wool, a heater coil spirally wound around the core thread, an internal insulation element applied to the heater coil wound around the circumferential surface of the core thread to insulate the heater coil, a shield arranged on the circumferential surface of an internal insulation element in conductor or net form and grounded, and an external insulation element applied to the shield. In the above-described construction, the heater coil and the shield are connected at the ends thereof and electrically in series to each other, and the front ends thereof become power input terminals that are connected to the (+) and (−) terminals of the power source.

The conventional non-magnetic field heating cable has disadvantages in that it is provided with an internal insulation element, so that the thickness of the heating cable is excessive and the flexibility thereof is poor. That is, in the conventional non-magnetic field heating cable for bedding, the internal insulation element is softened by high temperature heat generated from the heater coil during heating and the insulation property of the internal insulation element rapidly degrades, so that the thickness of the internal insulation element should be large so as to prevent the short circuit of the heater coil and the shield. Accordingly, the thickness of the conventional heating cable is at least 6 mm, so that problems arise in that the conventional heating cable protrudes and presses a human's body when the heating cable is applied to an electric mat, and it is almost impossible to apply the conventional heating cable to thin bedding, such as electric mats, electric blankets and electric floors, due to the thickness and flexibility of the conventional heating cable.

In order to solve the above-described problems, the present applicant invented a heating cable. The improved heating cable is advantageous in that the thickness of an internal insulation element is reduced using a heating wire coated with enamel, and performance is not degraded when bending stress is repeatedly applied to the heating cable, since a lead wire is wound around the outer surface of an internal insulation element. By this, the problems of having excessive thickness and poor flexibility can be completely overcome.

However, the improved heating cable cannot perform functions of detecting local overheating and accordingly controlling conduction. When local overheating occurs or the actual temperature exceeds a reference temperature at an arbitrary location of a heating cable of several tens of meters, power is shut off because there is the danger of a fire or a burn. For this purpose, a separate temperature detection device is required. That is, inconvenience arises in that a plurality of temperature detection devices are additionally provided at arbitrary locations to detect the temperature of a long heating cable. These temperature detection devices are configured to protrude outside bedding, thus inconveniencing users. In particular, a problem arises in that it is difficult to attach the temperature detection devices to thin bedding.

SUMMARY OF THE INVENTION

The present invention has been proposed to overcome the above-described problems, and an object of the present invention is to provide a temperature controller and temperature control method that are capable of performing heating and temperature detection in a non-electromagnetic wave fashion without short-circuiting one end of a heating cable. Another object of the present invention is to provide a temperature controller and temperature control method that are capable of preventing the emission of harmful electromagnetic waves from a heating cable used for bedding, etc.

Another object of the present invention is to provide a temperature controller and temperature control method that are capable of cutting off the supply of an overcurrent by forcibly cutting a fuse when it is impossible to control the temperature of an electrical heating wire. Another object of the present invention is to provide a temperature controller and temperature control method that are capable of detecting local overheating at an arbitrary location as well as the temperature of the overall electrical heating wire. Furthermore, another object of the present invention is to provide a temperature controller and temperature control method that can ground the surface electric field of the heating cable at a zero electric potential.

Furthermore, still another object of the present invention is to provide a temperature detection non-electromagnetic wave heating cable that is provided with a thermistor between a first electrical heating layer and a second electrical heating layer, and causes the amount of heat to be automatically reduced by a decrease in the resistance value of the thermistor when the temperature of the heating cable reaches a reference temperature or an arbitrary location of the heating cable is overheated.

Furthermore, a still another object of the present invention is to provide a non-electromagnetic wave heating cable that can achieve a non-electromagnetic wave state by maintaining low voltage drops at both ends of a second electrical heating layer, enable shield to attenuates and control electric field leakage, and completely intercept a somewhat leakage electric field by coating the circumferential surface of the second electrical heating layer with a separate conductive coating layer, thus simultaneously preventing both magnetic and electric fields.

Furthermore, the present invention provides a non-electromagnetic wave heating cable, in which a conductive coating layer surrounding a second electrical heating layer is coated, thus fundamentally preventing a leakage electric field.

In order to achieve the above-described objects, an embodiment of the present invention provide a non-electromagnetic wave temperature controller for a heating cable for bedding, including a temperature control unit connected to the heating cable that includes first and second electrical heating wires arranged in parallel and a Negative Temperature Coefficient (NTC) thermistor, and configured to compare a temperature signal voltage, which is output from the first electrical heating wire, with a reference voltage and to output a temperature control signal; and a control rectification unit configured to return a heating current from an end of the second electrical heating wire connected to a power source through second and first ends of the first electrical heating wire toward the power source when conduction is achieved by control of the temperature control unit; wherein the electrical heating wires realize a non-magnetic field state by canceling opposite magnetic fields during temperature detection and heating.

The non-electromagnetic wave temperature controller further includes a temperature voltage control unit for adjusting a temperature detection voltage that is applied to a first end of the first electrical heating wire.

The temperature control unit includes a reference voltage generation unit for outputting the reference voltage; a comparison and detection unit for comparing the temperature voltage with the reference voltage, and outputting a drive signal when the temperature voltage is higher than the reference voltage; a trigger delay unit configured to be driven by the drive signal of the comparison and detection unit and to delay the trigger signal by a predetermined time; and a trigger output unit for outputting trigger signals for the time by which the trigger delay unit delays the trigger signal.

The control rectification unit includes a heating current U-turn rectifier between a second end of the first electrical heating wire and the second electrical heating wire. Furthermore, the heating current U-turn rectifier is disposed such that a cathode thereof is connected to a second end of the first electrical heating wire and an anode thereof is connected to the second electrical heating wire on a same side.

The control rectification unit is disposed such that an anode thereof is connected to a first end of the first electrical heating wire in parallel with the temperature voltage control unit and a cathode thereof is connected to a power source side, and further comprises a control rectifier that is turned on in response to a control signal from the temperature control unit.

The control rectification unit is disposed such that an anode thereof is connected to a first end of the first electrical heating wire in parallel with the temperature voltage control unit and a cathode thereof is connected to a power source side, and further comprises a control rectifier that is turned on in response to a control signal from the temperature control unit.

The control rectification unit includes a U-turn rectifier whose cathode is connected to the second end of the first electrical heating wire and whose anode is connected to the second electrical heating wire at the same side, and a control rectifier whose anode is connected to the first end of the first electrical heating wire in parallel with the temperature voltage control unit, whose cathode is connected to the power source, and which is turned on in response to the control signal of the temperature control unit.

The temperature voltage control unit includes a resistor whose first end is connected to the power source; and a temperature detection adjustment variable resistor connected between a second end of the resistor and a first end of the first electrical heating wire.

The temperature voltage control unit includes first and second resistors connected in series to each other; and a variable resistor connected between the first resistor and the second resistor; and a third resistor whose first end is connected to the power source and whose second end is connected to a moving piece of the variable resistor; wherein a first end of the first resistor is connected to the first electrical heating wire, a first end of the second resistor is connected to the second electrical heating wire at a same side, and input impedance is matched by adjusting a value of the variable resistor.

The temperature voltage control unit comprises a resistor for fixing a voltage that is applied to a first end of the first electrical heating wire; and the reference voltage generation unit outputs a reference voltage that can be variably set.

The temperature control unit includes an input unit for setting the reference voltage and delay time; a control unit for performing control such that the trigger signal is delayed by the set delay time if the output temperature voltage is higher than the reference voltage; a trigger output unit for outputting the trigger signal under control of the control unit; and an output unit for outputting the received reference voltage and delay time under control of the control unit.

The control unit is a microcomputer chip for inputting and outputting an analog signal.

The temperature control unit and a gate of the control rectifier are connected to each other by photocouple Silicon Controlled Rectifier (SCR).

The temperature control unit includes a discharge resistor connected in series to the gate of the control rectifier; a rectifier diode connected in series to the discharge resistor; a condenser connected in parallel between the gate bias resistor and the rectifier diode; a comparison zener diode; a gate excessive input limit resistor; an SCR whose anode is connected to the condenser and whose gate is connected to the gate excessive input limit resistor; an SCR gate bias resistor connected in parallel with the gate excessive input limit resistor and a gate of the SCR; and a charging current limit resistor connected in parallel between an anode of the SCR and the condenser A gate of the control rectifier is insulated by the photocouple SCR; a light emitting side of the photocouple SCR is connected in series to the discharge resistor, and a light receiving side of the photocouple SCR is connected between a gate and anode of the control rectifier in series with the trigger resistor.

The non-electromagnetic wave temperature controller further includes a reverse overcurrent protection device that comprises a first diode connected in parallel to the first electrical heating wire in a direction opposite to a direction of the heating current; a zener diode connected in parallel to the heating current U-turn rectifier; and a second diode connected in parallel to the second electrical heating wire in a direction opposite to a direction of the heating current; wherein a fuse is cut by the reverse overcurrent protection device when an overcurrent is generated by short circuit of the control rectifier.

The non-electromagnetic wave temperature controller further includes a ground lighting indicator connected to a first end of the second electrical heating wire that is grounded; and an inspection test point configured to prevent a surface electric field of the electrical heating wire by setting the ground lighting indicator at a turned-off position.

Another embodiment of the present invention provides a non-electromagnetic wave temperature control method for a heating cable, including a temperature detection step of detecting a temperature voltage output from a second end of a first electrical heating wire that is opposite to a first end of a heating cable that is connected to a power source; a temperature control step of outputting a control signal if an output temperature voltage is higher than a reference voltage; and a heating step of allowing a current to flow from a first end of a second electrical heating wire, which is connected to the power source, through the first and second ends of the first electrical heating wire to a power source side.

The non-electromagnetic wave temperature control method further includes the step of controlling a temperature detection voltage applied to a first end of the first electrical heating wire.

The temperature control step includes the steps of outputting the reference voltage; comparing the temperature voltage with the reference voltage, and outputting a drive signal if the temperature voltage is higher than the reference voltage; delaying a trigger signal by a predetermined delay time in response to the drive signal; and outputting a trigger signal for the delay time.

A temperature detection non-electromagnetic wave heating cable, which is used in conjunction with the temperature controller and the temperature control method, includes a first electrical heating layer connected to any one end of a power source; a thermistor layer applied to surround the first electrical heating layer; a second electrical heating layer wound around a circumference of the thermistor layer and connected at a first end of the second electrical heating layer to a second end of the power source; and an insulation layer configured to insulate the thermistor layer and the second electrical heating layer while surrounding outsides of the thermistor layer and the second electrical heating layer; wherein heating currents or temperature detection currents flowing through the first and second electrical heating layers have the same magnitude and flow in opposite directions, and the second electrical heating wire performs a shielding function.

A temperature detection non-electromagnetic wave heating cable, which is used in conjunction with the temperature controller and the temperature control method, includes a first electrical heating layer connected to any one end of a power source; a thermistor layer applied to surround the first electrical heating layer; a second electrical heating layer wound around a circumference of the thermistor layer and connected at a first end of the second electrical heating layer to a second end of the power source; and a conductive coating layer configured to insulate the thermistor layer and the second electrical heating layer while surrounding outsides of the thermistor layer and the second electrical heating layer The first electrical heating layer includes a core thread located through a central portion of the first electrical heating layer; and an electrical heating wire spirally wound around a circumferential surface of the core thread and connected to any one end of the power source, wherein conduction is achieved through the electrical heating wire.

The temperature detection non-electromagnetic wave heating cable further includes a conductive coating layer that is disposed between the second electrical heating layer and the insulation layer to be applied to a circumferential surface of the second electrical heating layer and surround the second electrical heating layer.

The thermistor layer is a NTC whose resistance value decreases as temperature increases.

The second electrical heating layer includes a lead wire; wherein the lead wire is spirally and loosely wound around a circumferential surface of the thermistor layer.

The second electrical heating layer includes first and second lead wires; wherein the first and second lead wires are loosely wound around a circumferential surface of the thermistor layer in a double spiral manner, repeatedly cross each other and perform a shielding function.

The second electrical heating layer includes first and second lead wires; wherein the first lead wire is spirally wound around a circumferential surface of the thermistor layer, and the second lead wire is longitudinally arranged on a circumferential surface of the thermistor layer and repeatedly crosses the first lead wire.

The second electrical heating layer includes a metallic film; wherein the metallic film is spirally wound around a circumferential surface of the thermistor layer.

The second electrical heating layer includes a metallic shield element; wherein the metallic shield element surrounds a circumferential surface of the thermistor layer.

The second electrical heating layer includes an aluminum sheet; wherein the aluminum sheet surrounds a circumferential surface of the thermistor layer; wherein the lead wire is spirally wound around a circumferential surface of the aluminum sheet.

The conductive coating layer is made of conductive synthetic material and completely surrounds the thermistor layer and the second electrical heating layer so that the thermistor layer and the second electrical heating layer are not externally exposed, thus performing a shielding function.

The second end of the electrical heating wire (or electrical heating conductor) of the second electrical heating layer is connected to the second unidirectional rectifier, so that it can output a voltage output from the second end of the electrical heating wire, and the second end of the second electrical heating layer is connected to the first end of the second unidirectional rectifier and the second end of the electrical heating wire (or electrical heating conductor) of the first electrical heating layer is connected to the second end of the second unidirectional rectifier, so that a heating current supplied from the power source to a first end of the second electrical heating layer passes through the second unidirectional rectifier, enters the second end of the electrical heating conductor of the first electrical heating layer, and returns to the power source. The first end of the second electrical heating layer is grounded.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The objects and features of the present invention can be easily understood with reference to the accompanying drawings and the following detailed description. The present invention proposes a temperature controller capable of performing heating and temperature detection in a non-electromagnetic wave fashion without short-circuiting one end of a heating cable, in a preferred embodiment.

Figure 1:
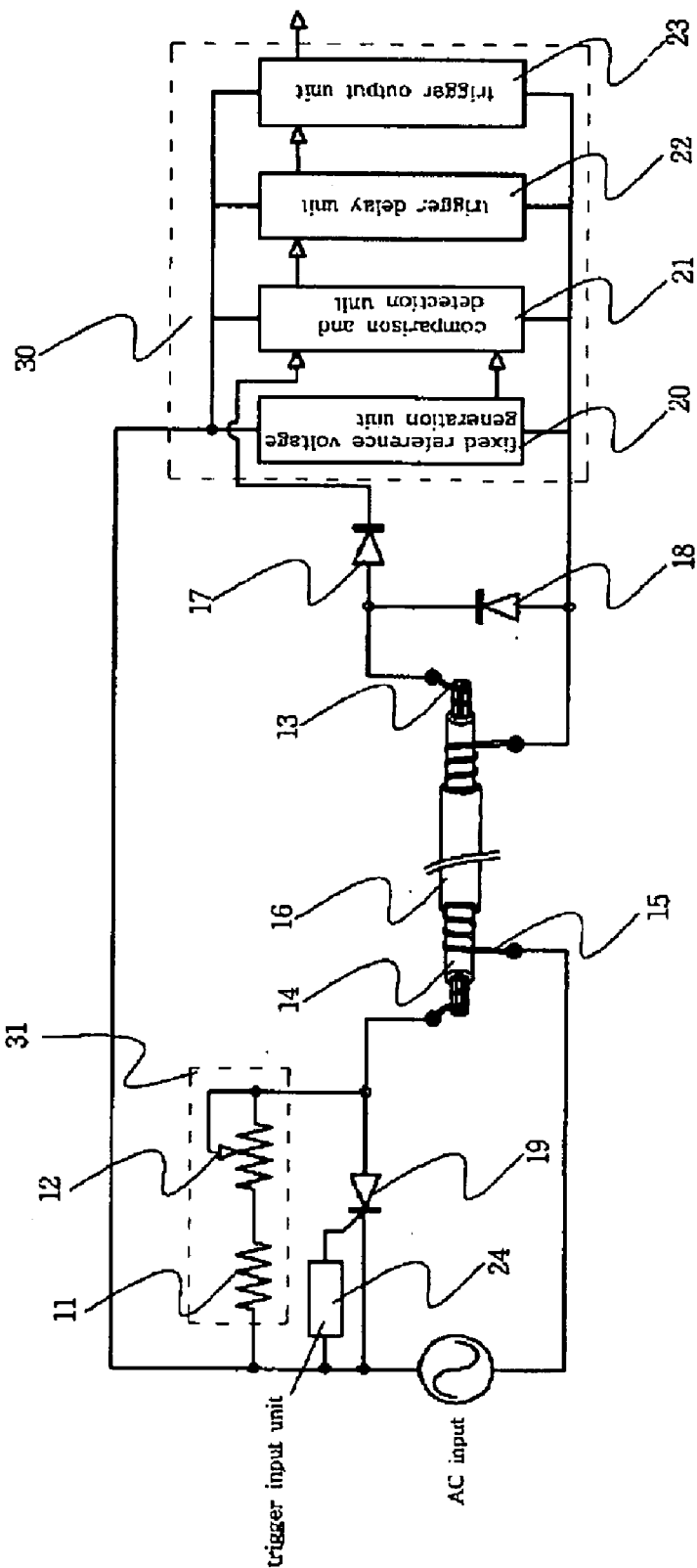
FIG. 1 is a diagram of an embodiment schematically illustrating the construction of a non-electromagnetic wave temperature controller for a heating cable in accordance with the present invention.
Figure 2:
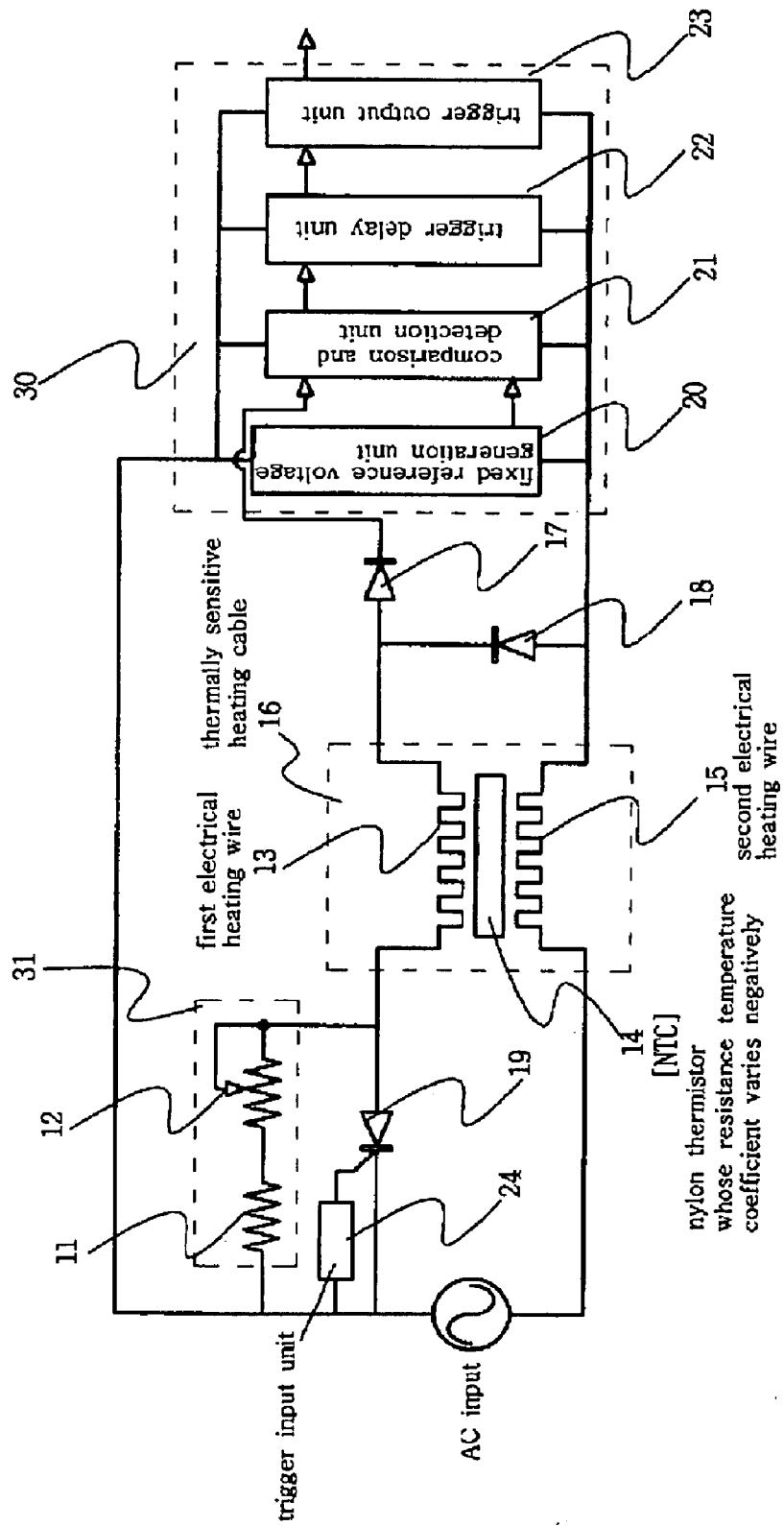
FIG. 2 is a diagram of an embodiment schematically illustrating the heating cable of FIG. 1.

FIG. 1 is a diagram of an embodiment schematically illustrating the construction of a non-electromagnetic wave temperature controller for a heating cable in accordance with the present invention, and FIG. 2 is a diagram of an embodiment schematically illustrating the heating cable of FIG. 1. Referring to FIGS. 1 and 2, the present invention includes a heating cable 16, a temperature voltage detection rectifier 17, a temperature control unit 30, and control rectification units 18 and 19.

The heating cable 16 used in bedding, a warmer, an electric heater and an electrical heating carpet includes a first electrical heating wire 13 wound around the outer surface of an insulation core, a Negative Temperature Coefficient (NTC) thermistor 14 configured to surround the first electrical heating wire 13 and to have a resistance value that decreases as the temperature increases, a second electrical heating wire 15 wound around the outer surface of the NTC thermistor 14, and an insulation coating configured to surround the second electrical heating wire 15. The first electrical heating wire 13 and the second electrical heating wire 15 are arranged side by side or in parallel with each other.

Furthermore, the present invention may further include a temperature voltage control unit 31 for adjusting a temperature detection voltage applied to one end of the first electrical heating wire 13. In the present embodiment, the temperature voltage control unit 31 includes a resistor 11 connected at one end thereof to a power source, and a temperature detection adjustment variable resistor 12 connected in series between the other end of the resistor 11 and one end of the first electrical heating wire 13. The variable resistor 12 allows temperature to be controlled by varying a voltage input to the NTC thermistor 14.

The temperature voltage detection rectifier 17 is connected in series to the other end of the first electrical heating wire 13 and passes a temperature voltage, which is output from the other end of the first electrical heating wire 13, therethrough. In the present embodiment, the temperature voltage detection rectifier 17 is preferably a diode. When Alternating Current (AC) input power is supplied, the front half-period of an AC cycle outputs variation in the temperature resistance value of the NTC thermistor 14 positioned between the first electrical heating wire 13 and the second electrical heating wire 15 to the temperature voltage detection rectifier 17. A temperature detection signal current passes through the first electrical heating wire 13, makes a U-turn in the NTC thermistor 14, and exits through the second electrical heating wire 15. At this time, the temperature detection signal current flowing through the first electrical heating wire 13 and the temperature detection signal current flowing through the second electrical heating wire 15 flow in opposite directions, so that magnetic fields cancel each other and, therefore, the temperature detection signal currents flow in a non-magnetic field state.

The temperature voltage detection rectifier 17 is used to indicate that a temperature detection operation and a heating operation are separated from each other in an theoretical equivalent circuit and it is used and operates in the temperature detection operation. Meanwhile, in the construction of an actual circuit, a small signal power below several mW is sufficient for the temperature control unit 30 that receives the temperature signal voltage, so that the output value of the temperature signal voltage of the temperature voltage control unit 31 is below several mW. Furthermore, according to the setting of the self input signal amplifying point of the temperature control unit 30 (in particular, in the case where an SCR 90 is provided in the temperature control unit 30, in particular, a comparison and detection unit 21, an operation of selecting (+) or (−) is enabled), a both (+) and (−) wave signal, or a (+) or (−) signal is selected and an arbitrary operation may be performed.

Accordingly, in the actual circuit construction conditions in which rectification is not required for a small signal or a (+) signal is selected and used, a temperature detection temperature voltage detection rectifier 17 is used in an overlapping manner from a logical point of view, so that the temperature voltage detection rectifier 17 may be omitted. That is, when the temperature signal voltage conversion consumption power of the NTC thermistor 14 is conversion-detected at less than several mW, an AC voltage or a DC voltage may be selected as the NTC thermistor detection signal voltage, and the application of the temperature voltage detection rectifier 17 may be selected according to the condition in which the temperature control unit 30 sets an operating point at which a thermistor detection input signal operates.

If a temperature voltage output from a first electrical heating wire is higher than a reference voltage, the temperature control unit 30 outputs a control signal. In the present embodiment, the temperature control unit 30 includes a fixed reference voltage generation unit 20 for outputting a reference voltage, a comparison and detection unit 21 for comparing a temperature voltage with a reference voltage and outputting a drive signal if the temperature voltage is higher than the reference voltage, a trigger delay unit 22 configured to be driven by the drive signal output from the corn parison and detection unit 21 and delay trigger signals by a predetermined period, and a trigger output unit 23 for outputting trigger signals for the period by which the trigger delay unit 22 delays the trigger signals.

The control rectifiers 18 and 19 allows a heating current to flow from the end of the second electrical heating wire 15, which is connected to the power source through the ends of the first electrical heating wire 13 toward the power source while making a U-turn when conduction is achieved by a trigger signal. In the present embodiment, a control rectifier includes a heating current U-turn rectifier 18 and a control rectifier 19.

The heating current U-turn rectifier 18 has a cathode connected to the other end of the first electrical heating wire 13 and an anode connected to the second electrical heating wire 15 on the same side, and a diode is used as the heating current U-turn rectifier 18 in the present embodiment.

The control rectifier 19 has an anode connected to one end of the first electrical heating wire 13, in parallel with the temperature voltage control unit 31, and a cathode connected to the power source, and is turned on by the trigger signal of the trigger input unit 24. It is most preferred that a power control Silicon-Controlled Rectifier (SCR) be used as the control rectifier 19.

The trigger delay unit 22 starts from the temperature detection period of the AC cycle and is maintained until the control rectifier 19 is turned on in a heating period. At this time, the control rectifier 19 is characterized by being turned on at a zero point and controlling power.

A non-magnetic field operation is performed in such a way that, when the control rectifier 19 is turned on by the trigger signal output of the temperature control unit 30, a heating current flows through the second electrical heating wire 15, the heating current U-turn rectifier 18, the first electrical heating wire 13 and the control rectifier 19, which are connected in series to the power source, thereby heating the electrical heating wires.

Figure 3:
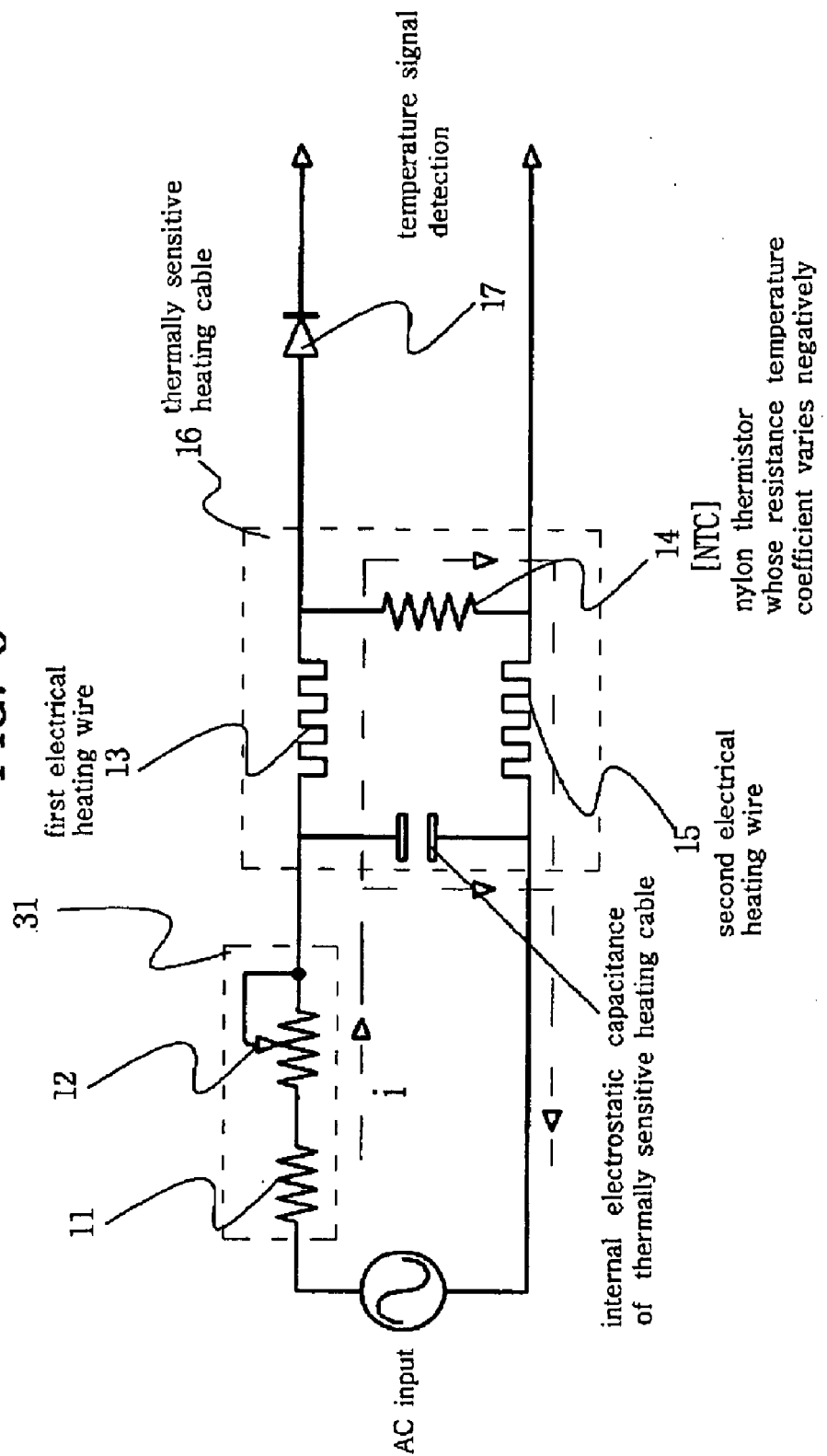
FIG. 3 is an equivalent circuit diagram illustrating a temperature detection operation and a current flow in the construction of FIG. 1.
Figure 4:
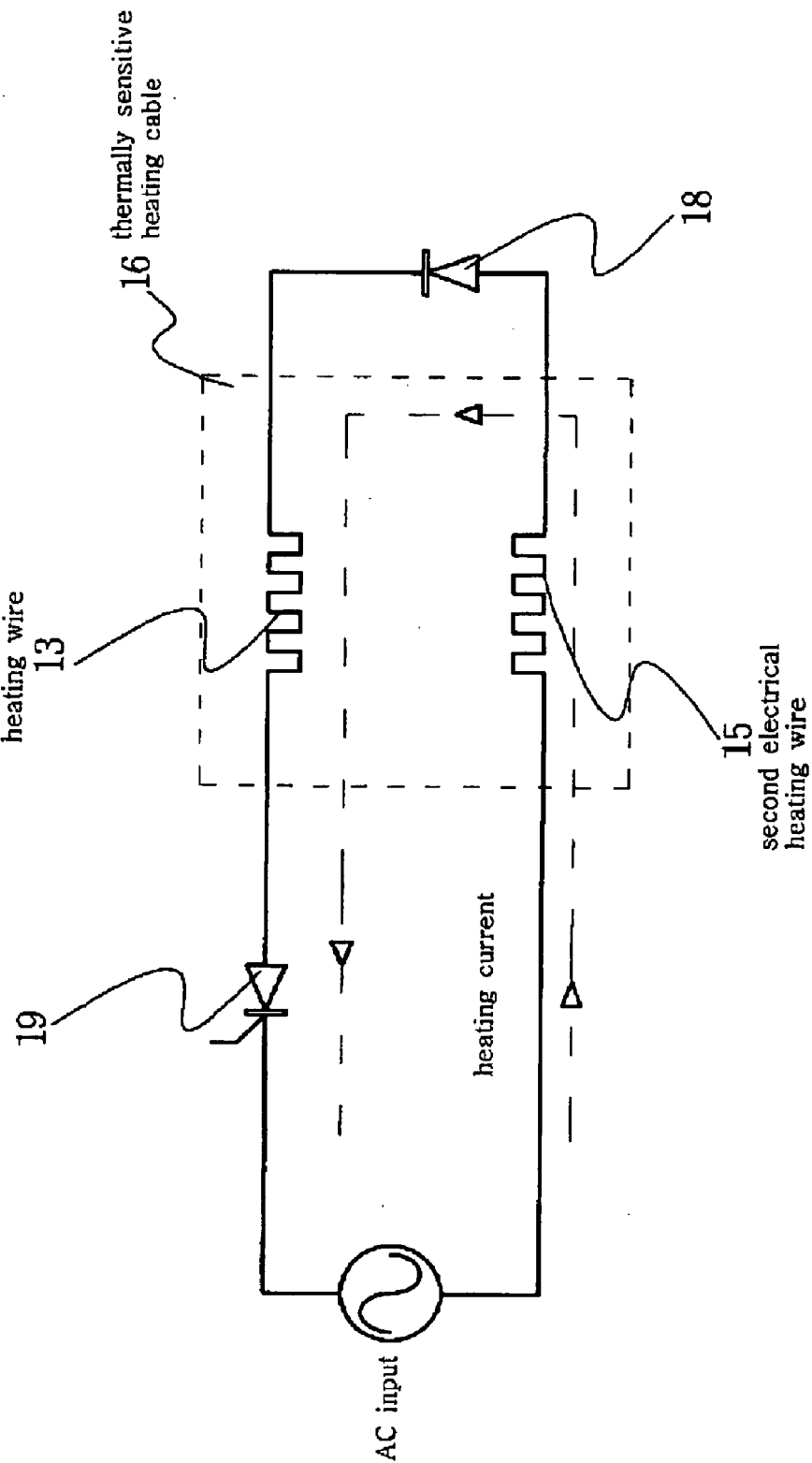
FIG. 4 is an equivalent circuit diagram illustrating the heating operation and the current flow in the construction shown in FIG. 1.
Figure 5:
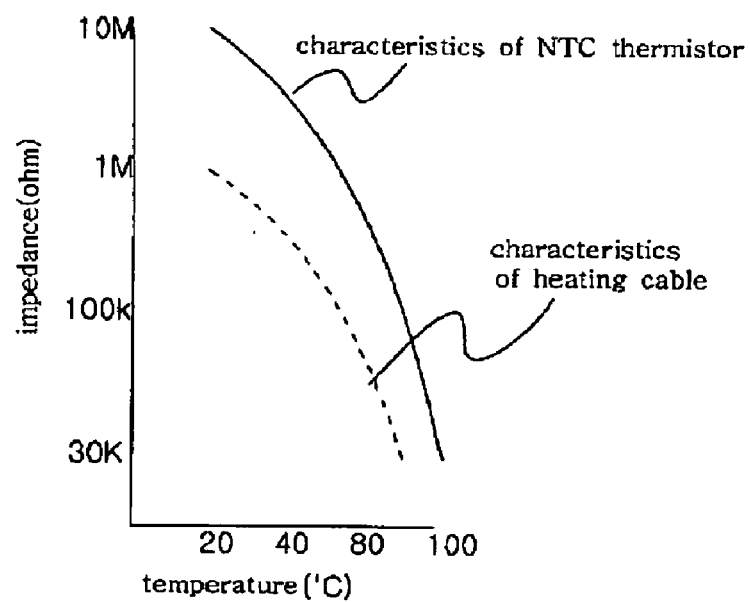
FIG. 5 is a graph illustrating the characteristics of the thermistor in which a resistance value varies with temperature, and the characteristics of the heating cable used in the temperature controller of the present invention.
Figure 6:
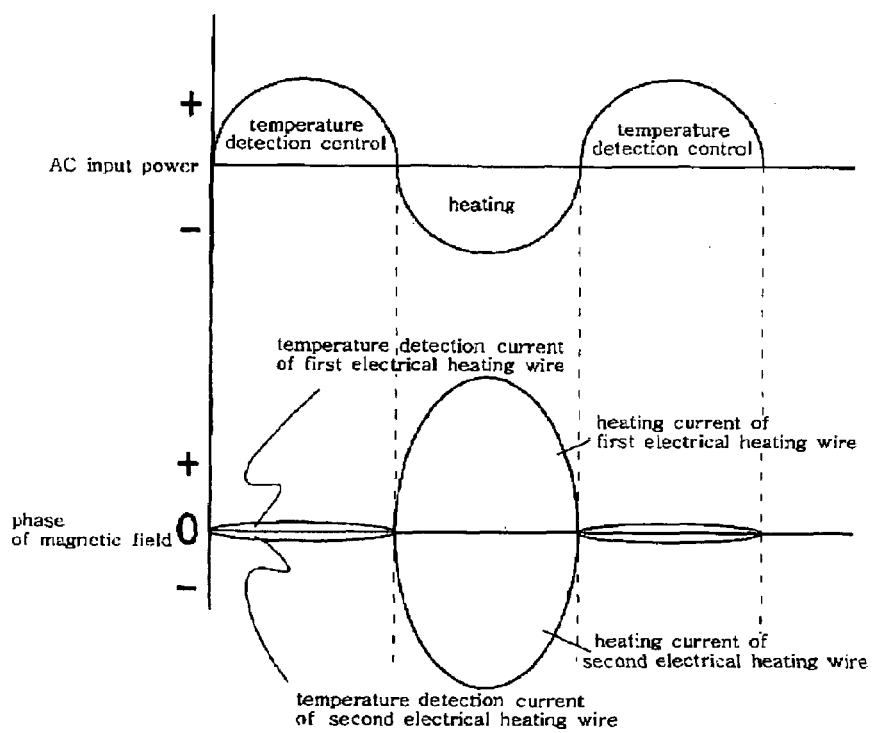
FIG. 6 is a diagram illustrating the temperature detection and heating operations of the heating cable and a non-magnetic field forming operation based on AC power input.

FIG. 3 is an equivalent circuit diagram illustrating the temperature detection operation and the current flow in the construction of FIG. 1, and FIG. 4 is an equivalent circuit diagram illustrating the heating operation and the current flow in the construction shown in FIG. 1. FIG. 5 is a graph illustrating the characteristics of the thermistor in which a resistance value varies with temperature, and the characteristics of the heating cable used in the temperature controller of the present invention, and FIG. 6 is a diagram illustrating the temperature detection and heating operations of the heating cable and a non-magnetic field forming operation based on AC power input.

Although not illustrated in the embodiment of the present invention, the heating current U-turn rectifier 18, or both the heating current U-turn rectifier 18 and the control rectifier 19, may be implemented so as to be turned on by the trigger signal. At this time, it is preferred that the heating current U-turn rectifier 18 and the control rectifier 19 all be SCRs.

Figure 7:
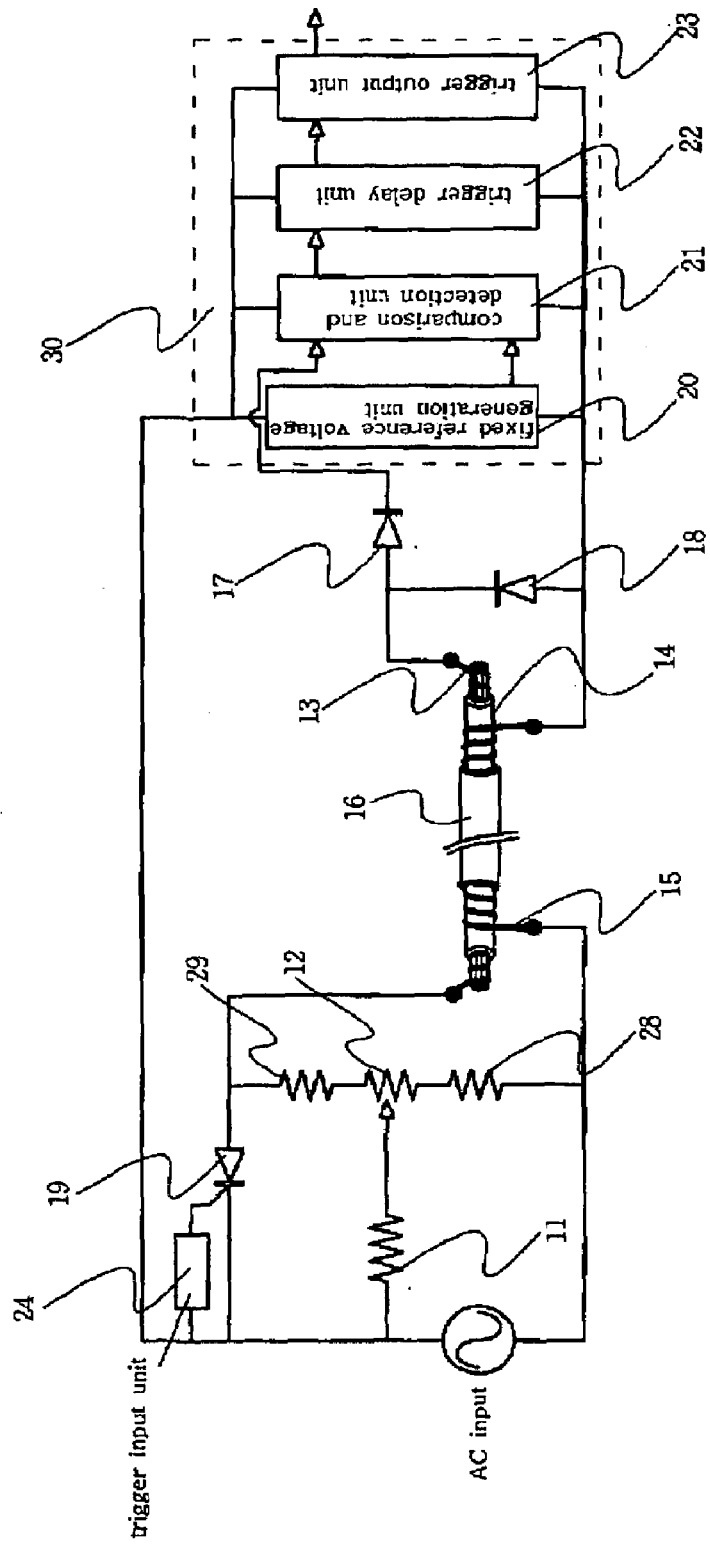
FIG. 7 is a diagram illustrating the construction of another embodiment in which the matching of the heating cable input impedance to the temperature voltage control unit is improved.

In another embodiment of the present invention, the matching of the heating cable input impedance to the temperature voltage control unit can be improved, as in the construction of FIG. 7. In the case of FIG. 1, it is difficult to find the zero voltage and a variable resistance value must be large at the time of temperature detection. When construction is made as in FIG. 7, it is easy to find the zero voltage, so that it is easy to adjust the size of the voltage.

Figure 8:
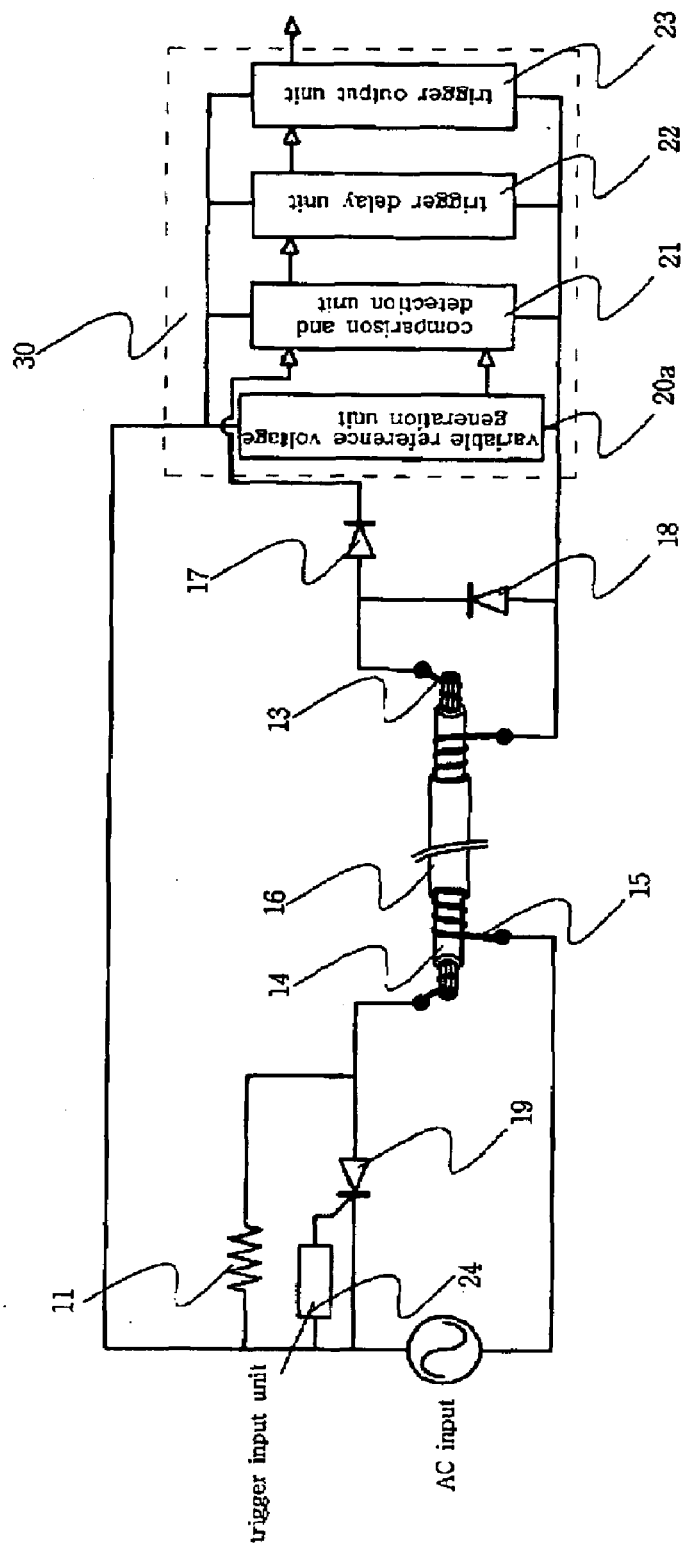
FIG. 8 is a diagram illustrating construction of an embodiment constructed such that the supply of a temperature voltage is fixed and a temperature control unit varies a reference value to control temperature.

In still another embodiment, the temperature detection variable resistor 12 of FIG. 1 may be implemented as a variable reference voltage generation unit 20a, as illustrated in FIG. 8. The resistor 11 can fix a voltage applied to the first electrical heating wire 13, and the variable reference voltage generation unit 20a can set a reference temperature in a variable fashion. Accordingly, temperature can be adjusted using the variable reference voltage generation unit 20a.

Figure 9:
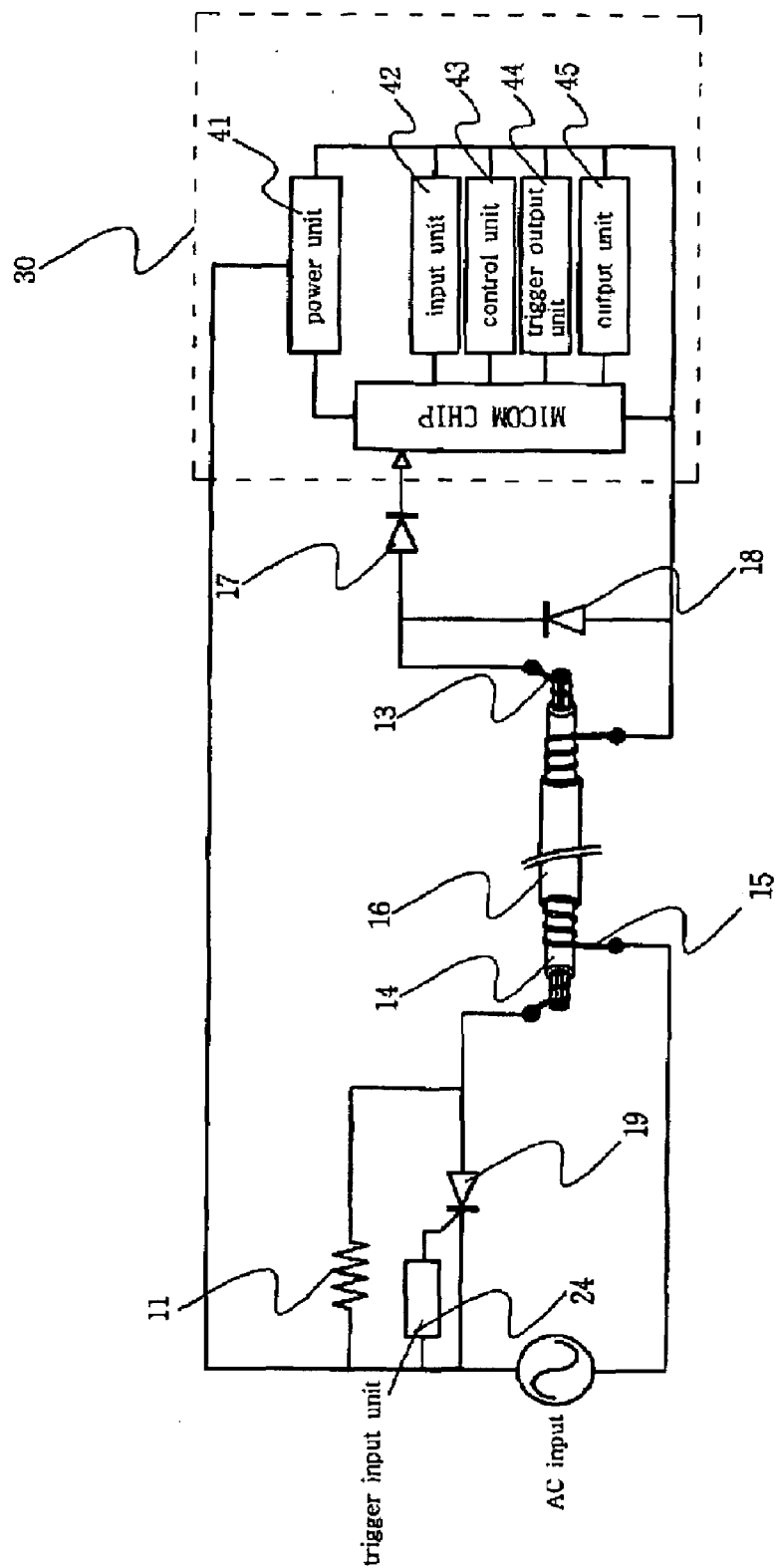
FIG. 9 is a diagram illustrating the construction of another embodiment in which the temperature control unit is implemented using a microcomputer for inputting and outputting analog signals.

FIG. 9 is a diagram illustrating the construction of another embodiment in which the temperature control unit is implemented using a microcomputer for inputting and outputting analog signals. Referring to FIG. 9, the temperature control unit 30 includes a power unit 41, an input unit 42 for setting a reference voltage and delay time, a control unit 43 for performing control such that a trigger signal is delayed by the set delay time if a temperature voltage output from the temperature voltage detection rectifier 17 is higher than the reference voltage, a trigger output unit 44 for outputting a trigger signal under the control of the control unit 43, and an output unit 45 for outputting the reference voltage and the delay time under the control of the control unit 43.

Figure 10:
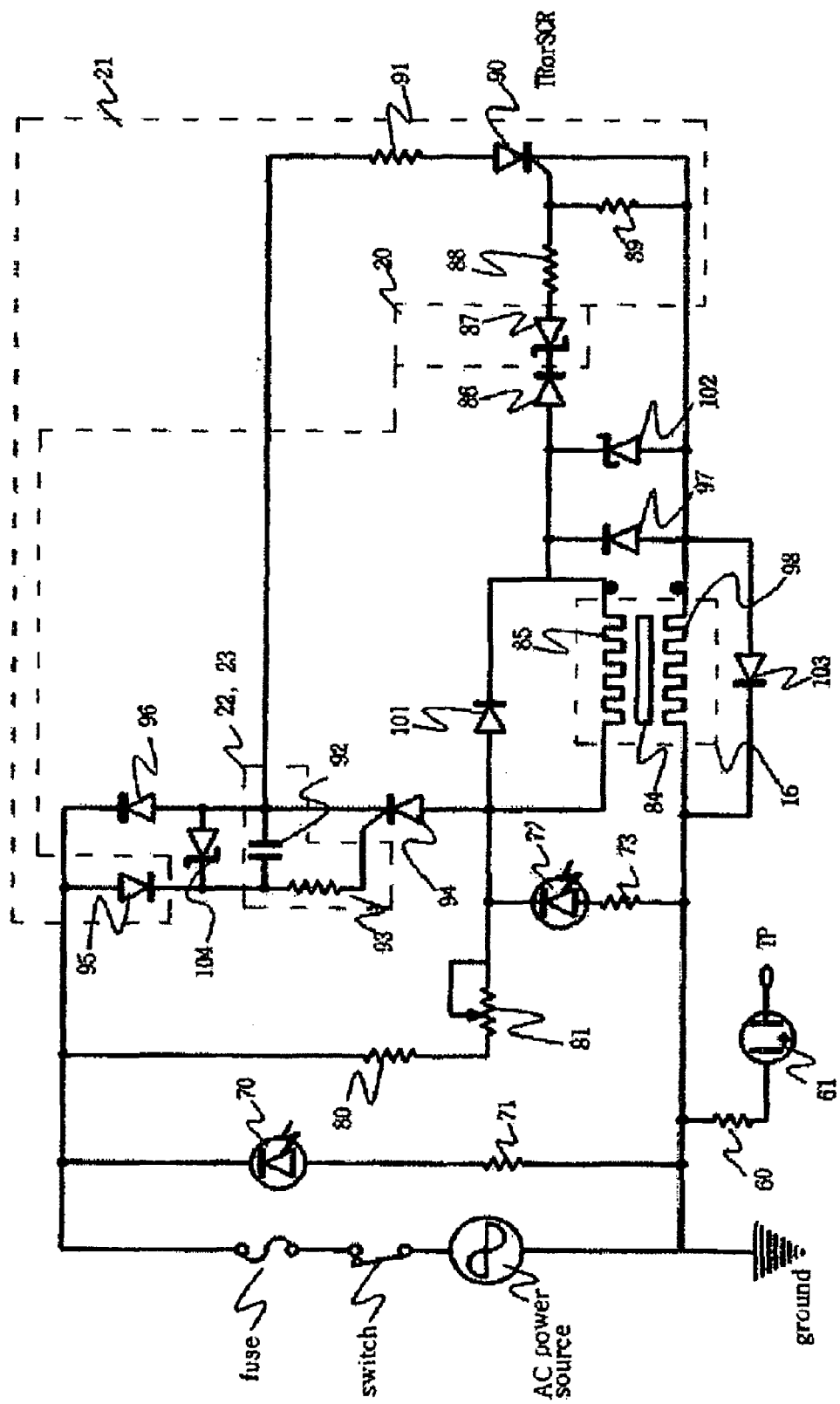
FIG. 10 is a circuit diagram of an embodiment in which the construction of FIG. 1 is actually implemented.
Figure 11:
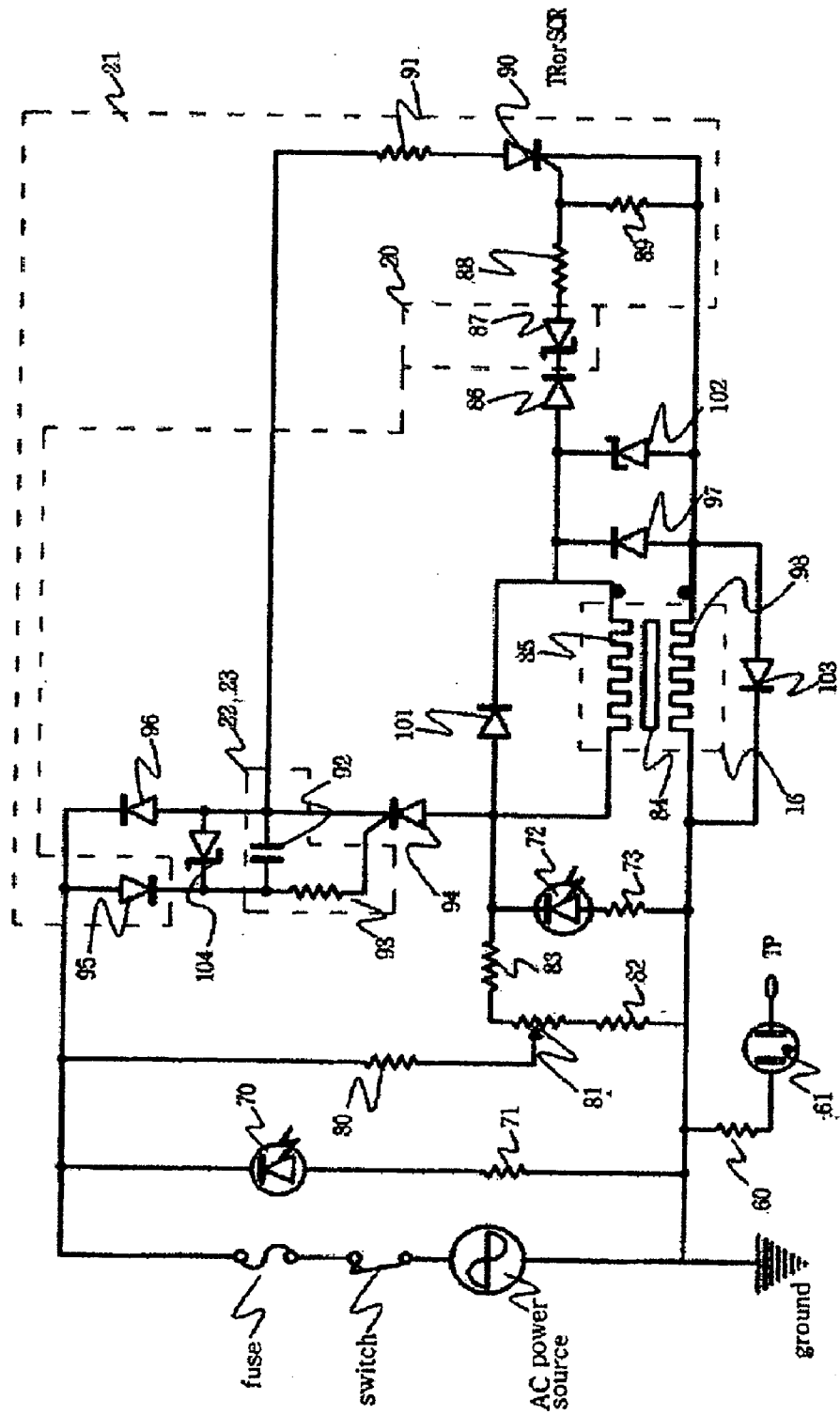
FIG. 11 is a circuit diagram in which the construction of FIG. 7 is actually implemented.

FIG. 10 is a circuit diagram of an embodiment in which the construction of FIG. 1 is actually implemented, and FIG. 11 is a circuit diagram in which the construction of FIG. 7 is actually implemented. Referring to FIGS. 10 and 11, functions of preventing the excessive heating of a heating cable due to a short circuit and blocking the surface electrical field of the heating cable are added. For reference, an LED 70 and a resistor 71 constitute a power indication lamp, and an LED 72 and a resistor 73 constitute a heating indication lamp.

In the present embodiment, the temperature control unit 30 of FIG. 1 includes a discharge resistor 93 connected in series to the gate of the control rectifier 94, a rectifier diode 95 connected in series to the discharge resistor 93, a condenser 92 connected in parallel between the gate bias resistor 93 and the rectifier diode 95, a comparison zener diode 87 and a gate excessive input limit resistor 88, an SCR 90 whose anode is connected to the condenser 92 and whose gate is connected to the gate excessive input limit resistor 88, an SCR gate bias resistor 89 connected in parallel between the gate excessive input limit resistor 88 and the gate of the SCR 90, and a charging current limit resistor 91 connected between the anode of the SCR 90 and the condenser 92.

A reverse overcurrent protection device includes a first diode 101, a zener diode 102, and a second diode 103. The first diode 101 is in parallel to the first electrical heating wire 85 in the direction reverse to the direction of a heating current. That is, an anode is connected to the anode of the control rectifier 94 and a cathode is connected to the cathode of the heating current U-turn rectifier 97. The zener diode 102 is in parallel to the heating current U-turn rectifier 97. Furthermore, the second diode 103 is connected in parallel to the second electrical heating wire 98 in the direction reverse to the direction of the heating current. That is, an anode is connected to the anode of the zener diode 102 and a cathode is connected to the other end of the second electrical heating wire 98.

When the control rectifier 94 is short-circuited, a reverse overcurrent flows through a diode 95, a gate protection zener diode 104, a diode 101, a gate protection zener diode 102 and a diode 103. The circuit can be protected from overheating in such a way that overcurrent cuts a fuse.

Meanwhile, if a heating cable, in which a tape-shaped copper film having a specific width is spirally wound around a conducting wire, is used instead of a general lead wire as the second electrical heating wire 98 having a resistance value, it is not necessary to control reverse overcurrent using a separate safety device. The reason for this is that the copper film has a small resistance value, so that reverse overcurrent does not occur at the two ends of a lead.

Accordingly, as illustrated in FIGS. 16 to 19, even though there is no second diode 103 for detecting reverse overcurrent, the circuit can be protected in such a way that the reverse overcurrent cuts the fuse. Meanwhile, the second electrical heating wire 98 has a small resistance value, so that it mainly performs a shielding function rather than a heating function. Accordingly, the gate protection zener diode 102 is a core functional element that performs two functions, including the function of causing reverse overcurrent to flow as well as the function of orienting a non-magnetic current to flow.

Meanwhile, a surface electrical field prevention unit includes ground lighting indicators 60 and 61 connected to one end of the grounded second electrical heating wire and an inspection test point TP for preventing the surface electric field by setting the ground lighting indicators at a turned-off position.

The ground lighting indicators 60 and 61 each include a resistor 60 and a neon tube plate 61 that are connected in series to each other.

When the inspection test point TP is set at a position where the ground lighting indicators each including the resistor 60 and the neon tube plate 61 are turned off, a second electrical heating wire 98 wound around the outer surface of a heating wire is grounded, so that the surface electric field of the heating cable is at zero potential. Accordingly, the surface electric field of the heating cable is prevented.

Figure 12:
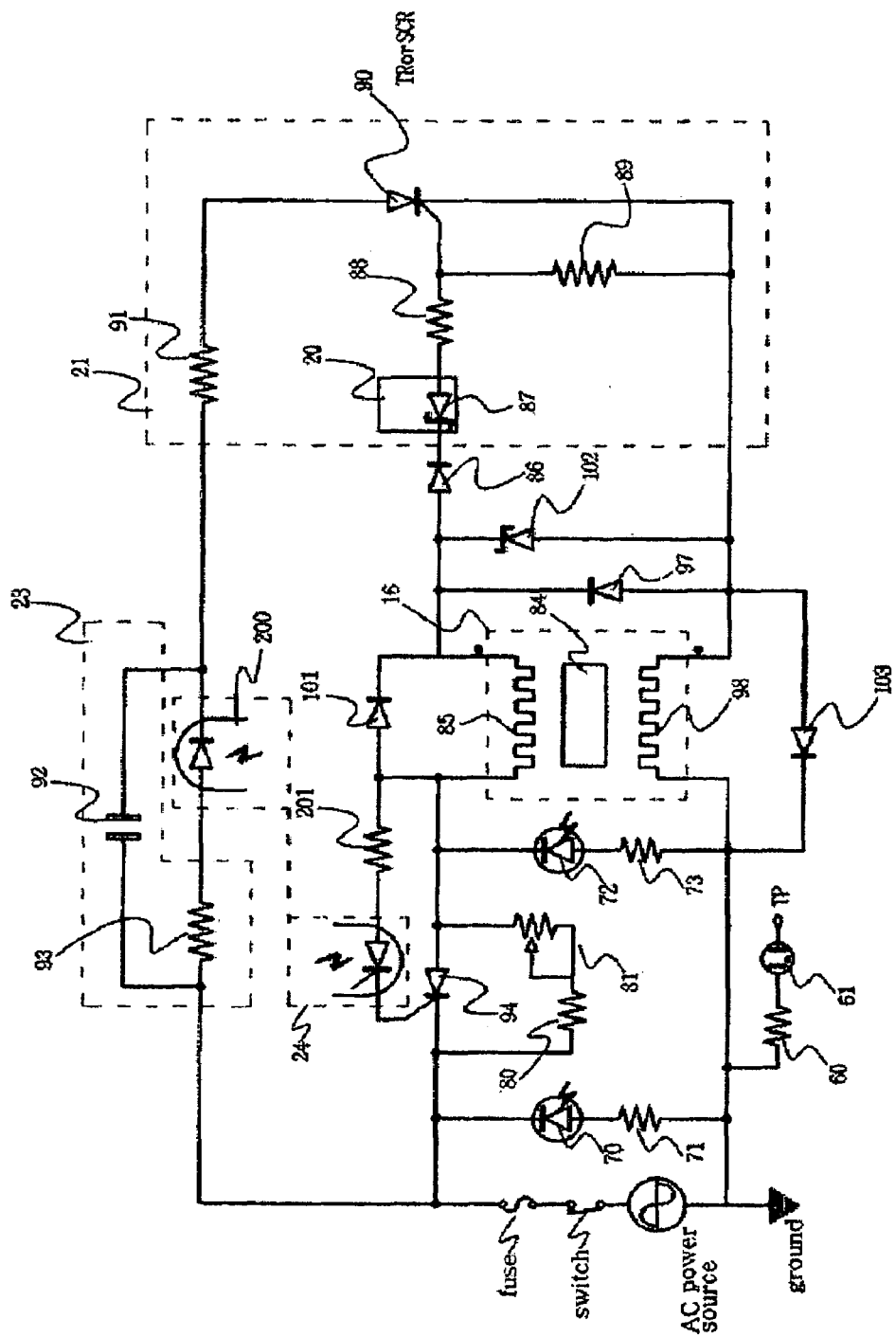
FIG. 12 is a circuit diagram in which the gate trigger part is separated from the control rectifier of FIG. 10 and is implemented using a photocouple Silicon Controlled Rectifier (SCR)
Figure 13:
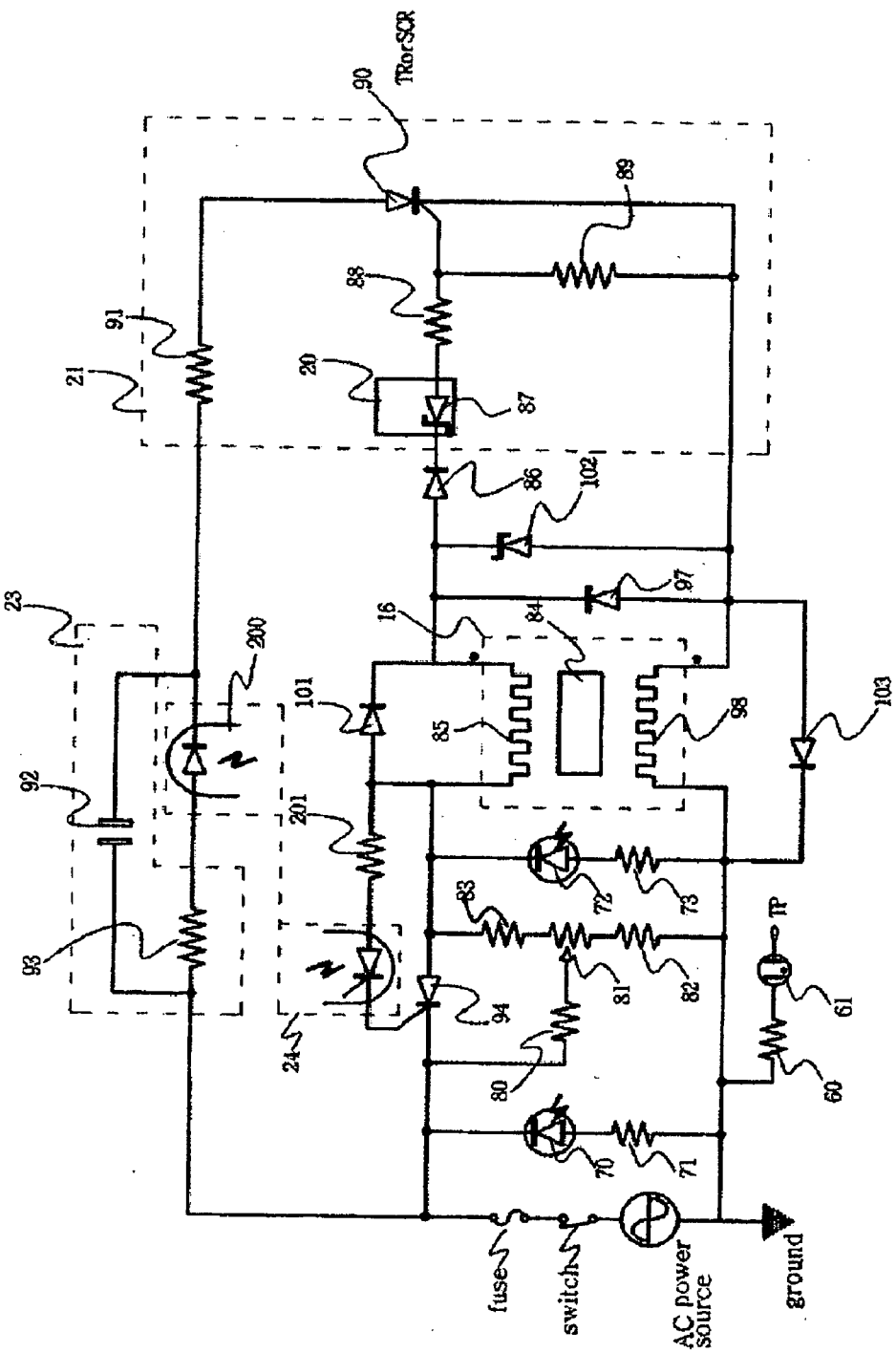
FIG. 13 is a circuit diagram in which the gate trigger part is separated from the control rectifier of FIG. 11 and is implemented using a photocouple SCR.

FIG. 12 is a circuit diagram in which the gate trigger part is separated from the control rectifier of FIG. 10 and is implemented using a photocouple SCR 200, and FIG. 13 is a circuit diagram in which the gate trigger part is separated from the control rectifier of FIG. 11 and is implemented using a photocouple SCR 200. In order to insulate a trigger signal input to the control rectifier 94 from an external signal, the control rectifier is implemented using the photocouple SCR 200.

Figure 14:
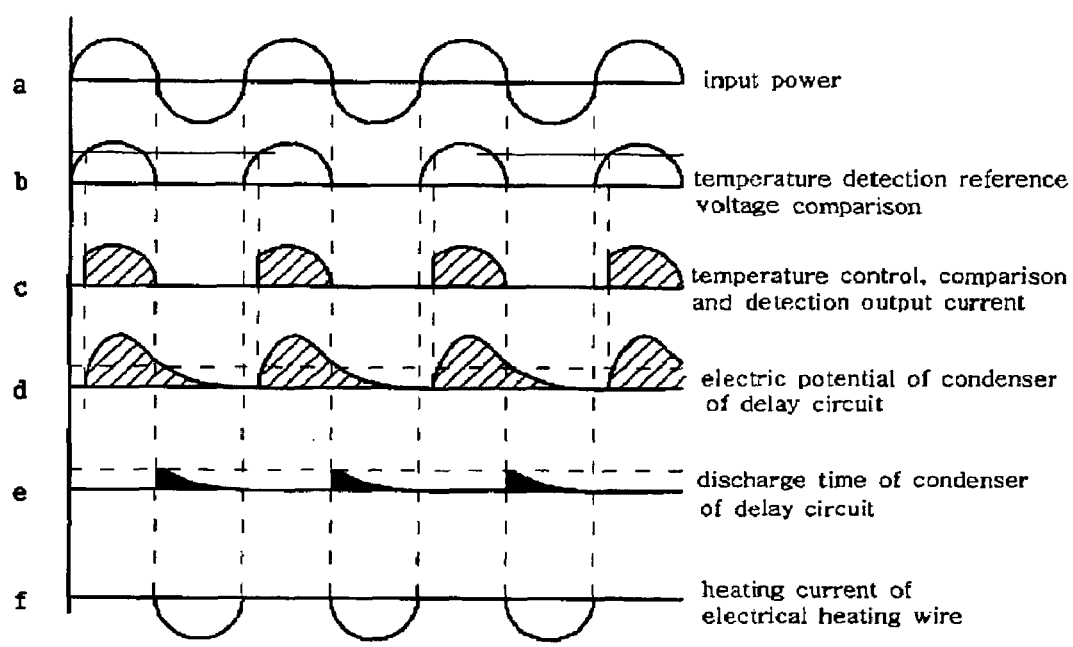
FIG. 14 is a diagram illustrating the actual operating waveforms of the embodiments illustrated in FIGS. 11 to 13.
Figure 15:
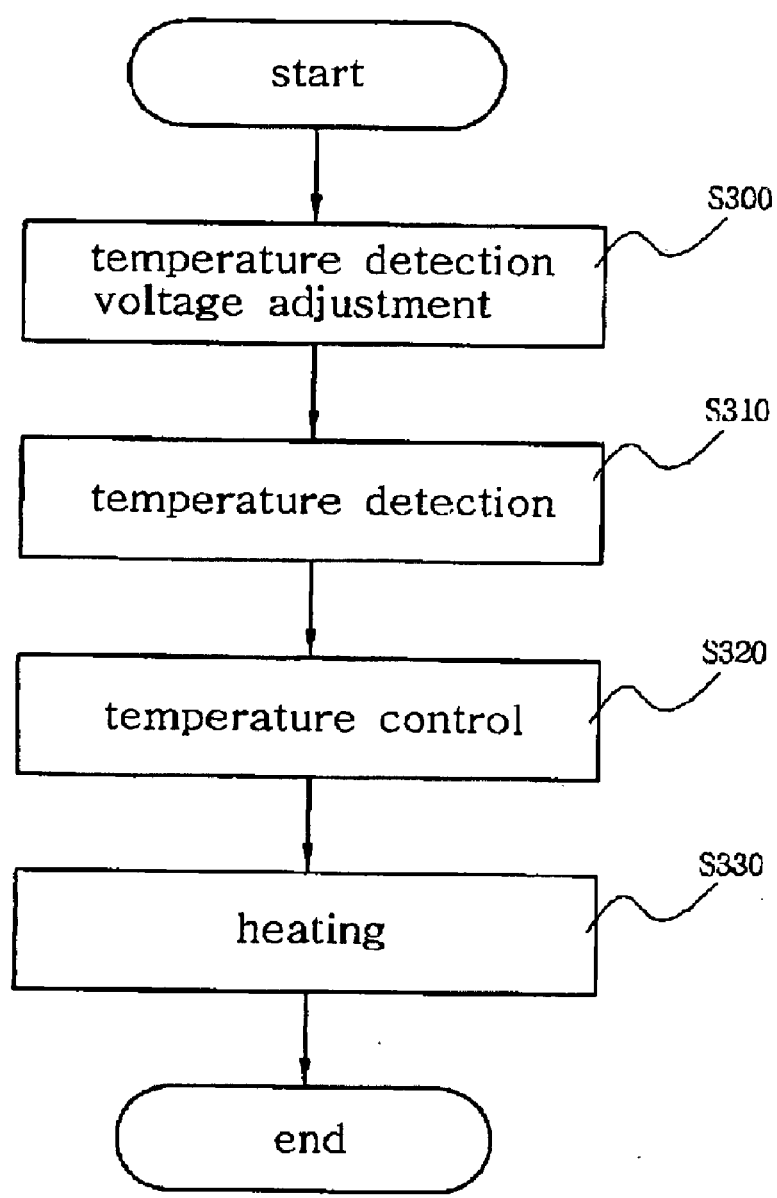
FIG. 15 is a flowchart illustrating a method of controlling the temperature of the heating cable in a non-magnetic field fashion in accordance with the present invention.
Figure 16:
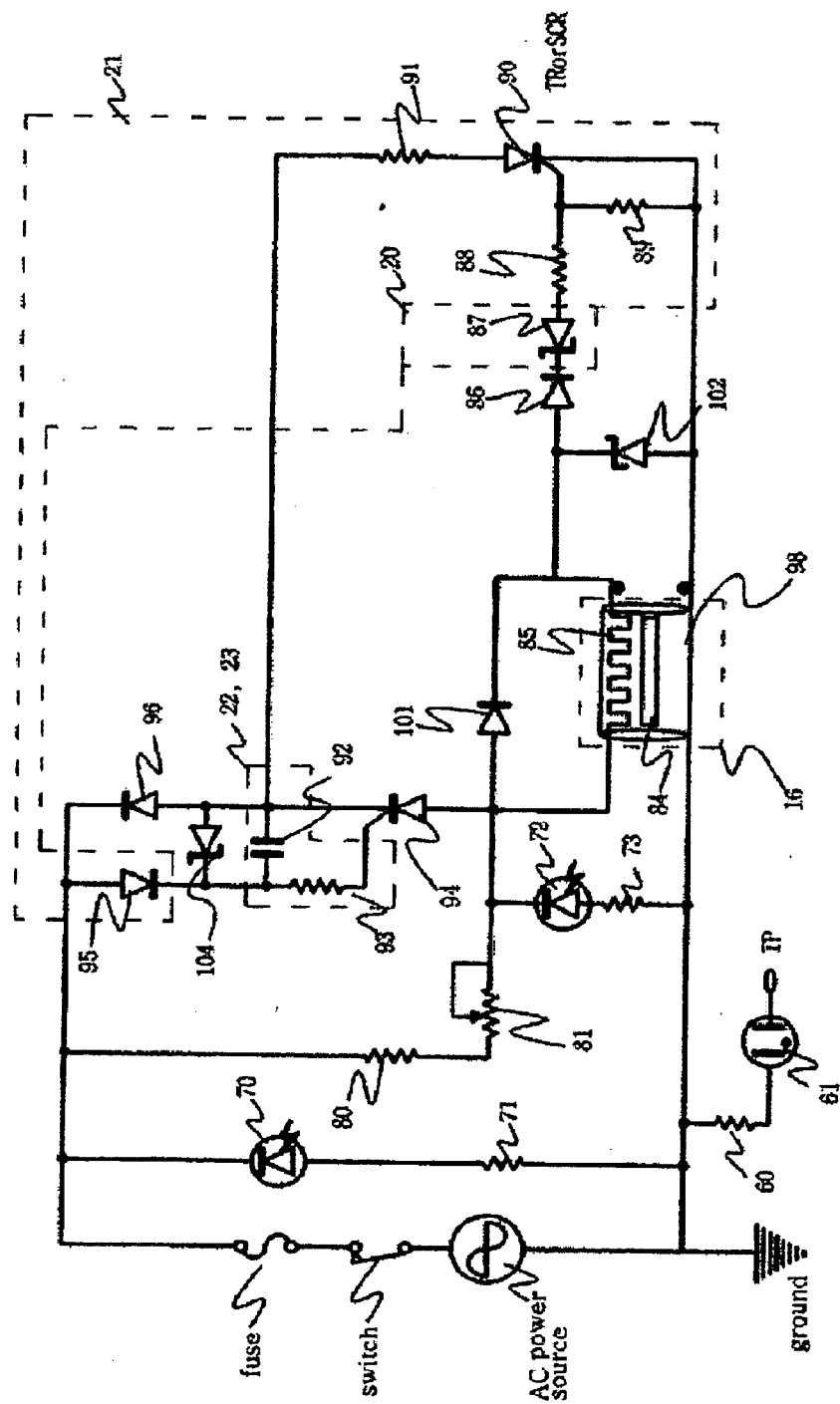
FIGS. 16 to 19 are diagrams of the variants of the circuits of FIGS. 10 to 13.
Figure 17:
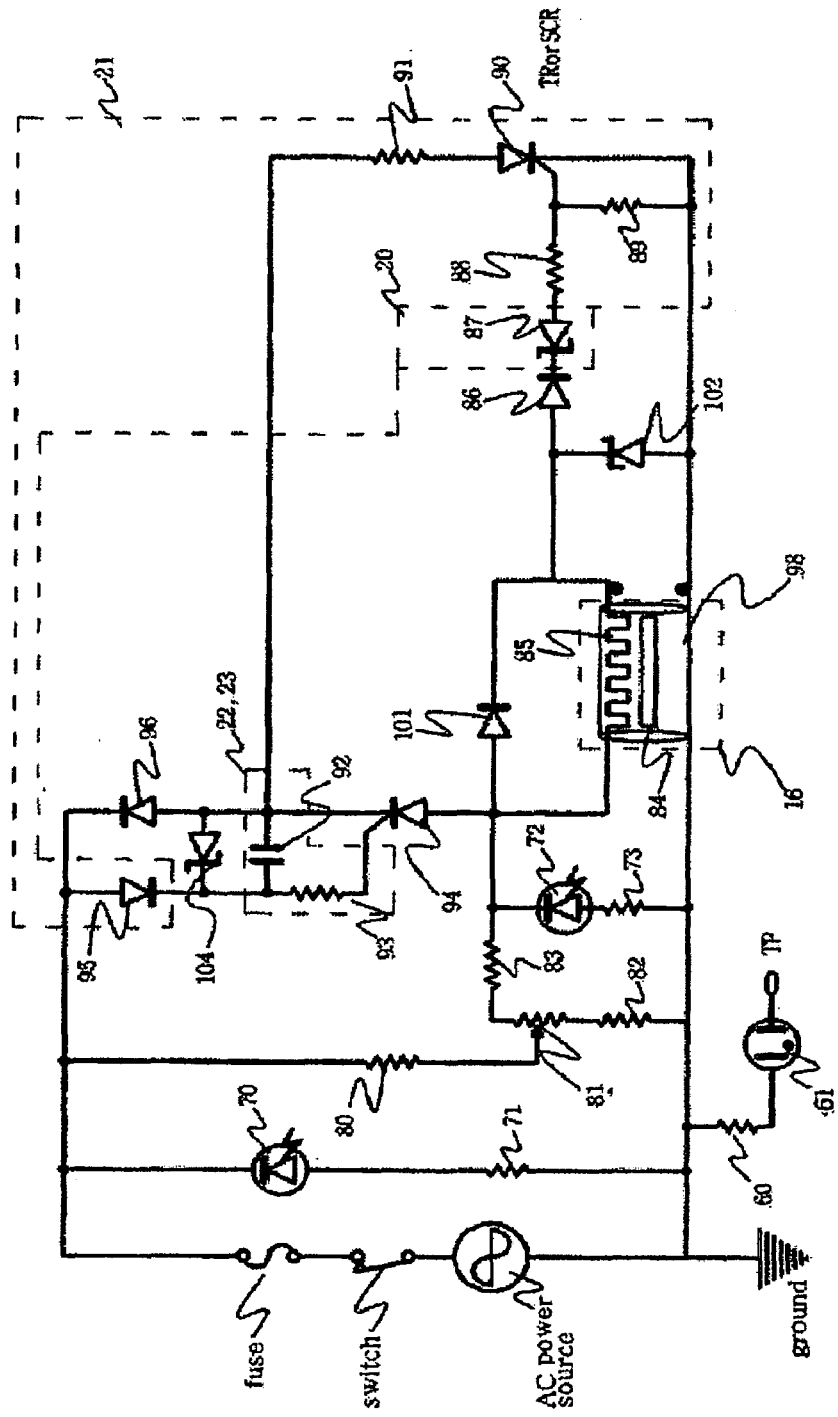
Figure 18:
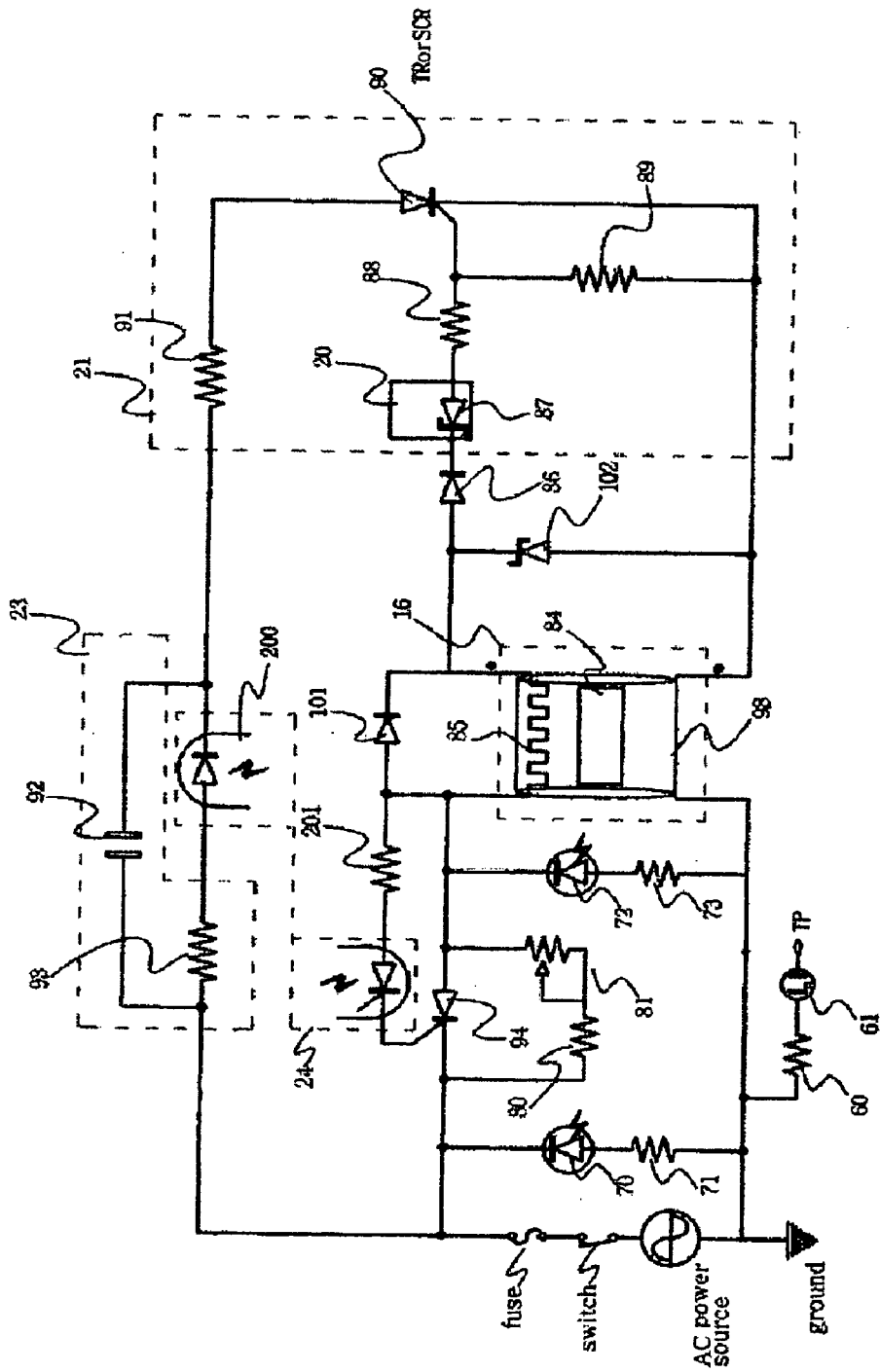
Figure 19:
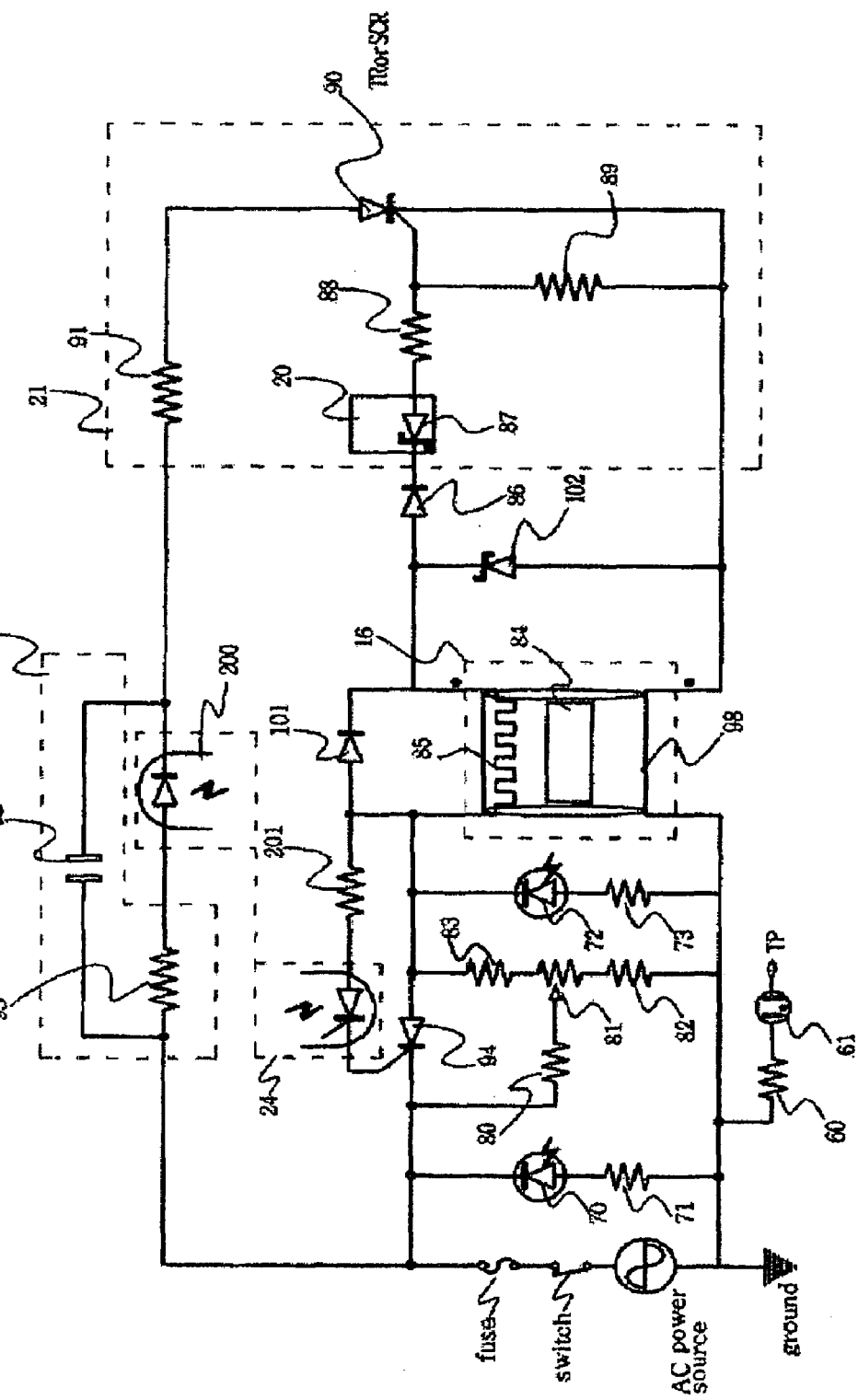

FIG. 14 is a diagram illustrating the actual operating waveforms of the embodiments illustrated in FIGS. 11 to 13, and FIG. 15 is a flowchart illustrating a method of controlling the temperature of the heating cable in a non-magnetic field fashion in accordance with the present invention.

The present invention includes a temperature detection step S310 of detecting a temperature voltage output from the first electrical heating wire opposite the heating wire whose one end is connected to the power source, a temperature control step S320 of outputting a control signal if the temperature voltage is higher than the reference voltage, and a heating step S330 in which a current flows from the opposite end of the second electrical heating wire connected to the power source through both ends of the first electrical heating wire toward the power source when conduction is achieved by the control signal. Furthermore, the present invention further includes a step S300 of controlling a temperature detection voltage applied to one end of the first electrical heating wire.

Although not illustrated, the temperature control step S320 includes the step of outputting the reference voltage, the step of comparing the temperature voltage with the reference voltage and outputting the drive voltage if the temperature voltage is higher than the reference voltage, the step of being driven by the drive signal and delaying the trigger signal by a predetermined period, and the step of outputting the trigger signal for the delay time.

In the present invention constructed as described above, the steps of performing heating and temperature detection in a non-magnetic fashion are described in detail with reference to FIGS. 1 to 6 below.

First, the case where power having a positive (+) phase is applied and operation is performed in a temperature detection state, as illustrated in FIG. 6, is described below.

When power having a positive (+) phase is applied, a voltage controlled by the resistor 11 and the temperature detection adjustment variable resistor 12 is applied to the NTC thermistor 14 placed between the first electrical heating wire 13 and the second electrical heating wire 15. The electric potential across both sides of the NTC thermistor 14 (the first electrical heating wire and the second electrical heating wire) is output between the temperature voltage detection rectifier 17 and the second electrical heating wire 15 in temperature voltage form.

The temperature voltage is output in inverse proportion to temperature, and a low operating current below several mA flows at the time of temperature detection. In this case, rectification may be performed by the comparison and detection unit 21 of the temperature control unit 30 even without the temperature voltage detection rectifier 17. In FIG. 5, the impedance variation of the heating wire and the NTC thermistor (nylon 12 series) is illustrated.

Accordingly, the first electrical heating wire 13 and the second electrical heating wire 15 are used as the electrodes of the NTC thermistor 14, and surface temperature across the entire length of the electrical heating wire and local heating on an arbitrary portion of the electrical heating wire are simultaneously output.

The comparison and detection unit 21 compares the temperature voltage output from both ends of the NTC thermistor with the reference voltage output from the fixed reference voltage generation unit 20, and drives the trigger delay unit 22 if the temperature voltage is higher than the reference voltage. The trigger delay unit 22 causes the trigger output unit 23 to delay the trigger signal for a predetermined time, and the trigger output unit 23 outputs the trigger signal for the time by which the trigger delay unit 23 has delayed the trigger signal.

While AC power remains in a positive (+) state, the temperature detection and temperature control operations are completed. A process of heating the heating cable wire in a non-magnetic field (non-induction, non-electromagnetic wave) fashion is as follows.

When negative (−) AC power is applied and the trigger input unit 24 turns on the control rectifier 19, a power current enters the second electrical heating wire 15, and exits from the first electrical heating wire 13 through the heating current U-turn rectifier 18, as shown in FIG. 4. Thereafter, when the current flows through the anode of the control rectifier 19, the heating cable is heated and the value of the current is determined by the internal resistance values of the first electrical heating wire 13 and the second electrical heating wire 15.

Since the impedance of the NTC thermistor 14 decreases when the electrical heating wires are heated, the temperature voltage decreases in the next half-period in which the AC power has a positive (+) phase. Accordingly, in the case where the temperature voltage decreases below the reference voltage, the trigger signal is not output and, therefore, the control rectifier 19 does not operate, so that heating is interrupted.

Since the heating cable repeats the step of performing temperature detection and heating every half-period of the input power, as shown in FIG. 6, it is possible to perform heating after checking whether the heating cable has short-circuited or an abnormality has occurred.

When the current flows through the heating cable 16, the phase of a magnetic field caused by the first electrical heating wire 13 becomes opposite to the phase of a magnetic field caused by the second electrical heating wire 15. Accordingly, since the electromagnetic fields formed in the heating cable cancel each other, the first and second electrical heating wires have no magnetic fields. Accordingly, electromagnetic waves harmful to human bodies are not generated during the repetitive temperature detection and heating.

The case where another embodiment of the present invention is implemented as shown in FIG. 10 or FIG. 11 is taken as an example. FIG. 10 is a circuit diagram of an embodiment in which the construction of FIG. 1 is applied in practice, and FIG. 11 is a circuit diagram of an embodiment in which the construction of FIG. 7 is applied in practice.

An SCR 90 may be replaced with a transistor. When the transistor is employed, the transistor is in danger of being damaged when a signal is low. When there is a high signal, it is preferred that a separate temperature voltage detection rectifier 17 be provided, thus preventing damage. Meanwhile, when the SCR is used, a separate rectifier 17 is not required.

As described in conjunction with FIG. 1, when AC power having a positive (+) phase is applied, a temperature detection circuit operates. Referring to FIG. 10, when power is applied to the first electrical heating wire 85 and second electrical heating wire 98 of the heating cable through the resistor 80 and the temperature detection adjustment variable resistor 81 connected in series to each other, the NTC thermistor 84 outputs a temperature voltage through a rectifier 86. As described above, the rectifier 86 may be omitted when the temperature detection current is low.

The comparison and detection unit 21 compares a temperature voltage with the reference voltage (FIG. 14b) of a zener diode 87, and turns on an SCR 90 through a gate excessive input limit resistor 88 (FIG. 14c) if the temperature voltage is higher than the reference voltage. When the SCR 90 is turned on, a current charges the condenser 92 of a trigger delay unit 22 through a rectifier diode 95 (FIG. 14d), and the size of the charging potential of the condenser 92 is determined by the resistance value of a charging current limit resistor 91.

When temperature detection is completed in the positive (+) half period of the power, heating is performed in the next negative (−) half period. As charges stored in the condenser 92 of the trigger delay unit 22 are discharged (FIG. 14e), the heating starts.

When the charges stored in the condenser 92 trigger the gate of the control rectifier 94 through the discharge resistor 93 of the trigger output unit 23 and, therefore, the control rectifier 94 is turned on, current enters the second electrical heating wire 98. Furthermore, the current exits from the first electrical heating wire 85 through the diode 97 and returns to a power source through a diode 96, so that the heating cable is heated in a non-magnetic field fashion.

Through the above-described process, the heating cable is heated in a non-magnetic field fashion, and the power of the heating operation is determined by the resistance values of the electrical heating wires.

The embodiments of FIGS. 10 and 11 prevent the overheating of the electrical heating wires due to the short circuit of the control rectifier 94 and the overheating of the electrical heating wires due to short circuits of the first electrical heating wire 85 and the second electrical heating wire 98.

When the control rectifier 94 is short-circuited, a reverse overcurrent flows through a rectifier diode 95, a gate protection zener diode 104, a diode 101, a gate protection zener diode 102 and a diode 103. Then, the circuit can be protected from overheating in such a way that a fuse is cut by the overcurrent.

Meanwhile, if the first electrical heating wire 85 and the second electrical heating wire 98 are short-circuited with each other, a temperature signal detection voltage becomes a zero potential. Accordingly, the comparison and detection unit 21 does not output a trigger signal, so that a heating operation is not performed, thereby protecting the circuit from overheating.

Meanwhile, an inspection test point TP connected to the second electrical heating wire 98 is a circuit that grounds the second electrical heating wire 98 wound on the outer surface of the heating cable. The inspection test point TP is put at a position in which a ground lighting indicator including a resistor 60 and a neon tube plate 61 is not lit. Then, the second electrical heating wire 98 is grounded and, therefore, the surface electric field of the heating cable becomes a zero potential, so that the surface electric field of the heating cable is prevented.

In further embodiments of the present invention, the temperature controller may be implemented, as shown in FIGS. 12 and 13. In these embodiments, a gate trigger part is separated from a control rectifier 94 and is implemented using a photocouple SCR 200.

The light emission side of the photocouple SCR 200 is connected in series to a discharge resistor 93, and the reception side of the photocouple SCR 200 is connected in series to a trigger resistor 201 between the gate and anode of the control rectifier 94.

The gate trigger of the control rectifier 94 is turned on by a current supplied through the resistor 201 and photocouple SCR 200, and the direction of an operating current, temperature detection and safety protection are the same as in FIGS. 10 and 11.

Figure 20:
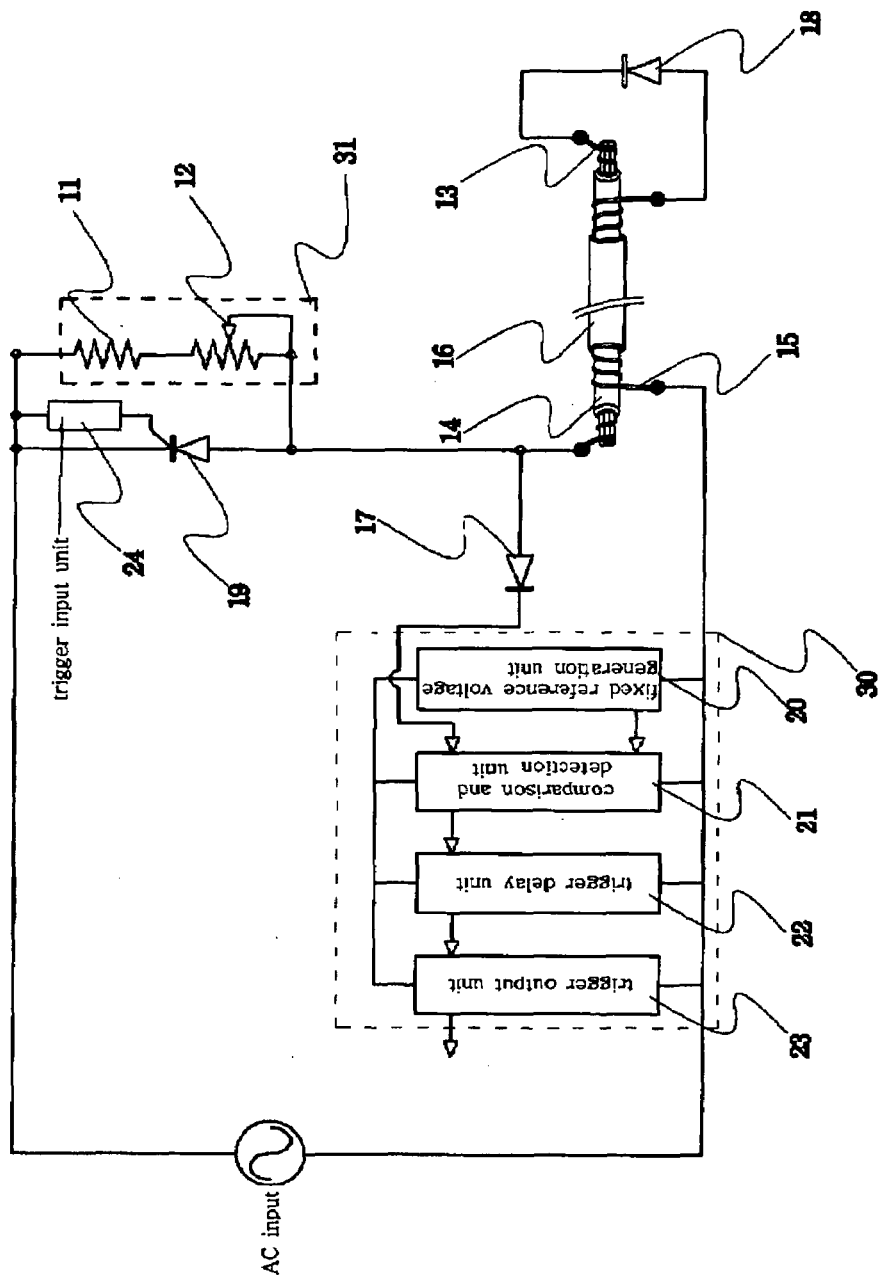
FIG. 20 is a diagram illustrating the construction of one embodiment in which the construction of FIG. 1 is applied.
Figure 21:
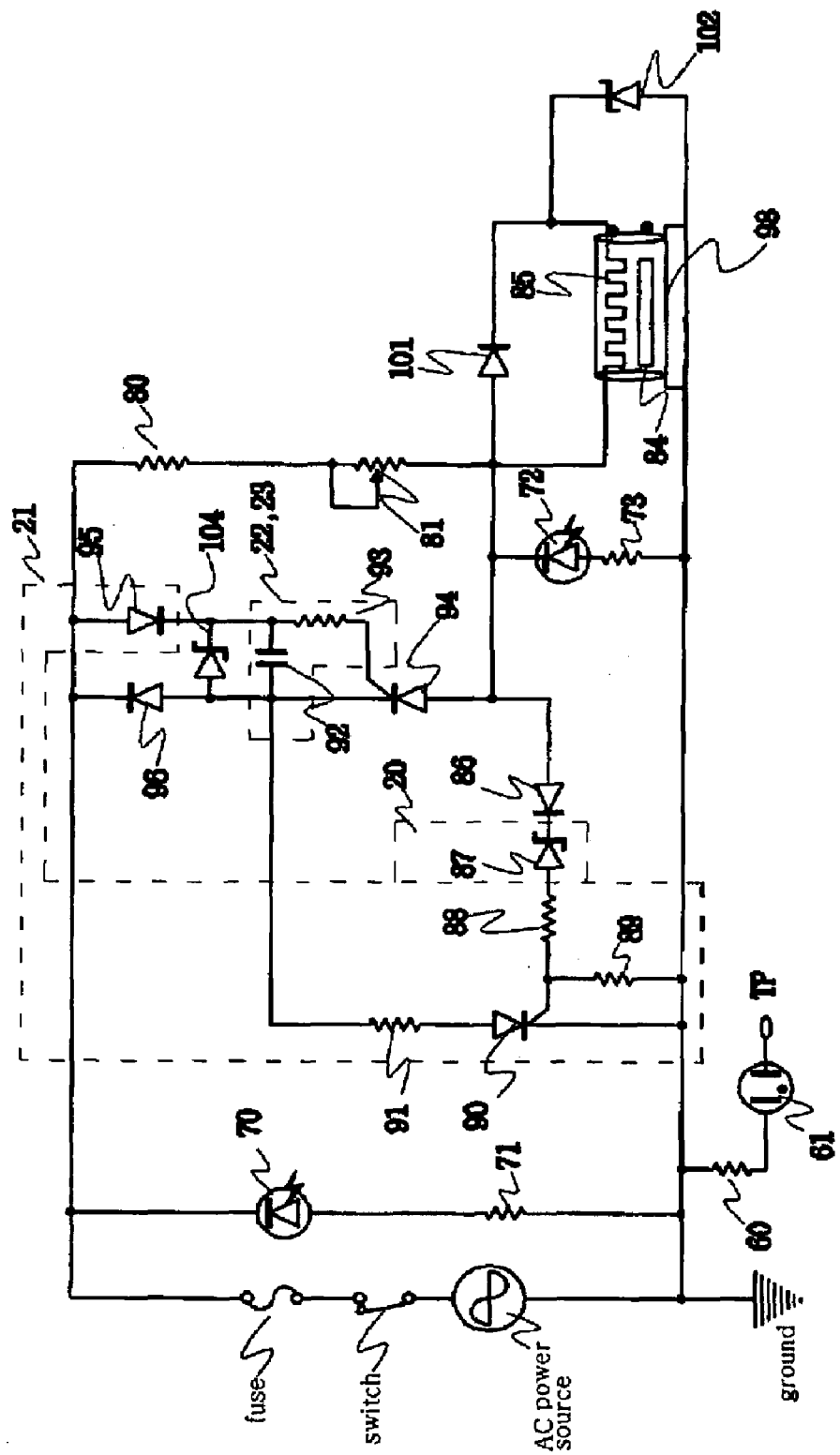
FIG. 21 is a circuit diagram of the construction of FIG. 20.
Figure 22:
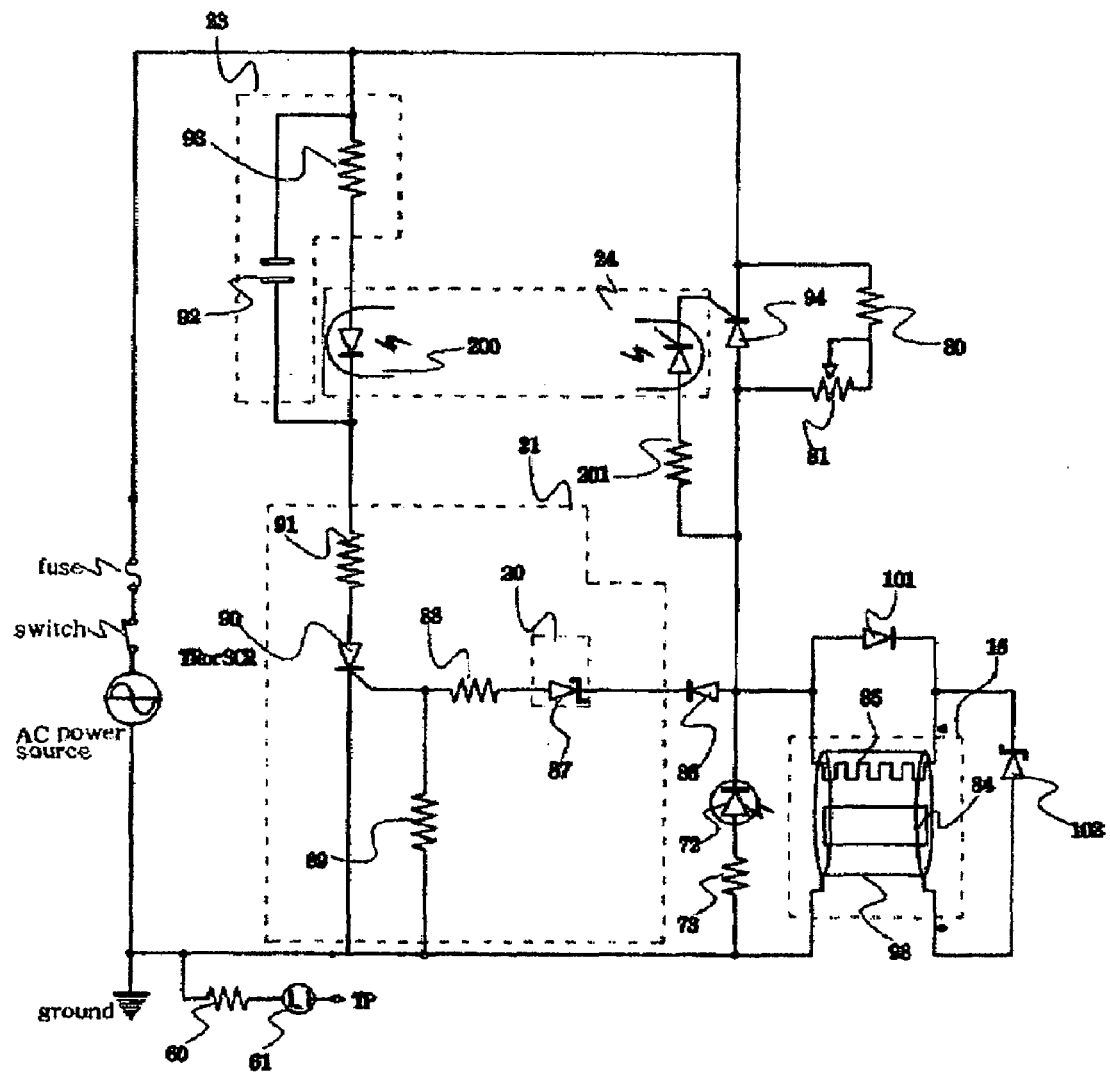
FIG. 22 is a circuit diagram in which a gate trigger part is separated from a control rectifier in the circuit diagram of FIG. 21 and is implemented using a photocouple SCR.
Figure 23:
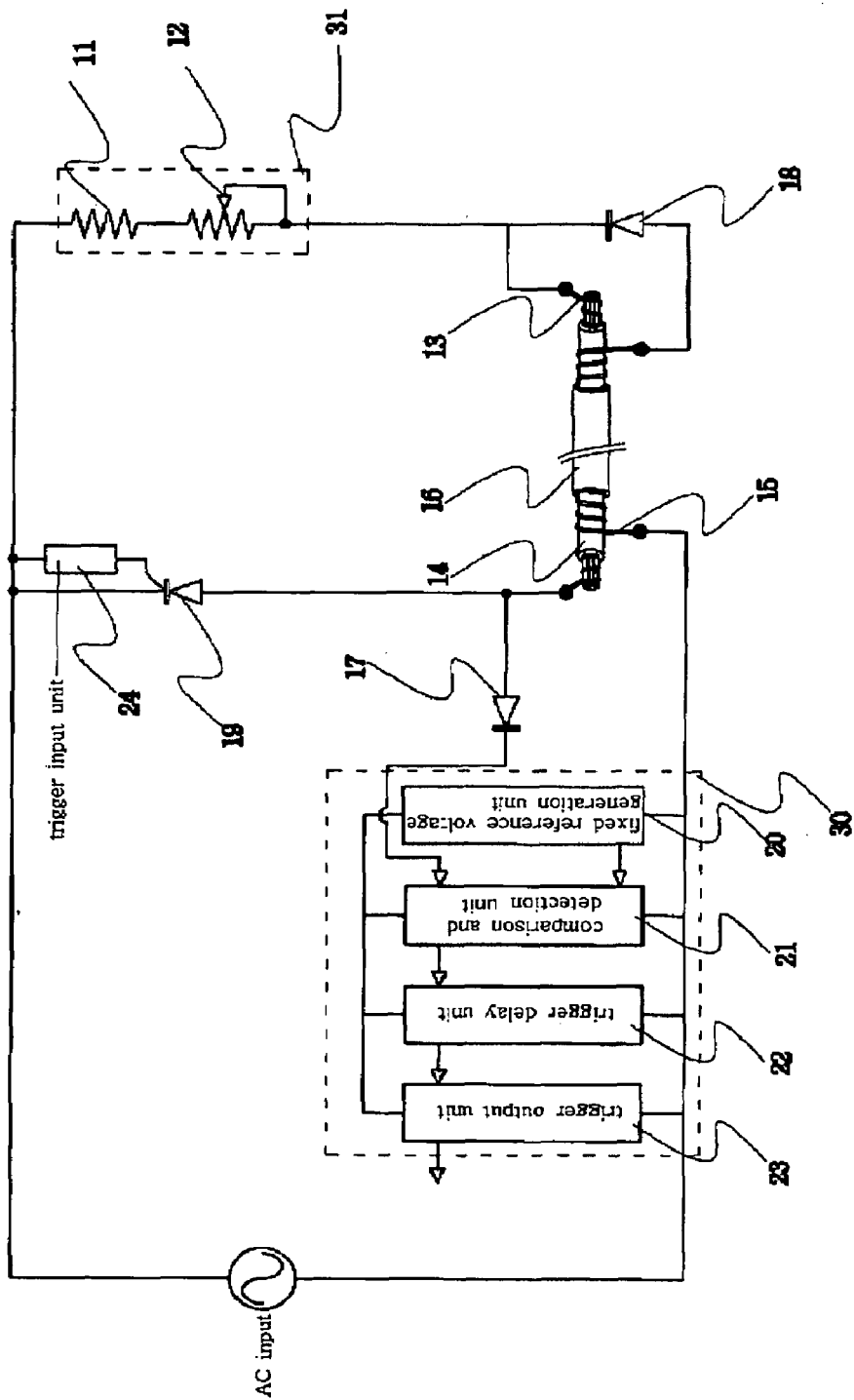
FIG. 23 is a diagram illustrating the construction of another embodiment in which the construction of FIG. 1 is applied.
Figure 24:
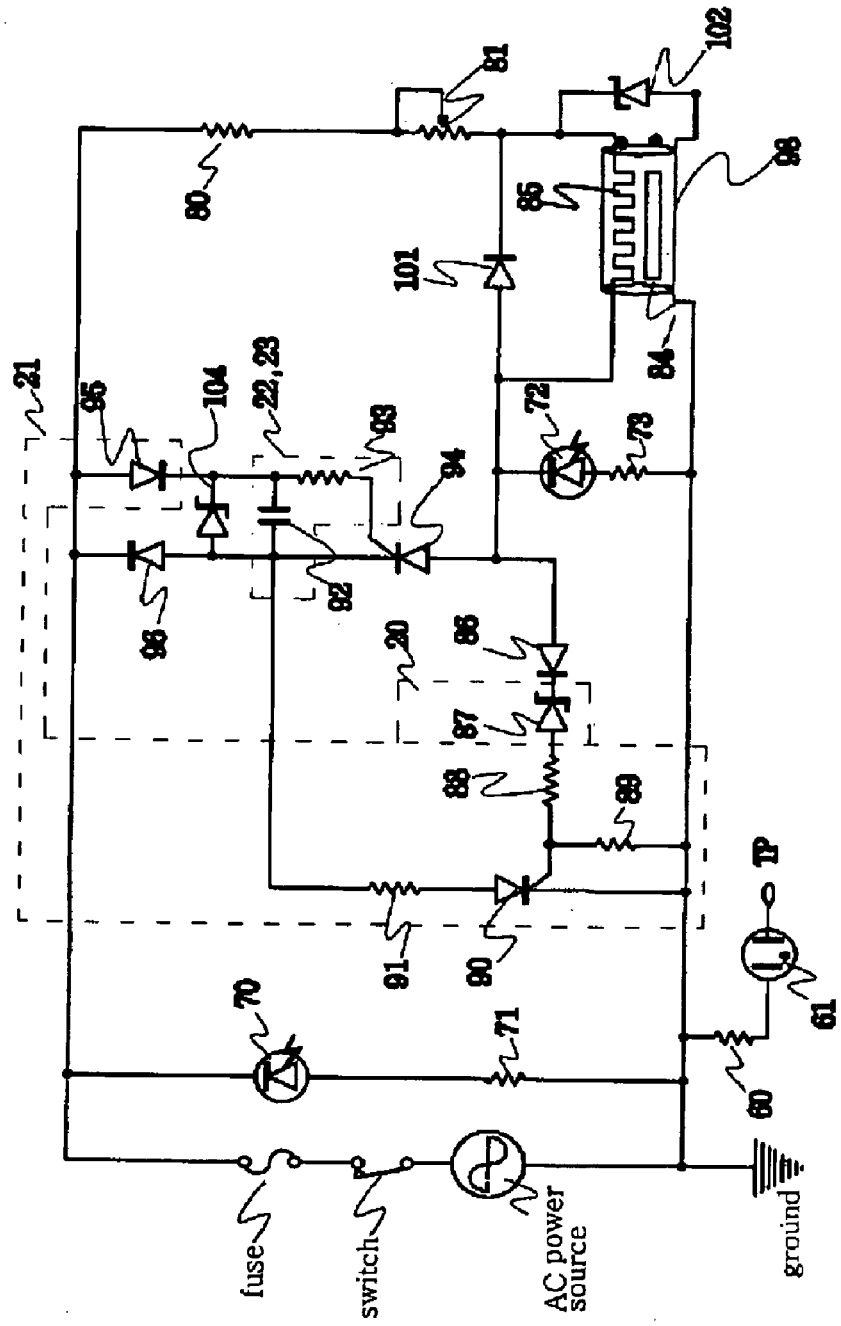
FIG. 24 is a circuit diagram of the construction of FIG. 23.
Figure 25:
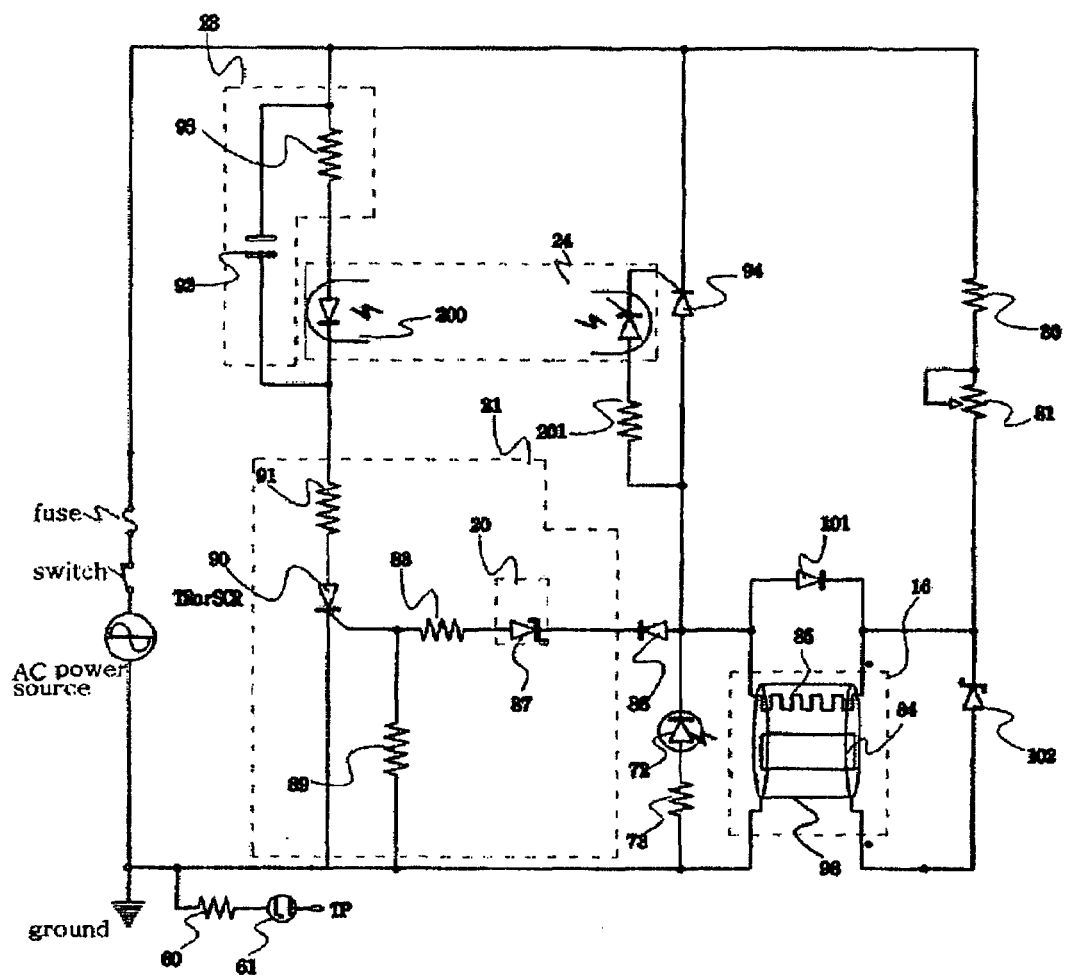
FIG. 25 is a circuit diagram in which a gate trigger part is separated from a control rectifier in the circuit diagram of FIG. 24 and is implemented using a photocouple SCR.

Meanwhile, FIG. 20 is a diagram illustrating the construction of an embodiment to which the construction of FIG. 1 is applied, FIG. 21 is a circuit diagram of the construction of FIG. 20, FIG. 22 is a circuit diagram in which the gate trigger part is separated from the control rectifier in the circuit diagram of FIG. 21 and is implemented using a photocouple SCR. FIG. 23 is a diagram illustrating the construction of another embodiment to which the construction of FIG. 1 is applied, FIG. 24 is a circuit diagram of the construction of FIG. 23, and FIG. 25 is a circuit diagram in which the gate trigger part is separated from the control rectifier in the circuit diagram of FIG. 24 and is implemented using a photocouple SCR. The above-described construction relates to a variant embodiment in which the temperature control unit 30 of FIG. 1 is formed on the power source side end of a heating cable. The other constructions and combinations are the same as those of FIGS. 1, 10 and 12. The constructions illustrated in FIGS. 20 and 23 are embodiments that indicate that the location of a temperature voltage regulation unit 31 may be variously determined according to selection.

Figure 26:
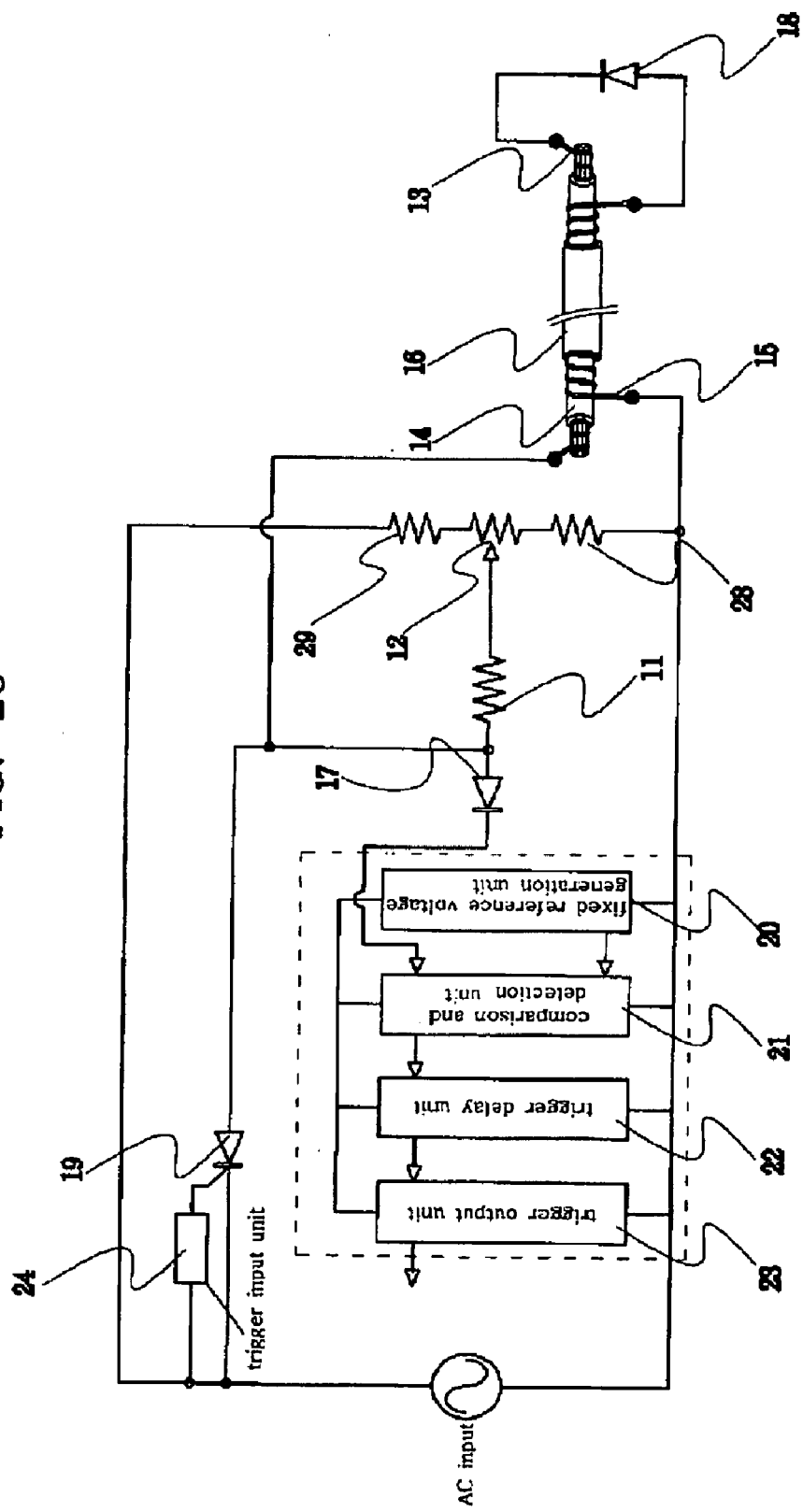
FIG. 26 is a diagram illustrating the construction of an embodiment in which the construction of FIG. 7 is applied.
Figure 27:
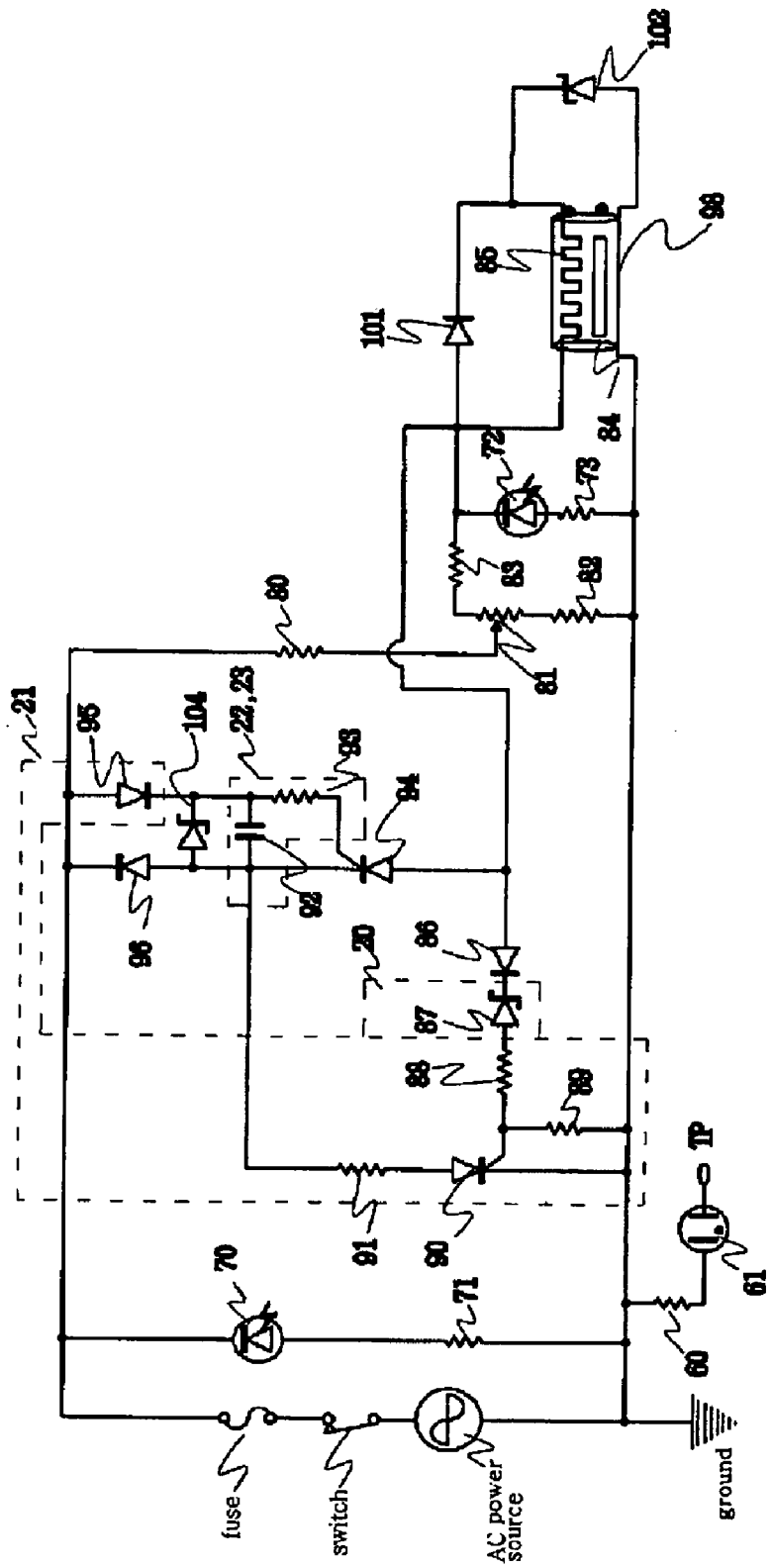
FIG. 27 is a circuit diagram of the construction of FIG. 26.
Figure 28:
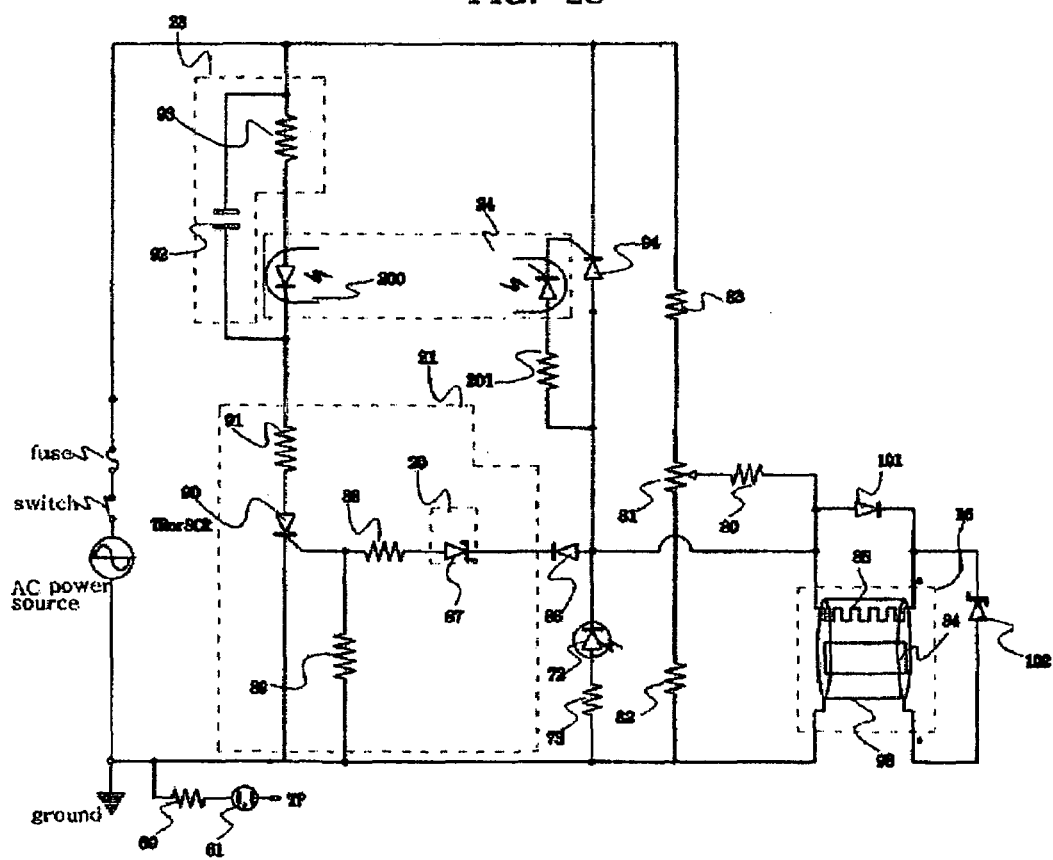
FIG. 28 is a circuit diagram in which a gate trigger part is separated from a control rectifier in the circuit diagram of FIG. 27 and is implemented using a photocouple SCR.
Figure 29:
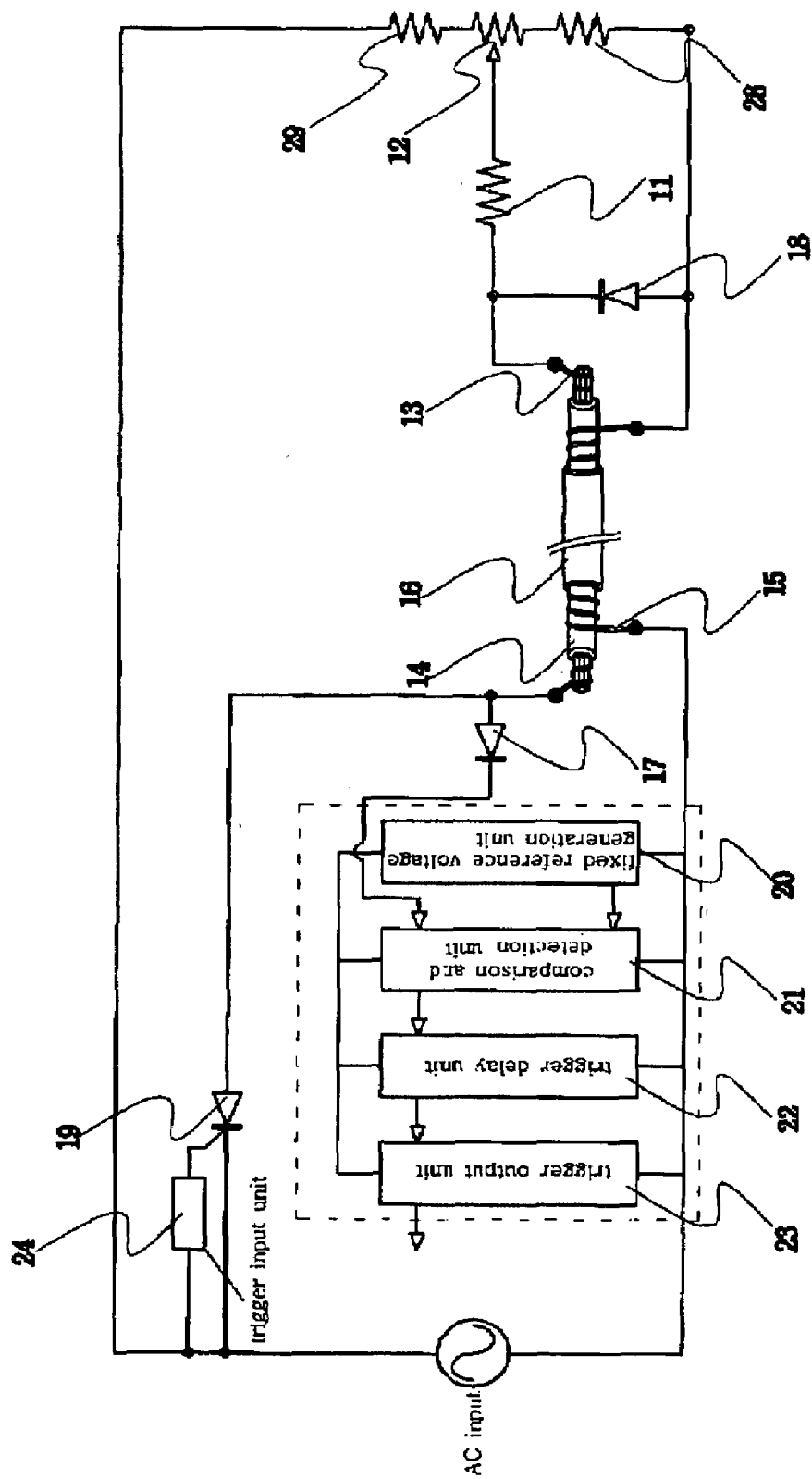
FIG. 29 is a diagram illustrating the construction of another embodiment in which the construction of FIG. 7 is applied.
Figure 30:
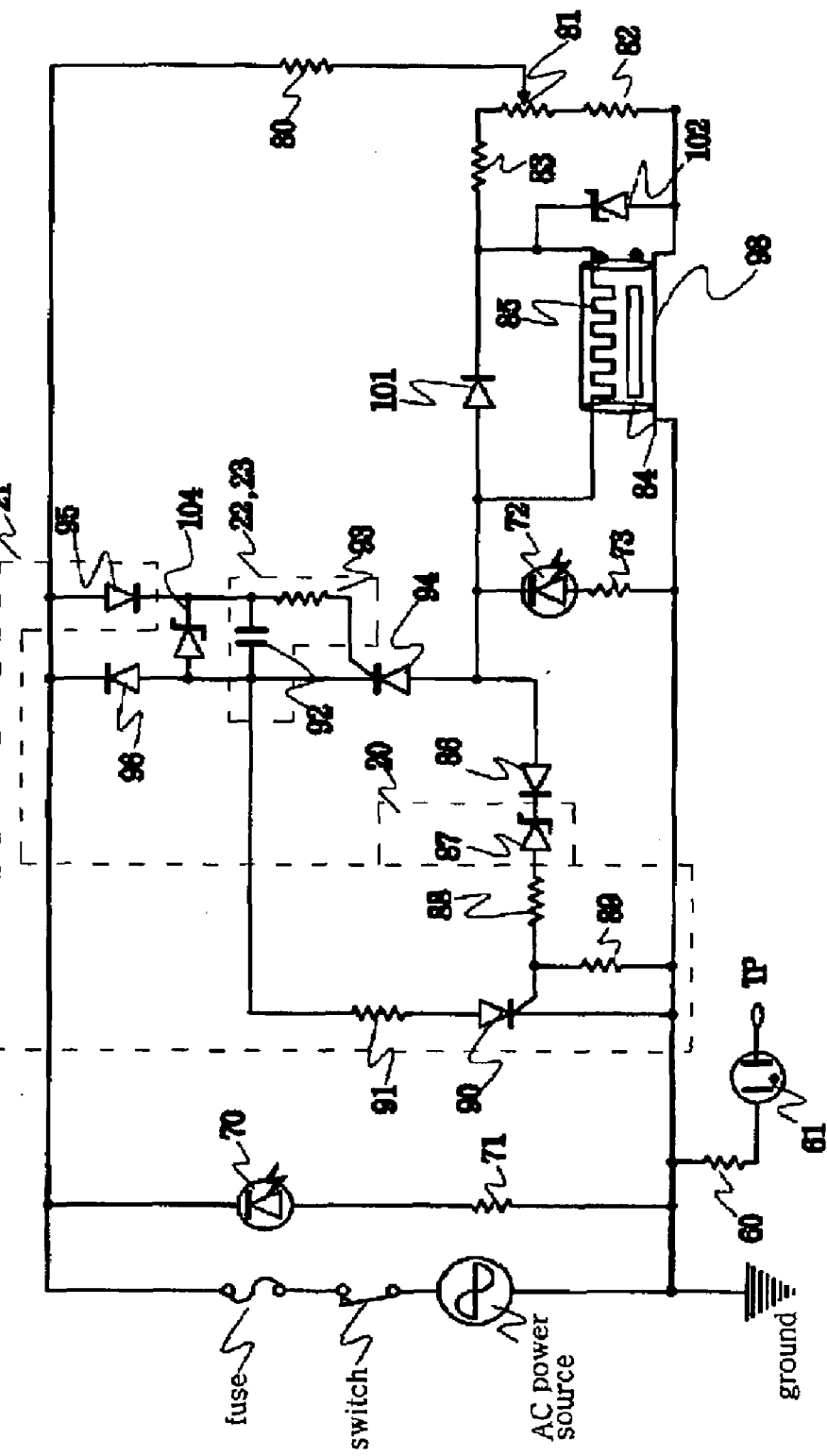
FIG. 30 is a circuit diagram of the construction of FIG. 29.
Figure 31:
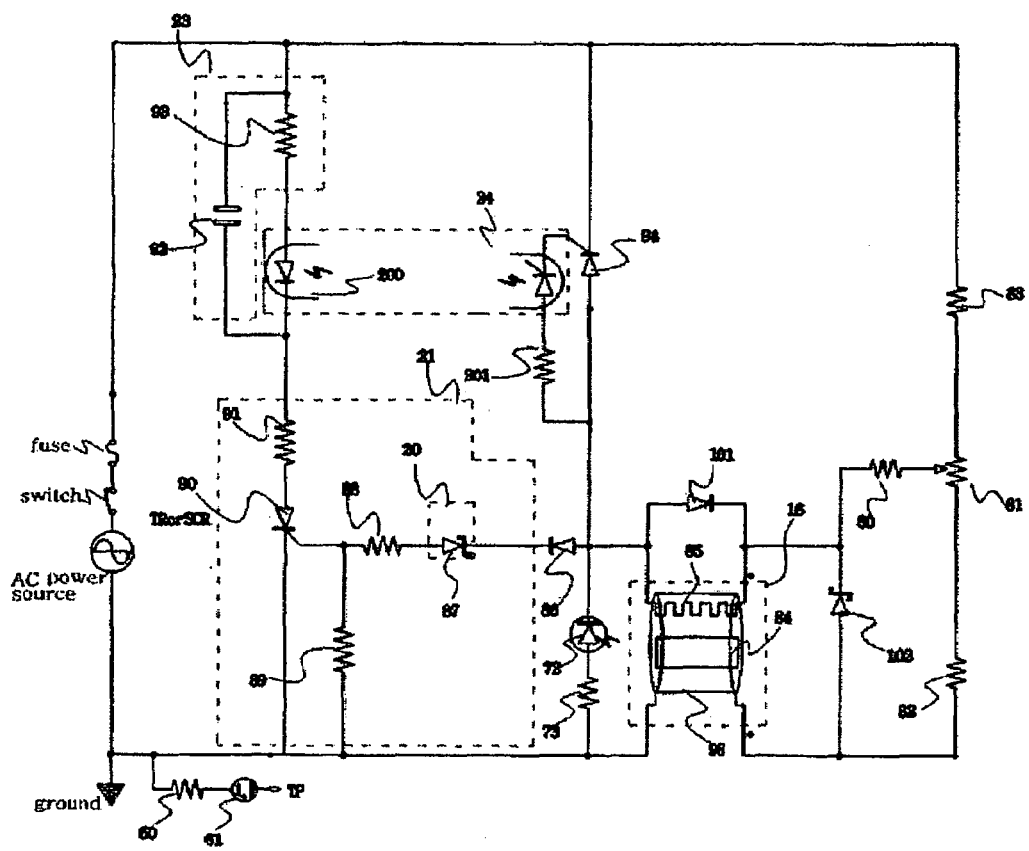
FIG. 31 is a circuit diagram in which a gate trigger part is separated from a control rectifier in the circuit diagram of FIG. 30 and is implemented using a photocouple SCR.

FIG. 26 is a diagram illustrating an embodiment to which the construction of FIG. 7 is applied, FIG. 27 is a circuit diagram of the construction of FIG. 26, and FIG. 28 is a circuit diagram in which the gate trigger part is separated from the control rectifier in the circuit diagram of FIG. 27 and is implemented using a photocouple SCR. FIG. 29 is a diagram illustrating the construction of another embodiment to which the construction of FIG. 7 is applied, FIG. 30 is a circuit diagram of the construction of FIG. 29, and FIG. 31 is a circuit diagram in which the gate trigger part is separated from the control rectifier in the circuit diagram of FIG. 30 and is implemented using a photocouple SCR. The above-described construction relates to a variant embodiment in which the temperature control unit 30 of FIG. 7 is formed on the power source side end of the heating cable. Other constructions and combinations are the same as those shown in FIGS. 7, 11 and 13. The constructions shown in FIGS. 26 and 29 are embodiments that indicate that the location of the variable resistor may be determined in various manners as desired.

Figure 32:
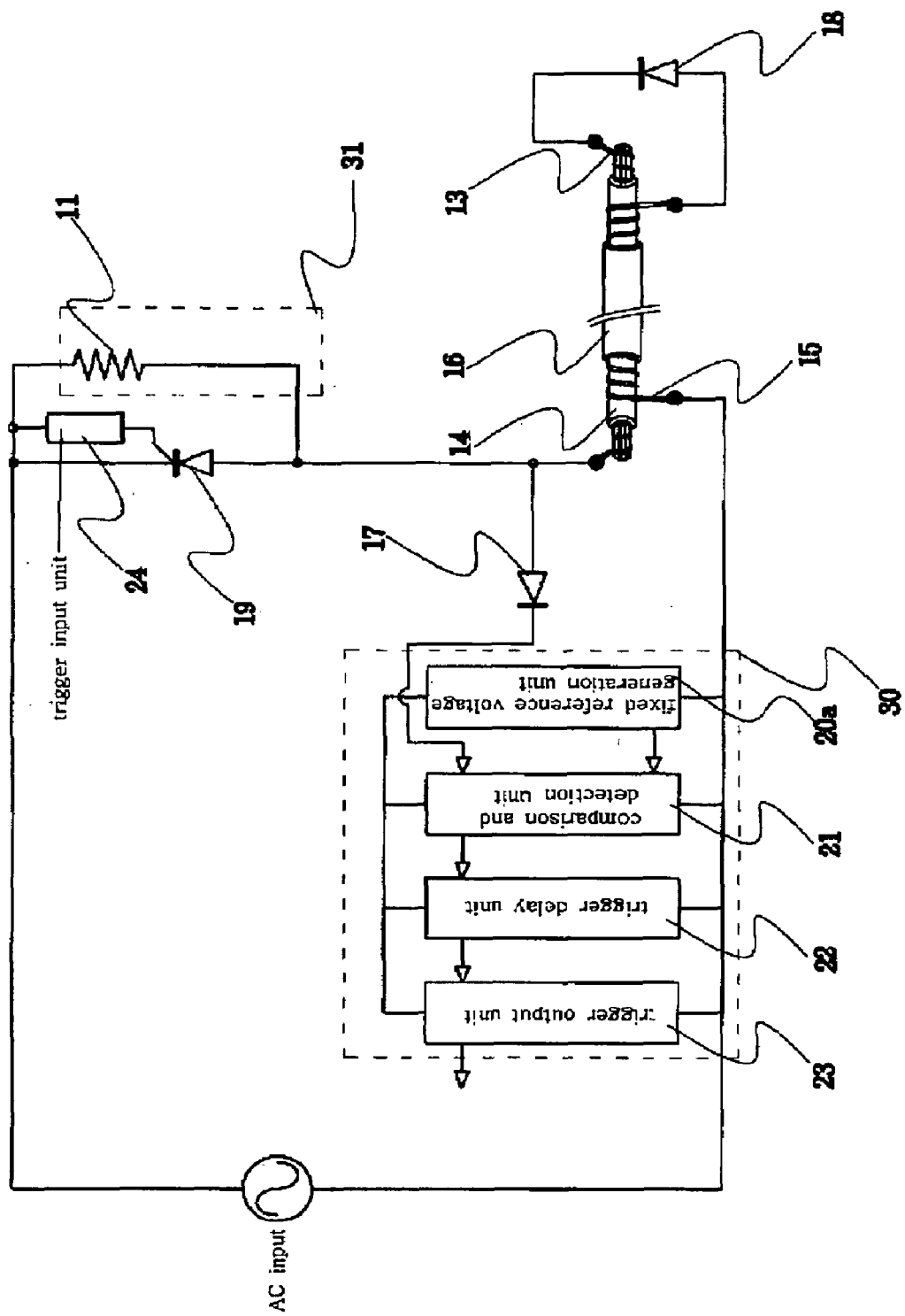
FIG. 32 is a diagram illustrating the construction of an embodiment in which the construction of FIG. 8 is applied.
Figure 33:
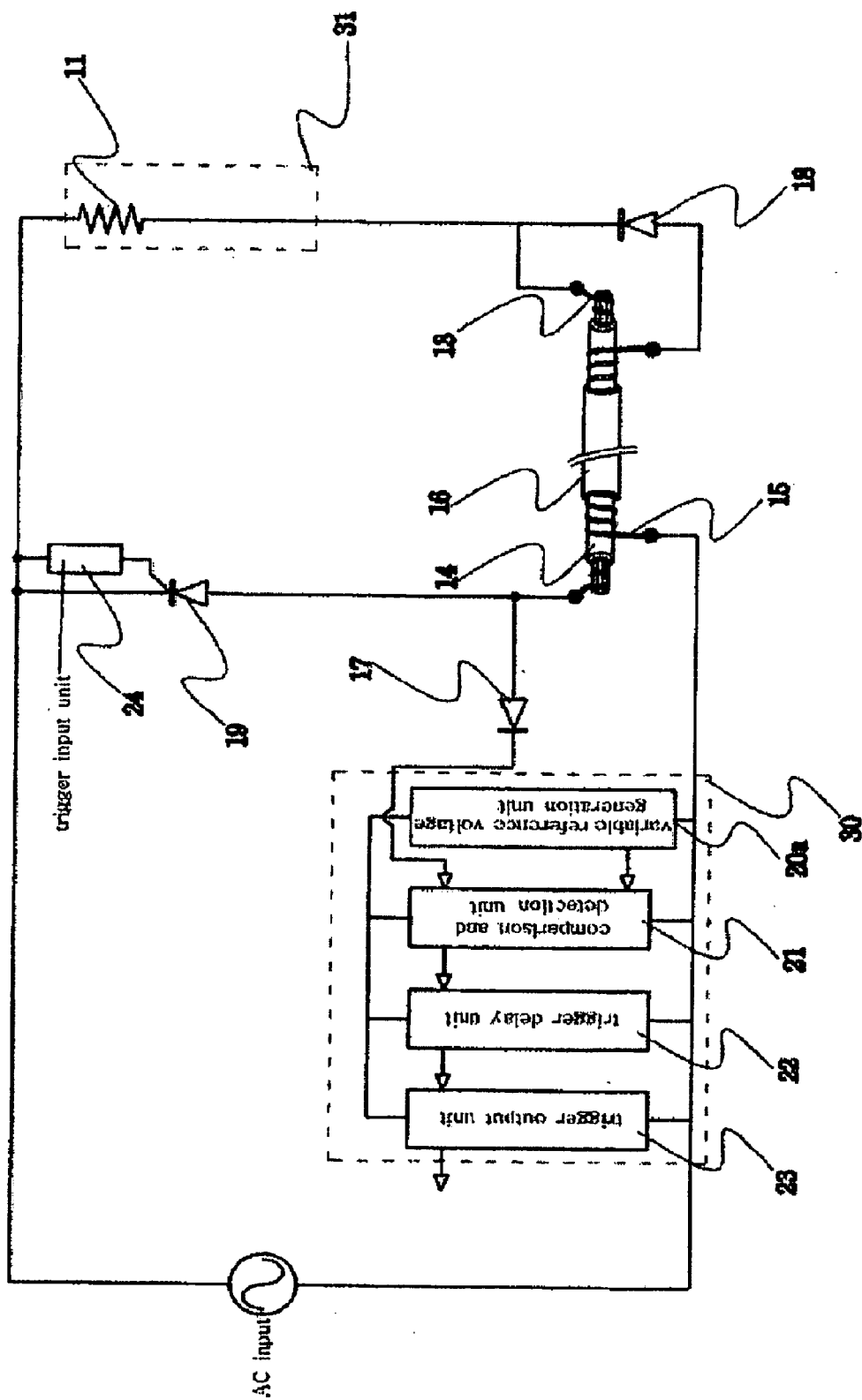
FIG. 33 is a diagram illustrating the construction of another embodiment in which the construction of FIG. 8 is applied.
Figure 34:
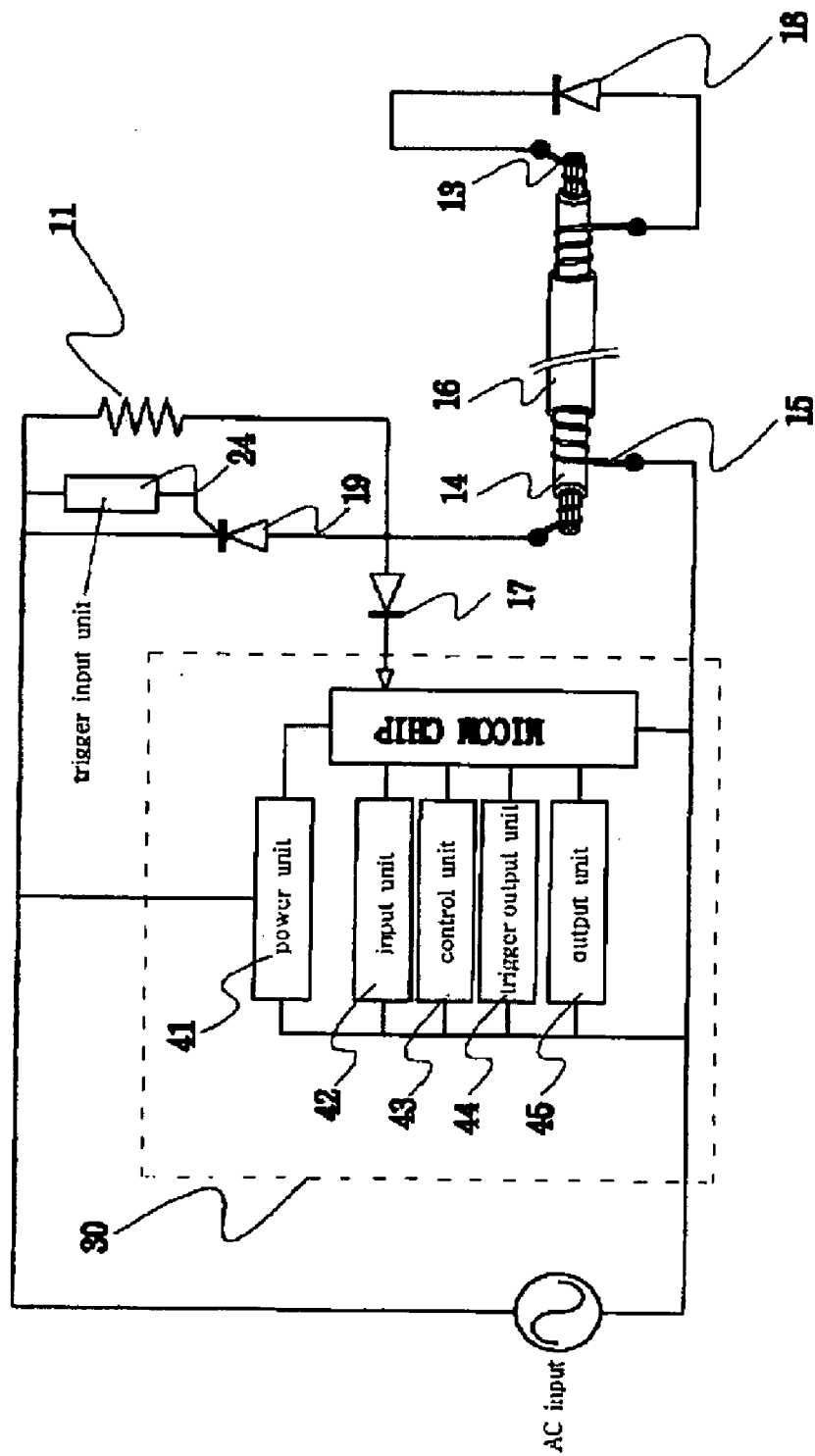
FIG. 34 is a diagram illustrating the construction of an embodiment in which the construction of FIG. 9 is applied.
Figure 35:
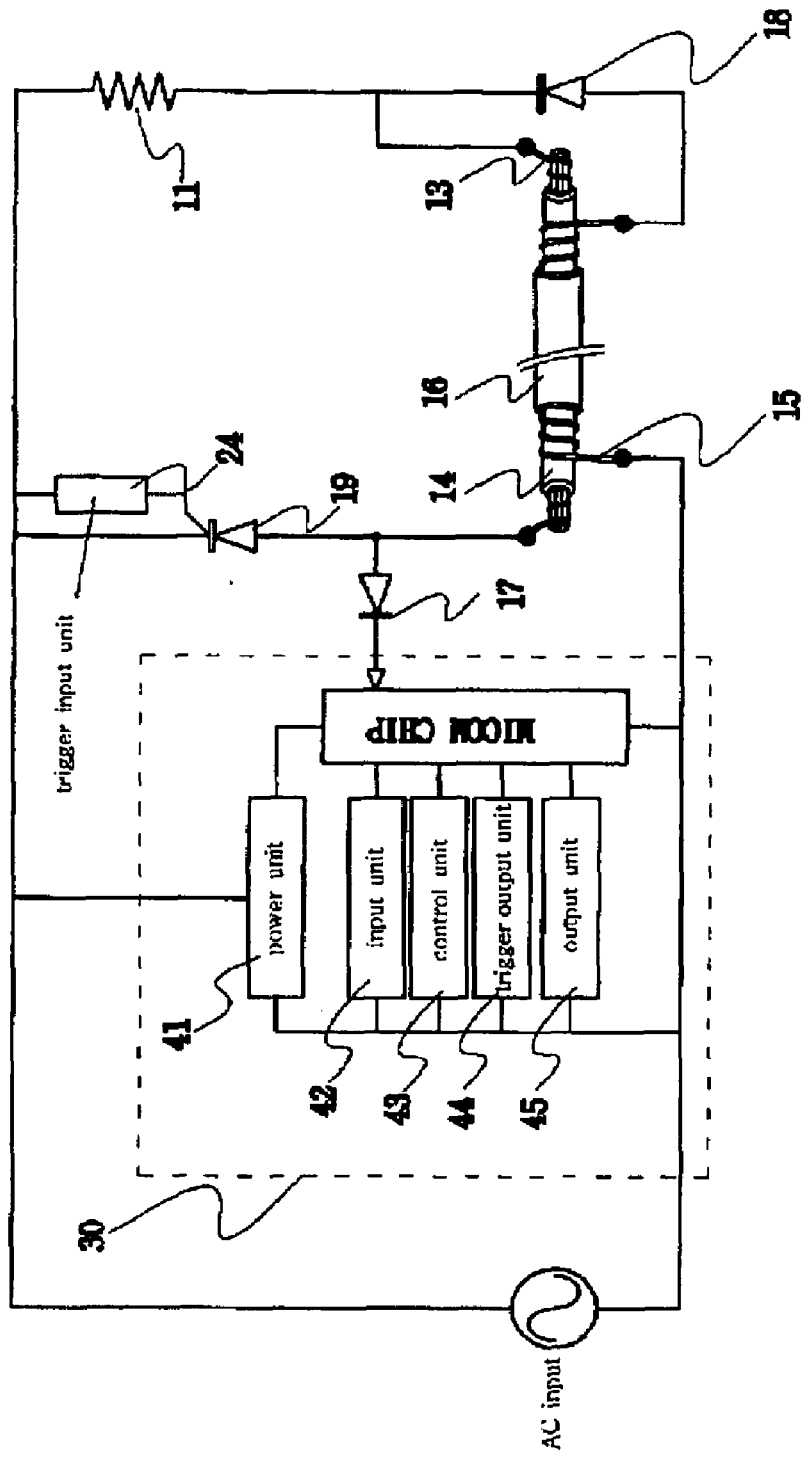
FIG. 35 is a diagram illustrating the construction of another embodiment in which the construction of FIG. 9 is applied.

FIG. 32 is a diagram illustrating the construction of an embodiment to which the construction of FIG. 8 is applied, and FIG. 33 is a diagram illustrating the construction of an another embodiment to which the construction of FIG. 8 is applied. FIG. 34 is a diagram illustrating the construction of an embodiment to which the construction of FIG. 9 is applied, and FIG. 35 is a diagram illustrating the construction of another embodiment to which the construction of FIG. 9 is applied. As described above, the above-described constructions relate to variant embodiments in which the temperature control units 30 are formed on the power source side ends of the heating cables, and indicate various modifications and embodiments depending on the locations of the temperature voltage regulation unit 31 and the resistor 11.

The present invention is not limited to the above-described embodiments, and variants and modifications can be made by those skilled in the art and do not depart from the purposes and scopes defined by the attached claims.

Meanwhile, the construction of the heating cable used in the temperature controllers and the temperature control methods can be implemented in various ways, and the construction of the present invention is described in detail with reference to various embodiments illustrated in the accompanying drawings.

Embodiment 1

Figure 36:
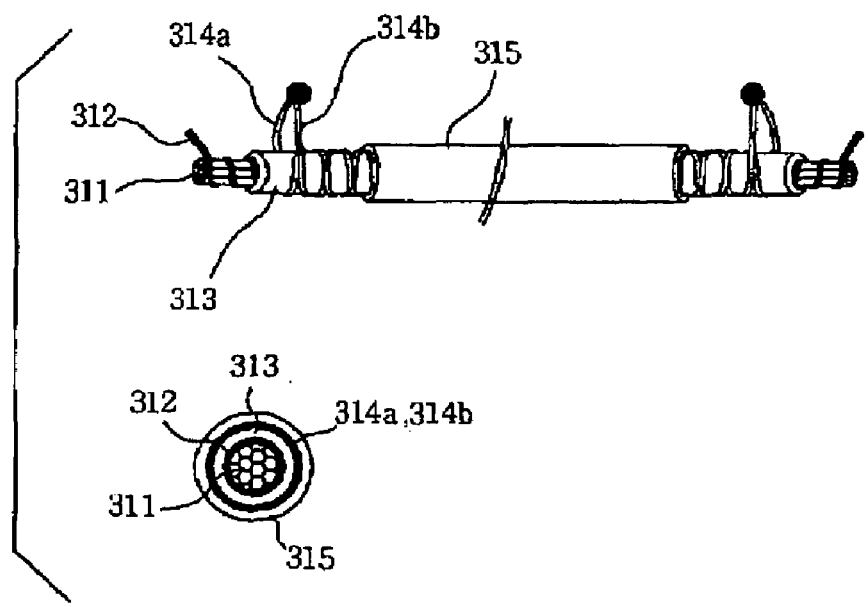
FIGS. 36 and 37 are construction and sectional diagrams of embodiments 1-1 and 1-2 in which a lead wire is used in the second electrical heating layer of the present invention.
Figure 37:
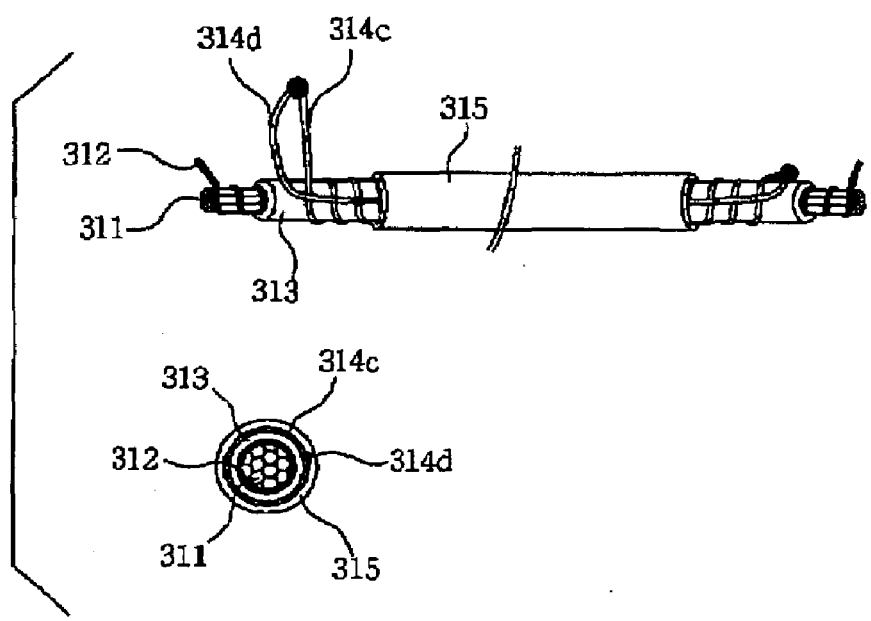

FIGS. 36 and 37 are construction and sectional diagrams of embodiments 1-1 and 1-2 in which a lead wire is used in the second electrical heating layer of the present invention. Referring to FIG. 36, a heating cable includes a core thread 311 made of polyester, an electrical heating wire 312 spirally wound around the outer circumferential surface of the core thread 311 in one direction along a longitudinal direction, a thermistor 313 applied to surround the outer circumferential surfaces of the electrical heating wire 312 and the core thread 311, first and second lead wires 314a and 314b alternately wound around the outer circumferential surface of the thermistor 313 in a double-spiral form, and a synthetic resin insulation coating 315 applied to surround the thermistor 313 and the first and second lead wires 314a and 314b.

The electrical heating wire 312 is prevented from being short-circuited and, therefore, is not directly connected to the first and second lead wires 314a and 314b, and first ends of the first and second lead wires 314a and 314b are connected to a power source and are grounded. The first and second lead wires 314a and 314b have low resistance values due to being grounded, so that they can effectively prevent electric fields. The electrical heating wire 312 can prevent the induction of a magnetic field and detect the local heating of the electrical heating wire 312 without the one end thereof being short-circuited. For this purpose, in the power device for supplying power or the temperature controller, control needs to be performed such that the half wave of an AC current is used for temperature detection and the remaining half wave is used for heating.

To achieve non-magnetic fields, the circuit of the power device should be designed such that, at the time of temperature detection, a current input through the electrical heating wire 312 exits through the lead wires 314a and 314b, and, at the time of heating, a current input through the lead wires 314a and 314b exits through the electrical heating wire 312. At this time, the resistance value of the thermistor 313 placed between the electrical heating wire 312 and the lead wires 314a and 314b varies with the temperature, so that the amount of heating varies.

A thermistor having a Negative Temperature Coefficient (NTC), that is, a thermistor whose resistance decreases as temperature increases, is used as the thermistor 313. It is preferable to use a nylon thermistor. During the operation of the temperature detection circuit, the thermistor 313 reacts sensitively to temperature and the resistance value varies. Accordingly, the thermistor 313 is influenced even though overheating occurs at an arbitrary location, and the heating cable itself automatically adjusts the amount of heating. Accordingly, the user sets the reference temperature, and heat is not generated when the temperature is higher than the reference temperature and heat is generated when the temperature is lower than the reference temperature, thereby adjusting the temperature. Accordingly, the present invention performs the function of adjusting temperature as well as the safety device function of preventing overheating.

Referring to FIG. 37, the construction of this embodiment is different from that of the embodiment 1-1 in a second electrical heating layer, that is, the arrangement of the first and second lead wires. That is, a first lead wire 314c is spirally and regularly wound, and a second lead wire 314d is arranged on the circumferential surface of the thermistor 313 in the longitudinal direction thereof.

Due to the above-described modification, the heating cable is vulnerable to bending stress or thermal stress, but the heating cable has advantages in that the entire length of the lead wires 314c and 314d can be reduced and winding work is easy, so that manufacturing cost and productivity are desirable. Accordingly, for bedding under low bending stress, such as a mat having a large thickness, it is preferred to employ a lead wire 314d that is linearly arranged in the longitudinal direction as described above.

Figure 38:
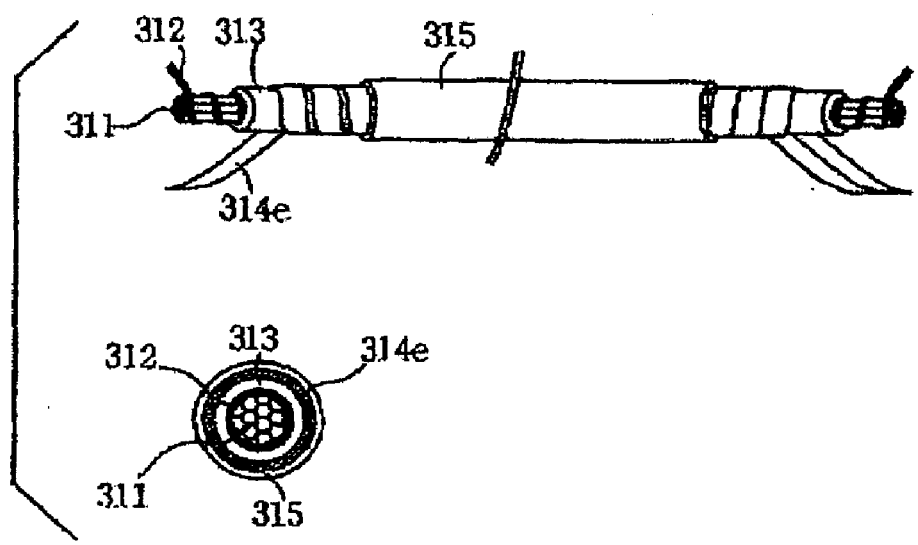
FIGS. 38 and 39 is construction and sectional diagrams of an embodiment 1-3 in which a metallic strip is used in the second electrical heating layer of the present invention.
Figure 39:
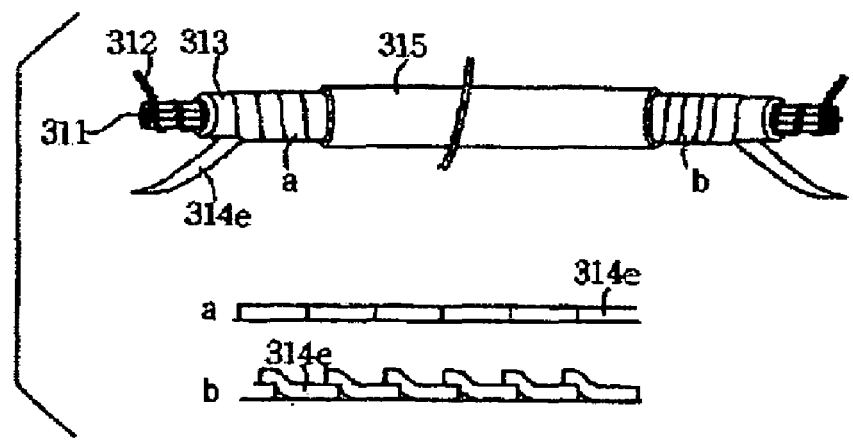

FIGS. 38 and 39 are construction and sectional diagrams of an embodiment 1-3 in which a metallic strip is used in the second electrical heating layer of the present invention. Referring to FIGS. 38 and 39, a tape-shaped metallic strip 314e is used as the second electrical heating layer and is wound in a spiral form. When the metallic strip 314e is wound, it may be loosely wound, be densely wound or be wound while partially overlapping itself. That is, the metallic strip 314e may be densely wound with its sides coming into contact with each other side by side, as shown in FIG. 39a, or be densely wound with its sides somewhat overlapping each other to minimize the exposure of a base surface, as shown in FIG. 39b. FIG. 39a and FIG. 39b illustrate the cross sections of the wound metallic strip 314e. Meanwhile, the width of the metallic strip 314e may be further widened, or two or more metallic strips 314e may be wound side by side in a tape form.

When the entire length of the heating cable is short, it is not necessary to use two lead wires, but it is convenient to wind a tape-shaped metallic strip 314e. For example, since a heating cable used in a fomentation device for locally heating a human body has a short length, it is possible to wind and use a metallic strip 14e. In the case of the metallic strip 314e, the leakage of electromagnetic waves is completely prevented and the entire length required for a shield is shortened, so that an electric resistance value becomes very small. Furthermore, the metallic strip 314e is not easily bent and maintains flexibility because it is wound. Furthermore, since its winding pitch is large, the metallic strip 314e can be wound in a small number of turns, so that the length of the metallic strip 314e is shortened. As a result, an electric resistance value is lowered, and, simultaneously, the time required for winding is reduced, thus improving productivity.

Embodiment 2

Figure 40:
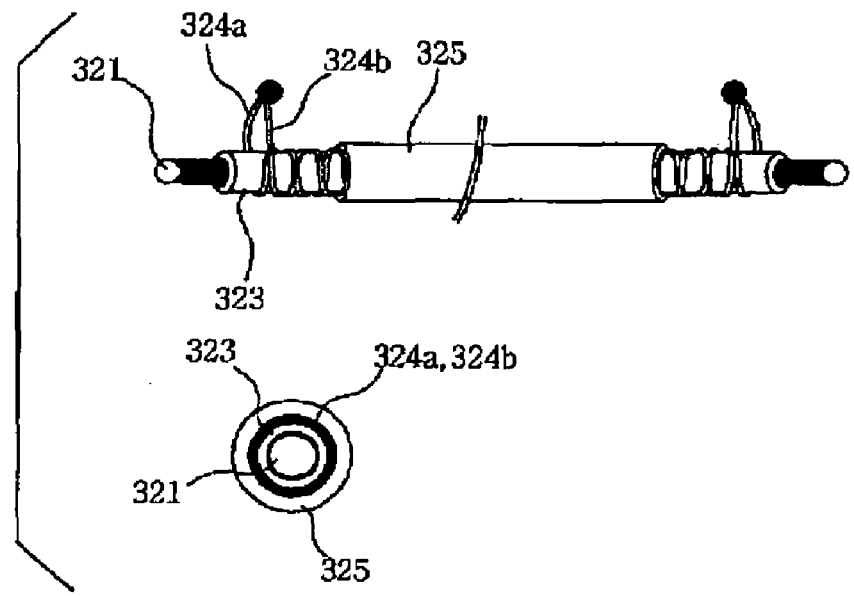
FIGS. 40 and 41 are construction and sectional diagrams of an embodiment 2-1 in which the first electrical heating layer of the present invention is differently constructed and lead wires are used in a second electrical heating layer.
Figure 41:
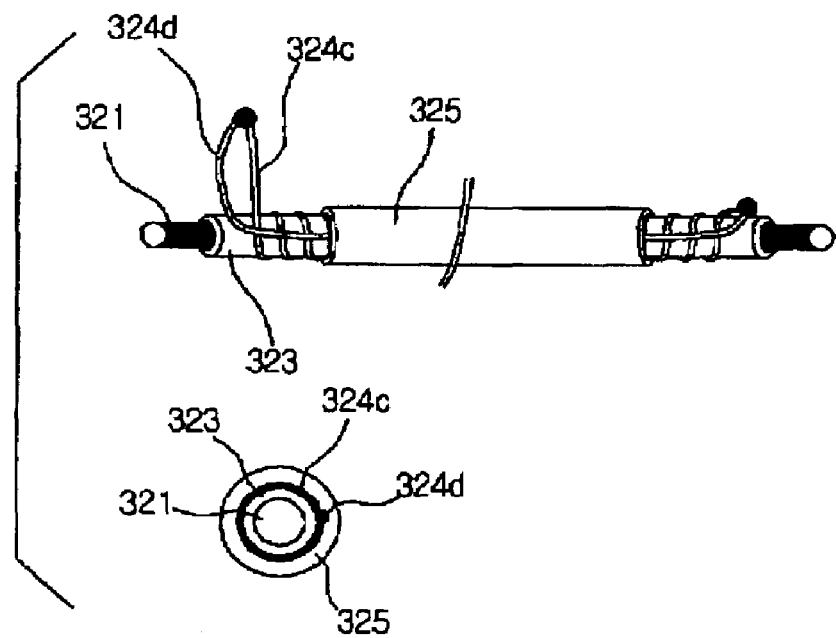
Figure 42:
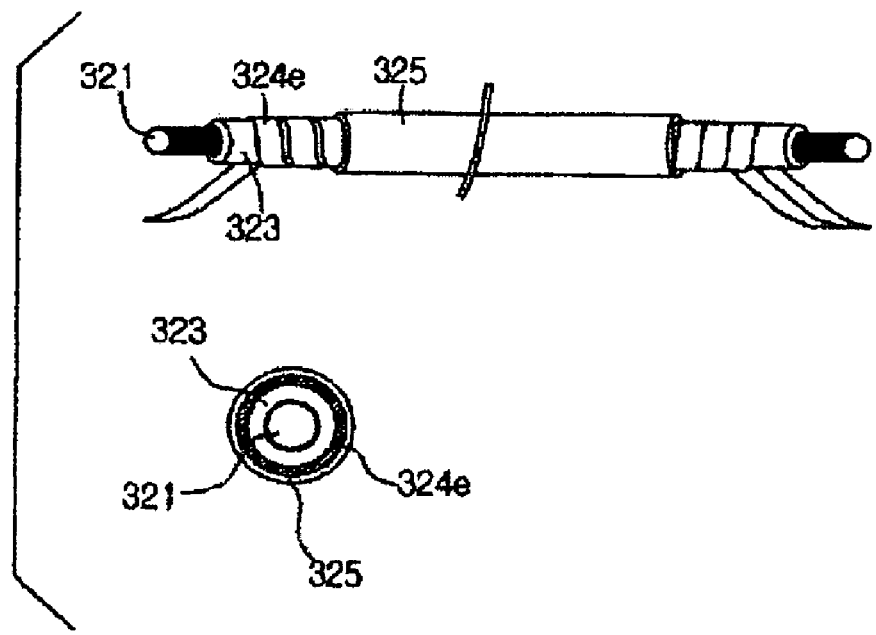
FIGS. 42 and 43 are construction and sectional diagrams of an embodiment 2-3 in which the first electrical heating layer of the present invention is differently constructed and a metallic strip is used in a second electrical heating layer.
Figure 43:
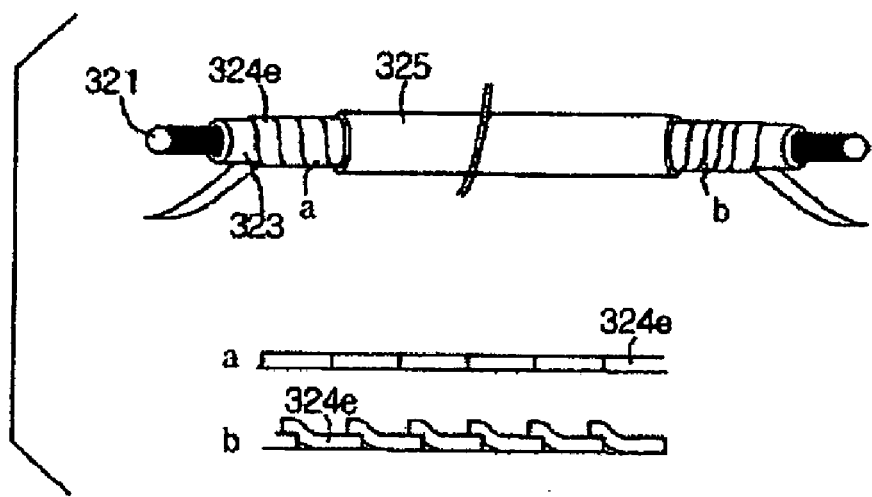

FIGS. 40 and 41 are construction and sectional diagrams of an embodiment 2-1 in which the first electrical heating layer of the present invention is differently constructed and lead wires are used in a second electrical heating layer. FIGS. 42 and 43 are construction and sectional diagrams of an embodiment 2-3 in which the first electrical heating layer of the present invention is differently constructed and a metallic strip is used in a second electrical heating layer.

Referring to FIG. 40, the construction of the heating cable of the embodiment 2-1 is similar to that of the heating cable of the embodiment 1-1, but is different from that of the heating cable of the embodiment 1-1 in that a metallic electrical heating conductor 321, instead of the synthetic thread and the electrical heating wires wound around the core thread, is used as the first electrical heating layer. The operating principle of the heating cable of the embodiment 1-1 is similar to that of the heating cable of the embodiment 2-1, but is different from that of the heating cable of the embodiment 2-1 in a bending or breaking characteristic because a thin electrical heating wire is wound around a synthetic core thread in the heating cable of the embodiment 1-1, whereas the heating cable of the embodiment 2-1 uses a relatively thick metallic electrical heating conductor. Reference number 324a denotes a first lead wire, reference numeral 324b denotes a second lead wire, reference numeral 323 denotes an NTC nylon thermistor, and reference numeral 325 denotes an insulation coating.

Referring to FIG. 41, the construction of the heating cable of the embodiment 2-2 is similar to that of the heating cable of the embodiment 1-2, but is different from that of the heating cable of the embodiment 1-2 in which a metallic electrical heating conductor 321, instead of the synthetic thread and the electrical heating wires wound around the core thread, is used. Reference numeral 324c denotes a first lead wire that is spirally wound, and reference numeral 324d denotes a second lead wire that is linearly arranged in a longitudinal direction.

Referring to FIGS. 42 and 43, the construction of the heating cable of the embodiment 2-3 is similar to that of the heating cable of the embodiment 1-3, but is different from that of the heating cable of the embodiment 1-2 in which a metallic electrical heating conductor 321, instead of the synthetic thread and the electrical heating wires wound around the core thread, is used. Reference numeral 324e denotes a tape-shaped metallic strip that is preferably and spirally wound around the circumferential surface of a thermistor 323. When the metallic strip 314e is wound, it may be loosely wound, be densely wound, or be wound to partially overlap itself. That is, the metallic strip 314e may be densely wound with its sides coming into contact with each other side by side, as shown in FIG. 43a, or be wound with its sides somewhat overlapping each other to minimize the exposure of a base surface, as shown in FIG. 43b. FIG. 39a and FIG. 39b illustrate the cross sections of the wound metallic strip 314e. Meanwhile, the width of the metallic strip 314e may be further widened, or two or more metallic strips 314e may be wound side by side in a tape form.

Embodiment 3

Figure 44:
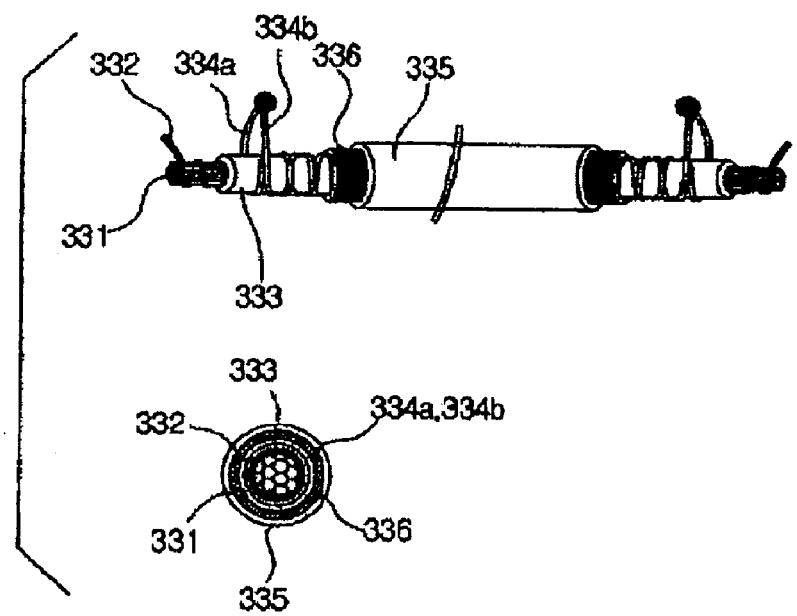
FIGS. 44, 45 and 46 are construction and sectional diagrams of embodiments 3-1, 3-2 and 3-3 in which a conducting coating layer is further included outside the second electrical heating layer of the present invention.
Figure 45:
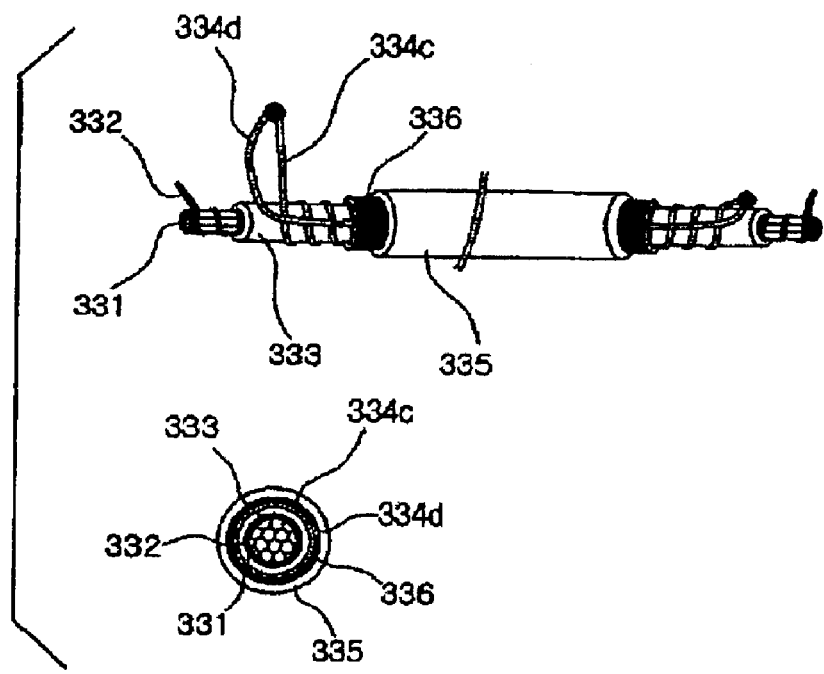
Figure 46:
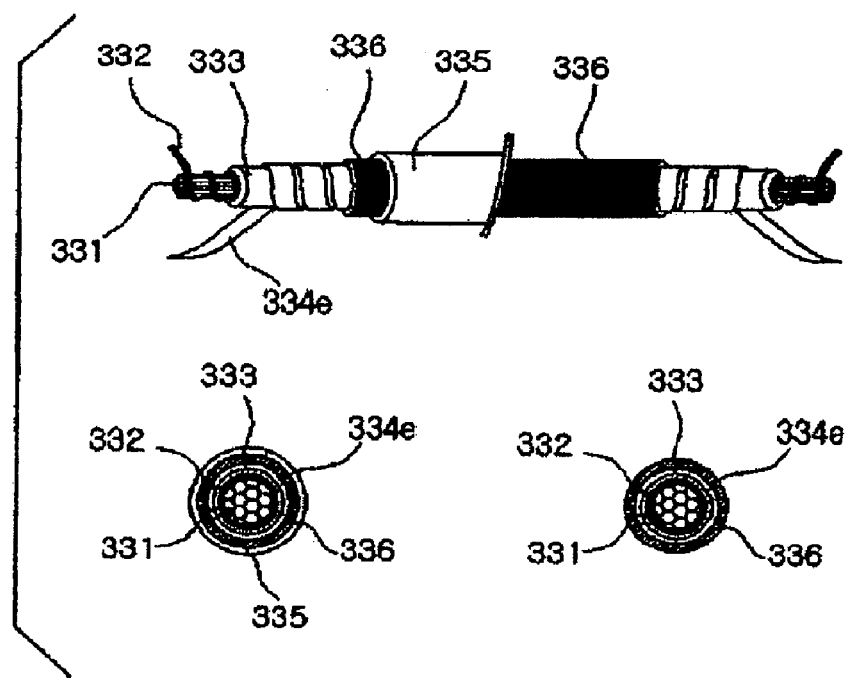

FIGS. 44, 45 and 46 are construction and sectional diagrams of embodiments 3-1, 3-2 and 3-3 in which a conducting coating layer is further included outside the second electrical heating layer of the present invention. Referring to FIG. 44, the construction of the heating cable of the embodiment 3-1 is similar to that of the heating cable of the embodiment 1-1, but is different from that of the heating cable of the embodiment 1-1 in that a conducting coating layer 336, surrounding a thermistor layer 333 and second electrical heating layers 334a and 334b around the thermistor layer 333, is further included. The operation principle of the heating cable of the embodiment 3-1 is similar to that of the heating cable of the embodiment 1-1, but has the further effect of interrupting an electric field exposed between the second electrical heating layers 334a and 334b because the conductive coating surrounds the heating cable of the embodiment 1-1. Reference numeral 334a denotes a first lead wire, reference numeral 334b denotes a second lead wire, reference numeral 333 denotes an NTC nylon thermistor, and reference numeral 335 denotes an insulation coating.

Referring to FIG. 45, the construction of the heating cable of the embodiment 3-2 is similar to that of the heating cable of the embodiment 1-2, and further includes a conductive coating layer 336 and, therefore, has the effect of intercepting a leakage electric field. Reference numeral 334c denotes a first lead wire that is spirally wound, and reference numeral 334d denotes a second lead wire that is linearly arranged in a longitudinal direction.

Referring to FIG. 46, the construction of the heating cable of the embodiment 3-3 is similar to that of the heating cable of the embodiment 1-3, but further includes a conductive coating layer 336 and, therefore, has the effect of interrupting a leakage electric field. Reference numeral 334e denotes a tape-shaped metallic strip, which is spirally wound around the circumferential surface of a thermistor 333 at regular intervals. Accordingly, there exists a leakage electric field, and the conductive coating layer 336 can interrupt the leakage electrical field. When the occasion demands, it is possible to expose the conductive coating layer 335 on the outermost side without the insulation coating 335, as shown on the right side of the drawing. A metallic strip having a large width performs a shielding function over a wide area, so that the rate of leakage of an electric field to the outside is reduced, and the conductive coating layer 336 interrupts the leakage electric field. Since the size of the leakage electric field interrupted by the conductive coating layer 336 is small, the leakage electric field does not harm the user's body even if there is no conductive coating 335. That is, when the metallic strip is used, an insulation function can be sufficiently achieved using only the conductive coating layer 336 without using a separate insulation coating 335.

Embodiment 4

Figure 47:
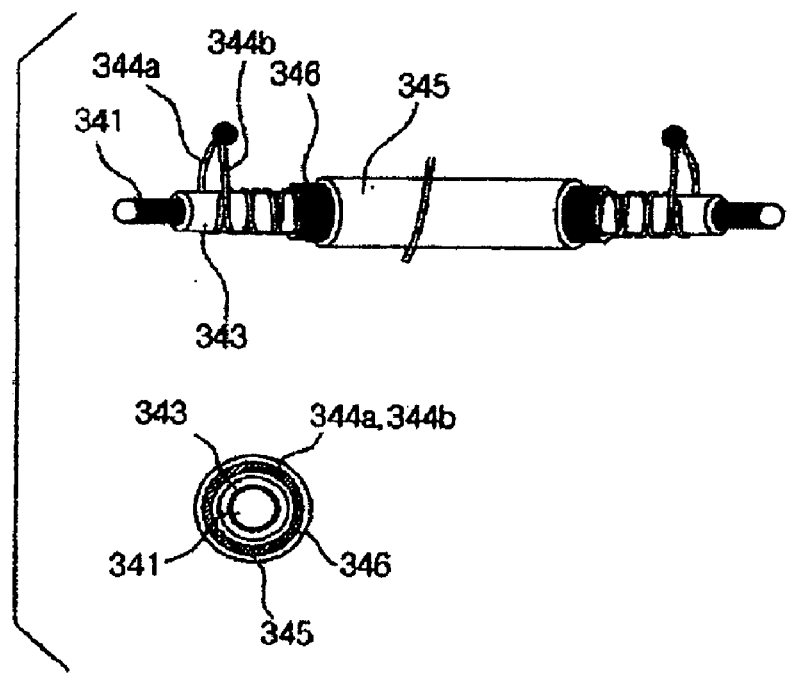
FIGS. 47, 48 and 49 are construction and sectional diagrams of embodiments 4-1, 4-2 and 4-3 in which the first electrical heating layer of the present invention is differently constructed and a conductive coating layer is further included outside of a second electrical heating layer.
Figure 48:
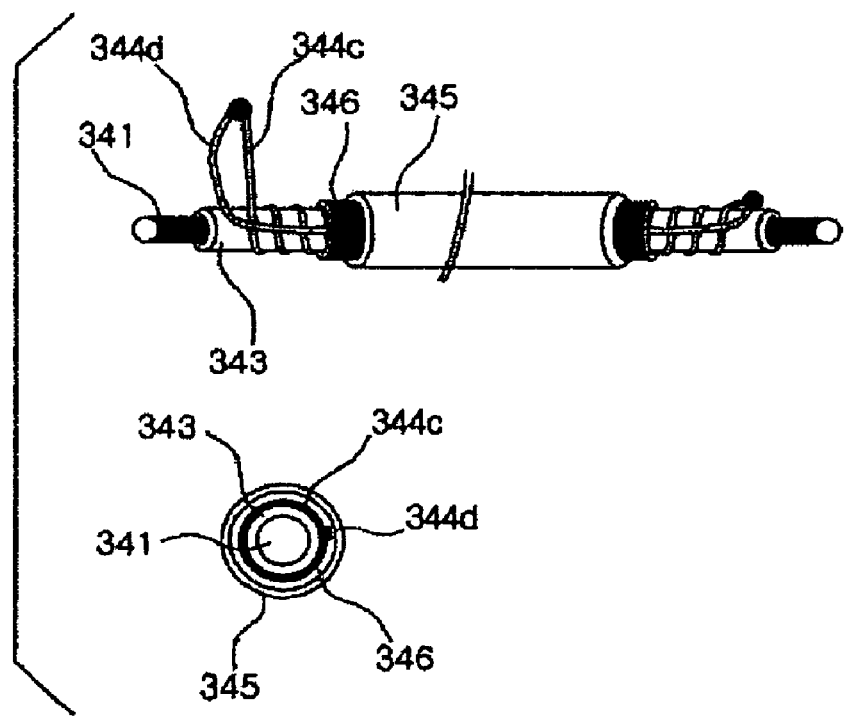
Figure 49:
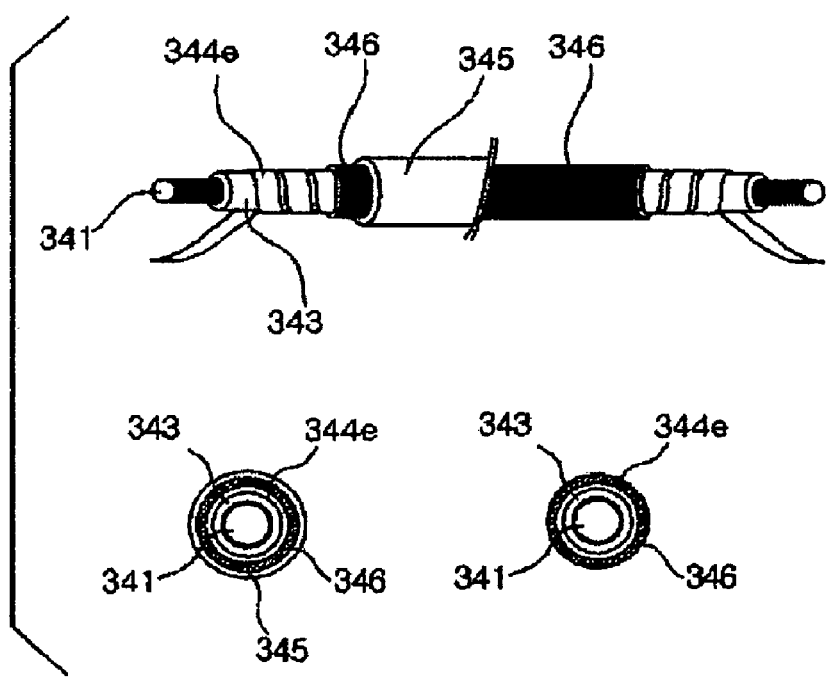

FIGS. 47, 48 and 49 are construction and sectional diagrams of embodiments 4-1, 4-2 and 4-3 in which the first electrical heating layer of the present invention is differently constructed and a conductive coating layer is further included outside of a second electrical heating layer. Referring to FIG. 47, the construction of the heating cable of the embodiment 4-1 is similar to that of the heating cable of the embodiment 2-1, but is different from that of the heating cable of the embodiment 2-1 in that a conductive coating layer 346 surrounding a thermistor layer 343 and second electrical heating layers 344a, 344b around the thermistor layer 343 is further included. The operating principle of the heating cable of the embodiment 2-1 is similar to that of the heating cable of the embodiment 4-1. However, the conductive coating surrounds the heating cable of the embodiment 2-1, so that the embodiment 2-1 further has the effect of interrupting an electric field that leaks between the second electrical heating layers 344a and 344b. Reference numeral 344a denotes a first lead wire, reference numeral 344b denotes a second lead wire, reference numeral 343 denotes an NTC nylon thermistor, and reference numeral 345 denotes an insulation coating.

Referring to FIG. 48, the construction of the heating cable of the embodiment 4-2 is similar to that of the heating cable of the embodiment 2-2, but further includes a conductive coating layer 346, so that it further has the effect of intercepting a leakage electric field. Reference numeral 344c denotes a first lead wire that is spirally wound, and reference numeral 344d denotes a second lead wire that is linearly arranged in a longitudinal direction.

Referring to FIG. 49, the construction of the heating cable of the embodiment 4-3 is similar to that of the heating cable of the embodiment 2-3, but further includes a conductive coating layer 346, so that it has the effect of interrupting a leakage electric field. Reference numeral 344e denotes a tape-shaped metallic strip that is spirally wound around the circumferential surface of a thermistor 343 at regular intervals. Accordingly, there exists an electric field that leaks between the wound portions of the metallic strip, and the conductive coating layer 346 can interrupt the leaking electric field. As described above, it is possible to expose a conductive coating layer 346 on the outermost side without using the insulation coating 345, as shown on the right side of the drawing. A metallic strip having a large width performs a shielding function over a wide area, so that the rate of leakage of an electric field to the outside is reduced, and the conductive coating layer 346 interrupts the leakage electric field. Since the size of the leakage electric field interrupted by the conductive coating layer 346 is small, the leakage electric field does not harm the user's body even if there is no conductive coating 345. That is, when the metallic strip is used, an insulation function can be sufficiently achieved using only the conductive coating layer 346 without using a separate insulation coating 345.

Figure 50:
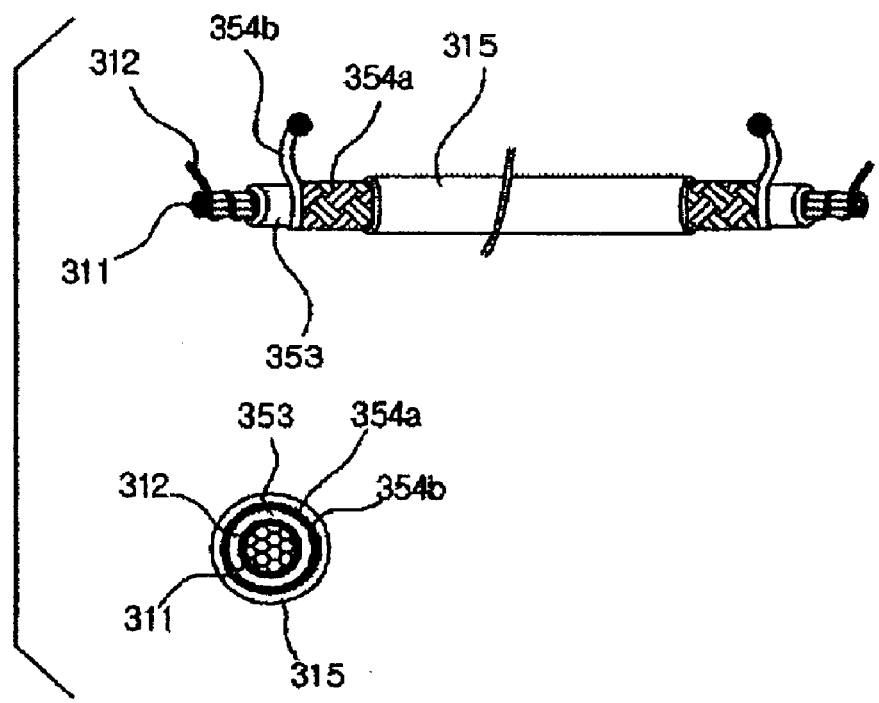
FIGS. 50 and 51 are construction and sectional diagrams of embodiments in which the second electrical heating layer of the present invention is differently constructed.
Figure 51:
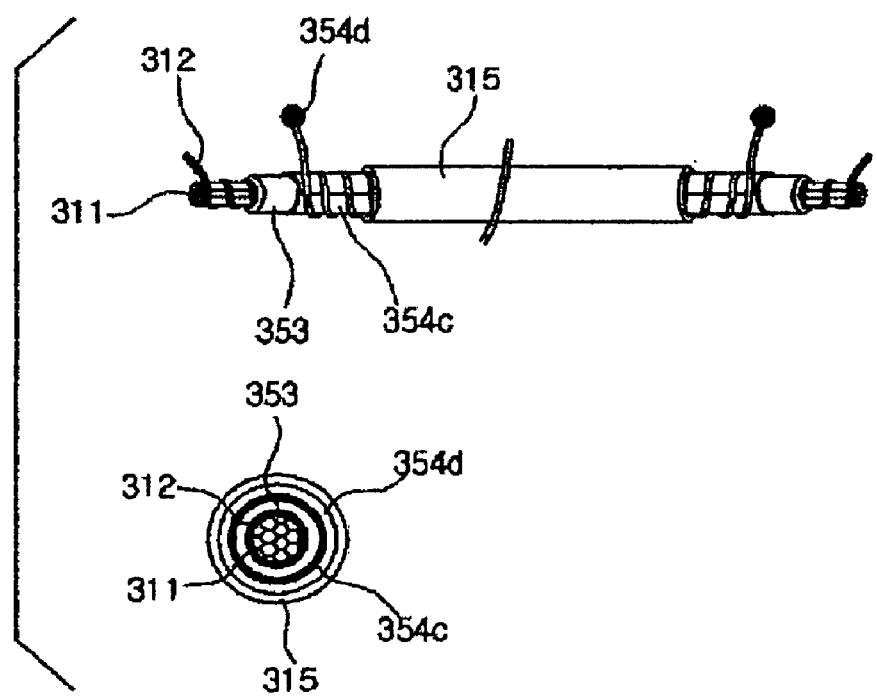

FIGS. 50 and 51 are construction and sectional diagrams of embodiments in which the second electrical heating layer of the present invention is differently constructed. Referring to FIG. 50, a metallic shield element is used as the second electrical heating layer. The metallic shield element collectively refers to elements that are formed by arranging a plurality of metallic lines or metallic pieces and forming the metallic lines or pieces in a tape shape or braid shape. Referring to FIG. 50, a metallic braid element 354a formed by braiding metal 354a surrounds a thermistor 353 and the linear members 354b of the braid element are drawn from both ends of the braid element.

The operating principle of the present embodiment is similar to that of the preceding embodiment. The present embodiment is different from the preceding embodiment in the construction of the second electrical heating layer. The metallic braid element 354a is produced by braiding a plurality of metallic strands and adjusting the width of the braided metallic strands to capacity, and the members of the metallic braid element 354a are drawn and used to pass a current therethrough. The shape of the metallic braid element 354a is not limited. The metallic braid element may be formed in a tape shape extending in a longitudinal direction and be spirally wound. The metallic braid element may be formed by bundling a plurality of metallic strands in a tape shape, and be spirally wound. The metallic braid element 354a performs the shielding function of interrupting an electric field while surrounding the thermistor 353.

Referring to FIG. 51, an aluminum sheet 354c surrounds a thermistor 353, and a lead wire 354d is spirally wound around the circumferential surface of the aluminum sheet 354c. The aluminum sheet 354c is formed to surround the thermistor 353 and performs a shielding function to interrupt an electric field. The lead wire 354d wound around the circumferential surface of the aluminum sheet 354c drains charges accumulated on the aluminum sheet 354c and, therefore, reduces an electrical resistance value, thus reducing ground and an electric potential. Aluminum has flexibility, is easy to machine, and has low material cost compared to copper. When an electrical circuit is formed by connecting aluminum to foreign metal using soldering, it is difficult to solder the aluminum to the metal. For this purpose, a lead wire 354d is used together with aluminum, which reduces the electrical resistance value of the aluminum sheet 354c.

Figure 52:
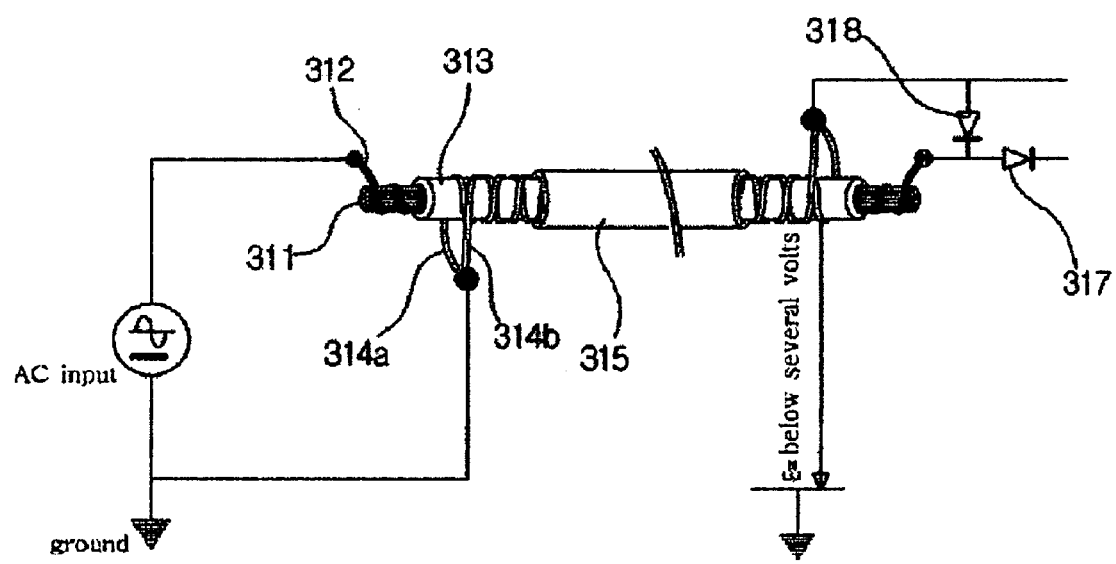
FIGS. 52 and 53 are diagrams illustrating a circuit connected to the heating cable of the present invention, and the principle thereof.
Figure 53:
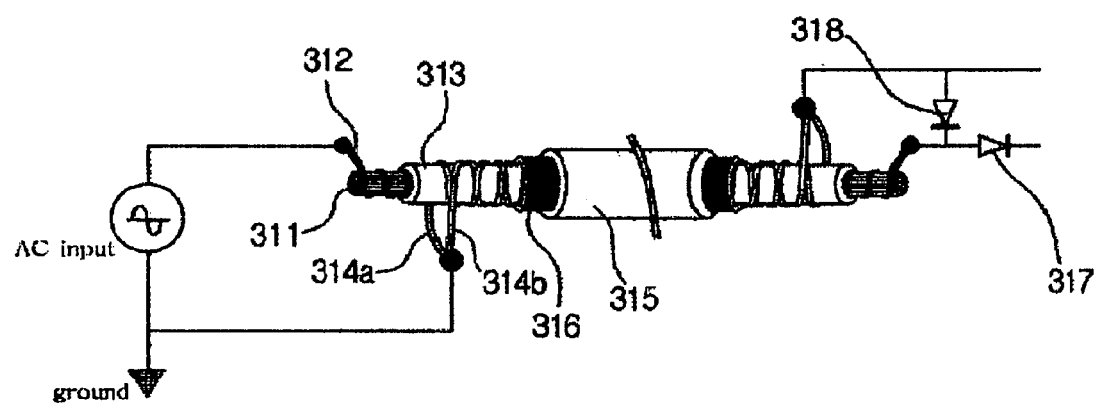

FIGS. 52 and 53 are diagrams illustrating a circuit connected to the heating cable of the present invention, and the principle thereof. Referring to FIGS. 52 and 53, the electrical heating wire 312 of an e1 electrical heating layer is connected to one side of a power source, and the lead wires 314a and 314b of a second electrical heating layer are connected to a ground on the other side of the power source.

When the AC input power source is turned on, the front half period of an AC cycle outputs variation in the temperature resistance value of a thermistor 313 located between the electrical heating wire 312 of a first electrical heating layer and the lead wires 314a and 314b of the second electrical heating layer to a unidirectional diode 317. A temperature detection signal current passes through the electrical heating wire 312 of the first electrical heating layer, makes a U-turn in the thermistor 313, and turns through the second electrical heating layer. At this time, temperature detection signal currents flowing through the electrical heating wire 312 and the lead wires 314a and 314b flow in opposite directions, so that magnetic fields cancel each other and, therefore, the temperature detection signals flow in a non-magnetic wave state. The unidirectional diode 317 is used to indicate that a temperature detection operation and a heating operation are separated from each other in an theoretical equivalent circuit and it is used and operates in the temperature detection operation. Meanwhile, in the construct ion of an actual circuits a small signal power below several mW is sufficient for the temperature control unit (not shown) that receives the temperature signal voltage, so that the output value of the temperature signal voltage of the temperature voltage control unit (not shown) is below several mW. Furthermore, according to the setting of the self input signal amplifying point of the temperature control unit 30, a both (+) and (−) wave signal, or a (+) or (−) signal is selected and an arbitrary operation may be performed Accordingly, in the actual circuit construction conditions in which rectification is not required for a small signal or a (+) signal is selected and used, a temperature detection temperature voltage detection rectifier 17 is used in an overlapping manner from a logical point of view, so that the temperature voltage detection unidirectional diode 317 may be omitted. That is, when the temperature signal voltage conversion consumption power of the NTC thermistor 14 is conversion-detected at less than several mW, an AC voltage or a DC voltage may be selected as the NTC thermistor detection signal voltage, and the application of the temperature voltage detection unidirectional diode may be selected according to the condition in which the temperature control unit sets an operating point at which a thermistor detection input signal operates.

After the front half period temperature detection has been completed, heating starts in the rear half period. A heating current passes through the lead wires 314a and 314b of the second electrical heating layer, makes a U-turn in the unidirectional diode 318, and returns through the electrical heating wire 312 of the first electrical heating layer. At this time, heating currents flowing through the electrical heating wire 312 and the lead wires 314a and 314b flow in opposite directions, so that the phases of magnetic fields are opposite and, therefore, the magnetic fields are cancelled. Accordingly, a heating current flows in a non-magnetic wave state.

When a conductive coating layer 316 is provided as shown in FIG. 53, operation is the same as the above-described operation. The conductive coating layer 316 functions to intercept an electric field leaking between the lead wires 314a and 314b of the second electrical heating layer.

Figure 54:
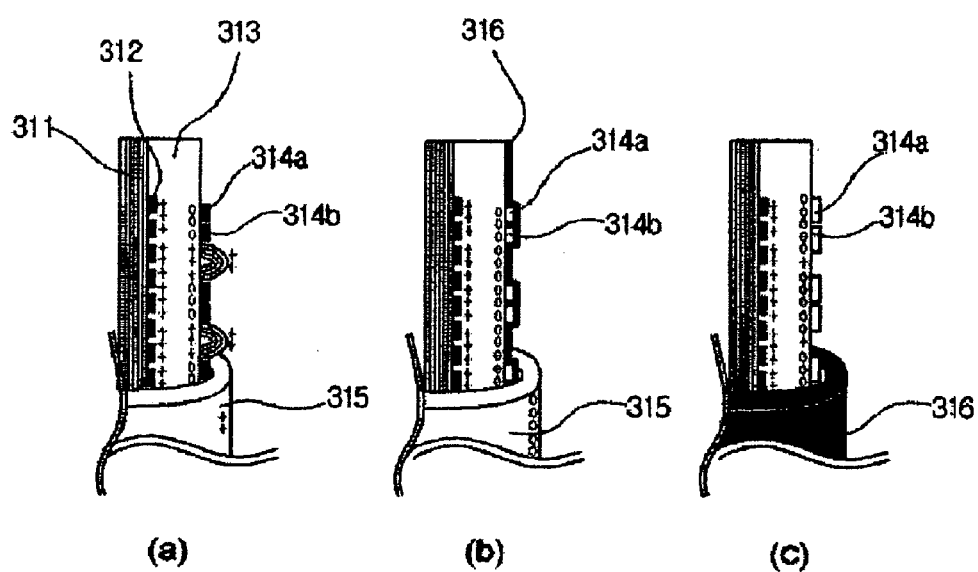
FIG. 54 is a conceptual diagram illustrating a principle by the electrical field leaks from the heating cable and a principle by which the electric field is intercepted in the heating cable provided with the conductive coating layer.

FIG. 54 is a conceptual diagram illustrating a principle by which the electrical field leaks from the heating cable and a principle by which the electric field is intercepted in the heating cable provided with the conductive coating layer. Referring to FIG. 54, FIG. 54a illustrates the state in which a leakage electric field is formed when there is no conductive coating layer, and FIG. 54b illustrates the state in which the conductive coating layer 16 prevents a leakage electric field from forming. FIG. 54c illustrates an embodiment in which an object having a wide shape, such as a copper film, is used as the second electrical heating layer. Most of the leakage electric field is intercepted by the wide copper film and the remaining leakage electric field is secondarily intercepted by the conductive coating layer 316, so that all the electric field can be intercepted without an external insulation coating 315.

When the lead wires 314a and 314b of the second electrical heating layer are loosely wound or the metallic copper film is loosely wound, some parts of the thermistor 313 are exposed to the outside. The leakage is formed through the exposed parts.

When the conductive coating layer 316 is coated to surround the thermistor layer 313 and the lead wires 314a and 314b of the second electrical heating layer, the conductive coating layer 316 covers the parts of the lead wire of the second electrical heating layer that are not completely covered, so that the generation of the leakage electric field is prevented. It is preferred that the conductive coating layer 316 be made of conductive synthetic resin.

As described above, the present invention is advantageous in that it can perform heating and temperature detection in a non-electromagnetic wave manner without short-circuiting one end of a heating cable and intercept harmful electromagnetic waves emitted from electrical heating wires. Furthermore, the present invention is advantageous in that when it can cut off the supply of an overcurrent by forcibly cutting a power fuse when it is impossible to control the temperature of the electrical heating wires.

Furthermore, the present invention is advantageous in that it can detect local overheating at an arbitrary location as well as the temperature of the overall electrical heating wire and can ground the surface electric field of a heating cable at a zero electric potential.

Furthermore, the present invention is advantageous in that a heating cable itself can detect its own temperature without a separate temperature sensor and operates accordingly.

Furthermore, the present invention is advantageous in that it causes temperature detection or heating currents to flow in opposite directions when the currents flow through first electrical heating layer and second electrical heating layer, thus preventing induced magnetic fields from being generated in a heating cable.

Furthermore, the present invention is advantageous in that it use both or either a second electrical heating layer and or a conductive coating layer surrounding the second electrical heating layer, thus fundamentally preventing the generation of a leakage electric field.

Furthermore, the present invention is advantageous in that it can select a second electrical heating layer in various manners according to uses and characteristics.

What is claimed is:

1. A non-electromagnetic wave temperature controller for a heating cable, comprising:
    a temperature control unit connected to the heating cable that includes first and second electrical heating wires arranged in parallel and a Negative Temperature Coefficient (NTC) thermistor, and configured to compare a temperature signal voltage, which is output from the first electrical heating wire, with a reference voltage and to output a temperature control signal;
    a control rectification unit configured to return a heating current from an end of the second electrical heating wire connected to a power source through second and first ends of the first electrical heating wire toward the power source when conduction is achieved by control of the temperature control unit; and
    a reverse overcurrent protection device including:
        a first diode connected in parallel to the first electrical heating wire in a direction opposite to a direction of the heating current;
        a zener diode connected in parallel to the heating current U-turn rectifier; and
        a second diode connected in parallel to the second electrical heating wire in a direction opposite to a direction of the heating current;
        wherein a fuse is cut by the reverse overcurrent protection device when an overcurrent is generated by short circuit of the control rectifier, and wherein the electrical heating wires realize a non-magnetic field state by canceling opposite magnetic fields during temperature detection and heating.

2. The non-electromagnetic wave temperature controller as set forth in claim 1, further comprising a temperature voltage control unit for adjusting a temperature detection voltage that is applied to a first end of the first electrical heating wire.

3. The non-electromagnetic wave temperature controller as set forth in claim 2, wherein the temperature control unit comprises:
    a reference voltage generation unit for outputting the reference voltage;
    a comparison and detection unit for comparing the temperature voltage with the reference voltage, and outputting a drive signal when the temperature voltage is higher than the reference voltage;
    a trigger delay unit configured to be driven by the drive signal of the comparison and detection unit and to delay the trigger signal by a predetermined time; and
    a trigger output unit for outputting trigger signals for the time by which the trigger delay unit delays the trigger signal.

4. The non-electromagnetic wave temperature controller as set forth in claim 2, wherein the control rectification unit comprises a heating current U-turn rectifier between a second end of the first electrical heating wire and the second electrical heating wire.

5. The non-electromagnetic wave temperature controller as set forth in claim 4, wherein the control rectification unit is disposed such that an anode thereof is connected to a first end of the first electrical heating wire in parallel with the temperature voltage control unit and a cathode thereof is connected to a power source side, arid further comprises a control rectifier that is turned on in response to a control signal from the temperature control unit.

6. The non-electromagnetic wave temperature controller as set forth in claim 2, wherein the temperature voltage control unit comprises:
   a resistor whose first end is connected to the power source; and
   a temperature detection adjustment variable resistor connected between a second end of the resistor and a first end of the first electrical heating wire.

7. The non-electromagnetic wave temperature controller as set forth in claim 2, wherein the temperature voltage control unit comprises:
   first and second resistors connected in series to each other; and
   a variable resistor connected between the first resistor and the second resistor; and
   a third resistor whose first end is connected to the power source and whose second end is connected to a moving piece of the variable resistor;
   wherein a first end of the first resistor is connected to the first electrical heating wire, a first end of the second resistor is connected to the second electrical heating wire at a same side, and input impedance is matched by adjusting a value of the variable resistor.

8. The non-electromagnetic wave temperature controller as set forth in claim 3, wherein:
   the temperature voltage control unit comprises a resistor for fixing a voltage that is applied to a first end of the first electrical heating wire; and
   the reference voltage generation unit outputs a reference voltage that can be variably set.

9. The non-electromagnetic wave temperature controller as set forth in claim 8, wherein the temperature control unit comprises:
   an input unit for setting the reference voltage and delay time;
   a control unit for performing control such that the trigger signal is delayed by the set delay time if the output temperature voltage is higher than the reference voltage;
   a trigger output unit for outputting the trigger signal under control of the control unit; and
   an output unit for outputting the received reference voltage and delay time under control of the control unit.

10. The non-electromagnetic wave temperature controller as set forth in claim 8, wherein the control unit is a microcomputer chip for inputting and outputting an analog signal.

11. The non-electromagnetic wave temperature controller as set forth in claim 5, wherein the temperature control unit and a gate of the control rectifier are connected to each other by photocouple Silicon Controlled Rectifier (SCR).

12. The non-electromagnetic wave temperature controller as set forth in claim 2, wherein the temperature control unit comprises:
   a discharge resistor connected in series to the gate of the control rectifier; a rectifier diode connected in series to the discharge resistor; a condenser connected in parallel between the gate bias resistor and the rectifier diode; a comparison zener diode; a gate excessive input limit resistor; an SCR whose anode is connected to the condenser and whose gate is connected to the gate excessive input limit resistor; an SCR gate bias resistor connected in parallel with the gate excessive input limit resistor and a gate of the SCR; and a charging current limit resistor connected in parallel between an anode of the SCR and the condenser.

13. The non-electromagnetic wave temperature controller as set forth in claim 12, wherein:
   a gate of the control rectifier is insulated by the photocouple SCR;
   a light emitting side of the photocouple SCR is connected in series to the discharge resistor, and a light receiving side of the photocouple SCR is connected between a gate and anode of the control rectifier in series with the trigger resistor.

14. The non-electromagnetic wave temperature controller as set forth in claim 1, further comprising:
   a ground lighting indicator connected to a first end of the second electrical heating wire that is grounded; and
   an inspection test point configured to prevent a surface electric field of the electrical heating wire by setting the ground lighting indicator at a turned-off position.

* * * * *